(12) United States Patent
Kinder

(10) Patent No.: US 8,190,419 B1
(45) Date of Patent: May 29, 2012

(54) COMPUTER PROCESSES FOR ANALYZING AND IMPROVING DOCUMENT READABILITY

(75) Inventor: Gary W. Kinder, Seattle, WA (US)

(73) Assignee: Wordrake Holdings, LLC, Seattle, WA (US)

( * ) Notice: Subject to any disclaimer, the term of this patent is extended or adjusted under 35 U.S.C. 154(b) by 1025 days.

(21) Appl. No.: 11/853,628

(22) Filed: Sep. 11, 2007

Related U.S. Application Data

(60) Provisional application No. 60/825,218, filed on Sep. 11, 2006.

(51) Int. Cl.
  *G06F 17/20* (2006.01)
  *G06F 17/21* (2006.01)

(52) U.S. Cl. ............................... 704/1; 704/9

(58) Field of Classification Search .......................... None
  See application file for complete search history.

(56) References Cited

U.S. PATENT DOCUMENTS

| | | | |
|---|---|---|---|
| 5,737,617 A | 4/1998 | Bernth et al. | |
| 5,903,858 A * | 5/1999 | Saraki | 704/4 |
| 6,012,075 A | 1/2000 | Fein et al. | |
| 6,408,266 B1 | 6/2002 | Oon | |
| 6,632,251 B1 | 10/2003 | Rutten et al. | |
| 6,658,377 B1 * | 12/2003 | Anward et al. | 704/9 |
| 6,658,627 B1 * | 12/2003 | Gallup et al. | 715/236 |
| 7,069,508 B1 | 6/2006 | Bever et al. | |
| 7,113,905 B2 | 9/2006 | Parkinson et al. | |
| 7,313,513 B2 | 12/2007 | Kinder | |
| 7,664,631 B2 * | 2/2010 | Sugihara et al. | 704/9 |
| 7,752,034 B2 | 7/2010 | Brockett et al. | |
| 2002/0194230 A1 | 12/2002 | Polanyi et al. | |
| 2003/0068603 A1 | 4/2003 | Cupp | |
| 2003/0212541 A1 * | 11/2003 | Kinder | 704/4 |
| 2004/0030540 A1 * | 2/2004 | Ovil et al. | 704/1 |
| 2004/0107088 A1 | 6/2004 | Budzinski | |

OTHER PUBLICATIONS

John R Kohl, "Improving Translatability and Readability with Syntactic Cues," Annual Conferencesociety for Technical (1999), vol. 46, Issue: January, pp. 149-166.*

Macdonald, N.; Frase, L.; Gingrich, P.; Keenan, S.; "The Writer's Workbench: Computer Aids for Text Analysis" Communications, IEEE Transactions on, Issue Date: Jan. 1982, vol. 30 Issue:1, on pp. 105-110.*

Julie Payette and Graeme Hirst, "An intelligent computer-assistant for stylistic instruction," Computers and the Humanities vol. 26, No. 2, 87-102.*

Bowden, M. and Fox, R. (2002). "A Diagnostic Approach to the Detection of Syntactic Errors in English for Non Native Speakers," The University of Texas—Pan American Department of Computer Science Technical Report 2002.*

(Continued)

*Primary Examiner* — Matthew Sked

(74) *Attorney, Agent, or Firm* — Knobbe Martens Olson & Bear, LLP

(57) ABSTRACT

Disclosed are systems and methods for analyzing and improving document readability. For example, a method of automatic text evaluation is disclosed. The method can include the following steps: detecting whether a particular writing problem exists in text that is technically grammatically correct; scanning for at least one sign that indicates the possible occurrence or absence of the writing problem, the at least one sign comprising the term "that"; and implementing correction logic for correcting the problem. The correction logic can specify a proposed edit, which can include, for example: deleting text; adding text; and/or reordering text. Various other rules for improving text are also disclosed.

27 Claims, 7 Drawing Sheets

OTHER PUBLICATIONS

Edit Yourself: A manual for everyone who works with words, by Bruce Ross-Larson, W.W. Norton and Company, 1982, pp. 3-7, 26-31, 42-43, 50-51, 70-77, 84-85, 98-99.

Kudo, I Koshino, H. Chung, M. Morimoto, T., "Schema method: A framework for correcting grammatically ill-formed input", International Conference on Computational Linguistics, 1988, pp. 341-347.

Plain English for Lawyers, Second Edition, by Richard Wydick, California Academic Press, 1985, pp. 6-17, 23-25, 27-31, 36-39, 64-67, 70-71.

Statement of Gary Kinder, with workbook pages dated 2001.

Style: Toward Clarity and Grace, by Joseph M. Williams, with two chapters coauthored by Gregory G. Colomb, The University of Chicago Press, 1990, pp. 30-41, 70-73, 114-133.

The Elements of Style, by William Strunk, Jr. and E.B. White, with Revisions, an Introduction, and a New Chapter in Writing by E.B. White, The Macmillan Company 1959, pp. 12-19, and 64-65.

Workbook of Seminar by Gary Kinder "Advanced Writing and Editing for Partners Only" presented to the partners of McDermott, Will & Emery, Jan. 1998.

"UNC Writing Center Handout: Passive Voice". Available online Jun. 6, 2002, www.unc.edu/depts/wcweb/handouts/passivevoice.html.

Kohl, John R., "Improving Translatability and Readability with Syntactic Cues", Technical Comunication: Journal of the Society for Technical Communication, v46 n2 p. 149-66 May 1999.

* cited by examiner

COMPUTER PROCESSES FOR ANALYZING AND IMPROVING DOCUMENT READABILITY

PRIORITY INFORMATION AND CROSS-REFERENCE TO RELATED APPLICATIONS

This application claims the benefit of U.S. Provisional Patent Application No. 60/825,218, entitled "Computer Process For Analyzing and Improving Document Readability," filed on Sep. 11, 2006. This application is related, but does not claim priority, to U.S. patent application Ser. No. 11/530,797, entitled "User Feedback Based Detection of False Positives in a Rules Based Text Editing System," filed on Sep. 11, 2006, and to U.S. patent application Ser. No. 10/438,083, entitled "Method for Editing and Enhancing Readability of Authored Documents," filed on May 13, 2003, and published as U.S. Patent Publication No. US 2003/0212,541 on Nov. 13, 2003. The technical disclosures of the aforesaid applications are hereby incorporated by reference herein, and each is made part of the specification hereof. This application is also related to U.S. patent application Ser. Nos. 11/853,561, 11/853,516, 11/853,648, and 11/853,551, each filed on Sep. 11, 2007.

BACKGROUND

1. Field of the Invention

Technology disclosed herein relates generally to computer-aided writing composition and to automated computer systems and methods for making written text more concise.

2. Description of the Related Art

Writers face problems arising from various combinations of unnecessary words, passive voice, weak verbs, and convoluted construction. For years, writing texts and teachers have addressed these problems using technical terms—participle, idiom, subjunctive, relative pronoun—or generally advised writers to add vigor to their sentences by writing in the active voice. Although it is possible to become a good writer given enough practice and study, there is a continued need for improved, automated systems that provide the writer an editing method that is quick, precise, repeatable, and productive.

Commercially-available software tools exist for analyzing authored documents to search for common writing problems such as passive voice and useless phrases. These tools are currently very limited. For example, upon detecting a potential writing problem, existing tools commonly provide the user only with general guidance, not specific edits. Where they suggest specific edits, the suggestions are often inaccurate or undesirable. Other drawbacks of existing automated grammar checkers are further detailed in U.S. Patent Publication No. US 2003/0212541, published on Nov. 13, 2003. As a result of these drawbacks, these tools have proved too cumbersome and frustrating to gain widespread acceptance among authors.

There is, therefore, a need for improved and/or automated systems and methods for writing concisely (or making text more concise), which systematically identifies and removes useless words, passive voice, nominalizations, and other writing problems, or helps the author to do so.

SUMMARY

A text analysis system is disclosed that uses a database of rules to analyze authored documents and to make editing suggestions (or in some embodiments to automatically make edits) for improving the readability of such documents. The system preferably includes a user interface that enables a user to accept or reject each editing suggestion.

Also disclosed are a number of rules that can be applied by the system to analyze sentences and identify potential edits. These rules can be applied in conjunction with each other (e.g., in series, in parallel, or in some combination) to a given text. Applicant(s) reserve the right to claim each such rule independently of the others, and to claim and any all combinations of the disclosed rules.

DETAILED DESCRIPTION OF PREFERRED EMBODIMENTS

Figure 1:
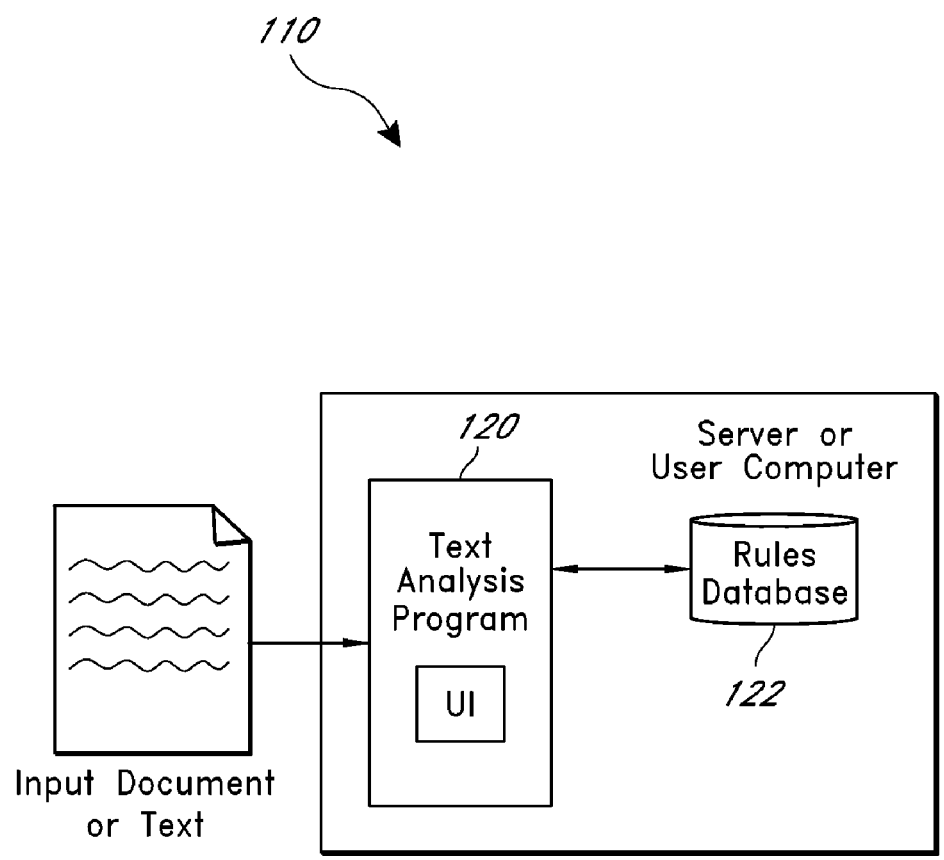
FIG. 1 illustrates the components of a text analysis system.

FIG. 1 illustrates a text analysis system 110 according to some embodiments. The system 110 includes a text analysis program 120 that uses a database of rules 122 to analyze text (e.g., apply rules). The text analysis program 120 may, for example, be a component of a word processing or other document authoring application, or may be a distinct application or web service that interoperates with (e.g., is called by) one or more document authoring applications. The rules database 122 stores rules that are adapted to be applied by the text analysis program 120 to an input document textual passage. Most or all of the rules can be adapted to be applied sentence by sentence, meaning that each sentence is analyzed independently of any preceding and following sentences. As discussed below, the rules database 122 may also be used to collect data regarding user acceptance rates of edits suggested by particular rules.

Rules can include the following components, for example: (1) detection logic for detecting whether a particular writing "problem" exists in the sentence being analyzed, and (2) correction logic for correcting the problem. The detection logic can include or consist of a particular sign, such as a particular word or set of words, representing a possible occurrence of a particular type of writing problem. In some cases, the detection logic specifies certain conditions in which the rule should not be applied even though the sign is present. A rule's correction logic may, for example, specify a particular deletion, addition, reordering of words, and/or some combination of the foregoing. As discussed below, the correction logic is used to make editing suggestions that can be accepted or rejected by the user. Processes that can be accomplished by the system 110 are illustrated in FIGS. 2-5, for example.

Additional processes that can be implemented by the system 110 are described further as "rules" below. Some or all of the rules are preferably intended to reduce grammatically correct but unnecessary language from sentences. However, the invention is not so limited. For example, the invention can also be used to assess the performance of grammar checking rules.

Figure 2A:
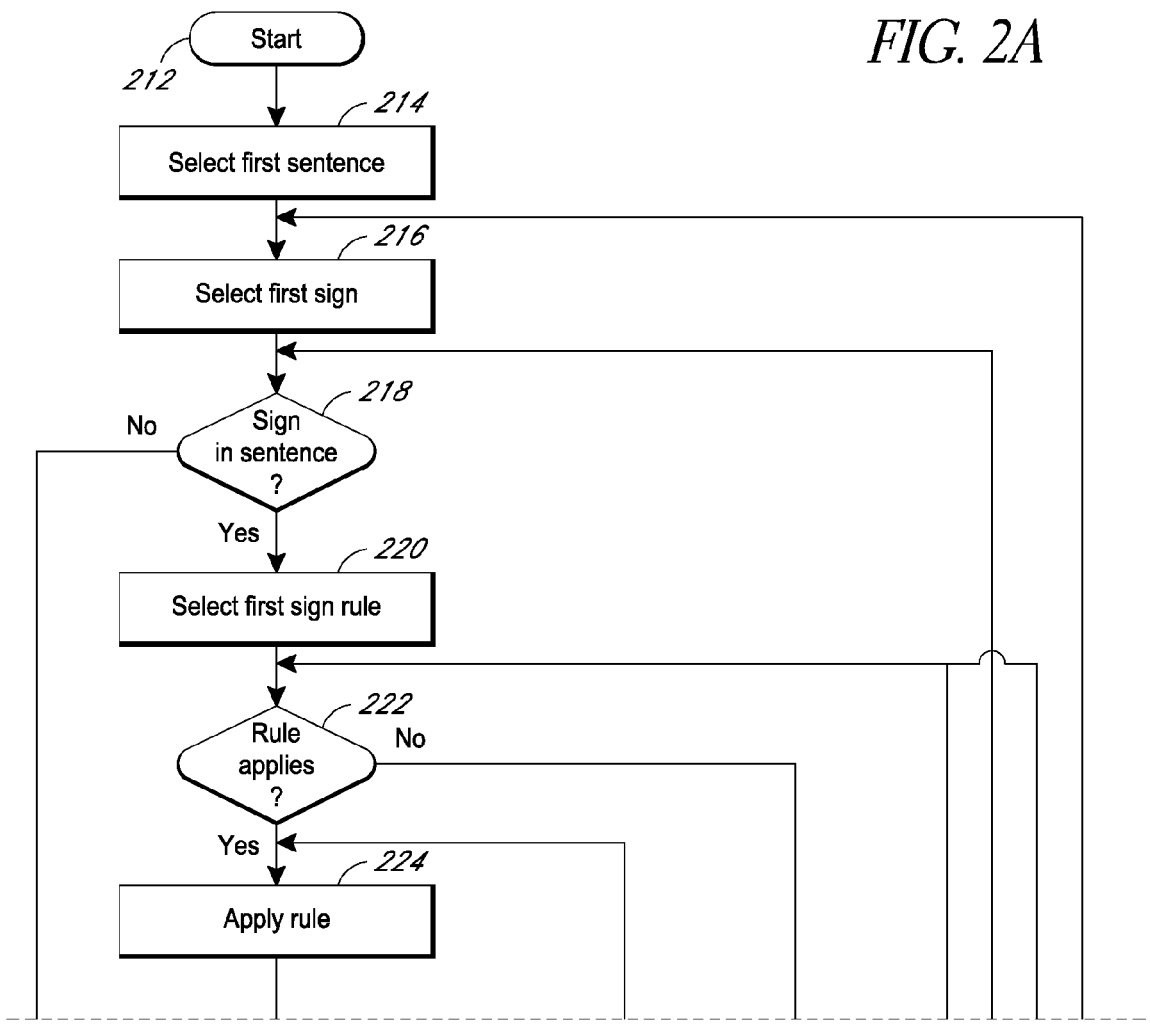
FIG. 2 is a diagram illustrating an editing method performed by a computer or system such as that illustrated in FIG. 1.
Figure 2:
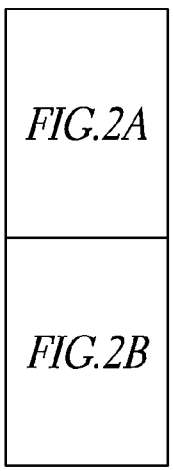
Figure 2B:
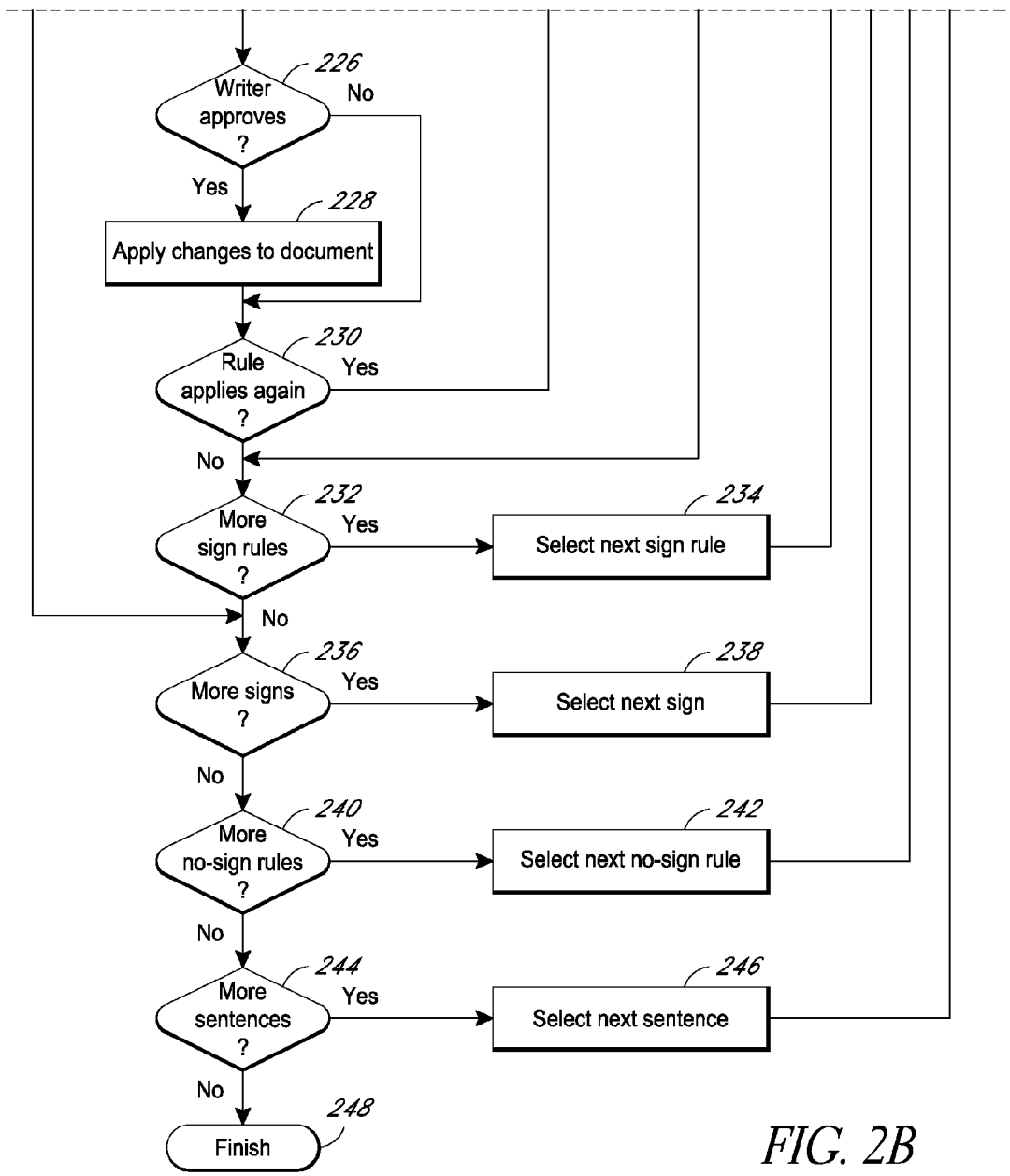

FIG. 2 is a block diagram showing an embodiment of a method that can be implemented by a computer system (e.g., the system illustrated in FIG. 1). At the Start 212 the system can select a first text sentence or phrase to analyze 214 (e.g., by automatically analyzing characters to locate punctuation, capitalization, spacing, indentation, or other formatting). At shown at 216, the system can select a first sign 216 and determine if a first sign is present in the sentence 218. If a first sign is present, then the system selects a first sign rule 220 for that first sign. The system determines if the rule applies 222 (e.g., by determining if threshold parameters or indicators specified by the rule are present in relation to the first sign). Although FIG. 2 illustrates selection of a first sentence or phrase to analyze 214 as a distinct step, this step is optional and in some advantageous embodiments, can be entirely omitted. Thus, in some embodiments, the system can search for a sign as shown at 216 without ever needing to identify sentences or other text structure. Thus, the system can analyze most groups of words without having to determine if the words form a sentence.

Figure 3:
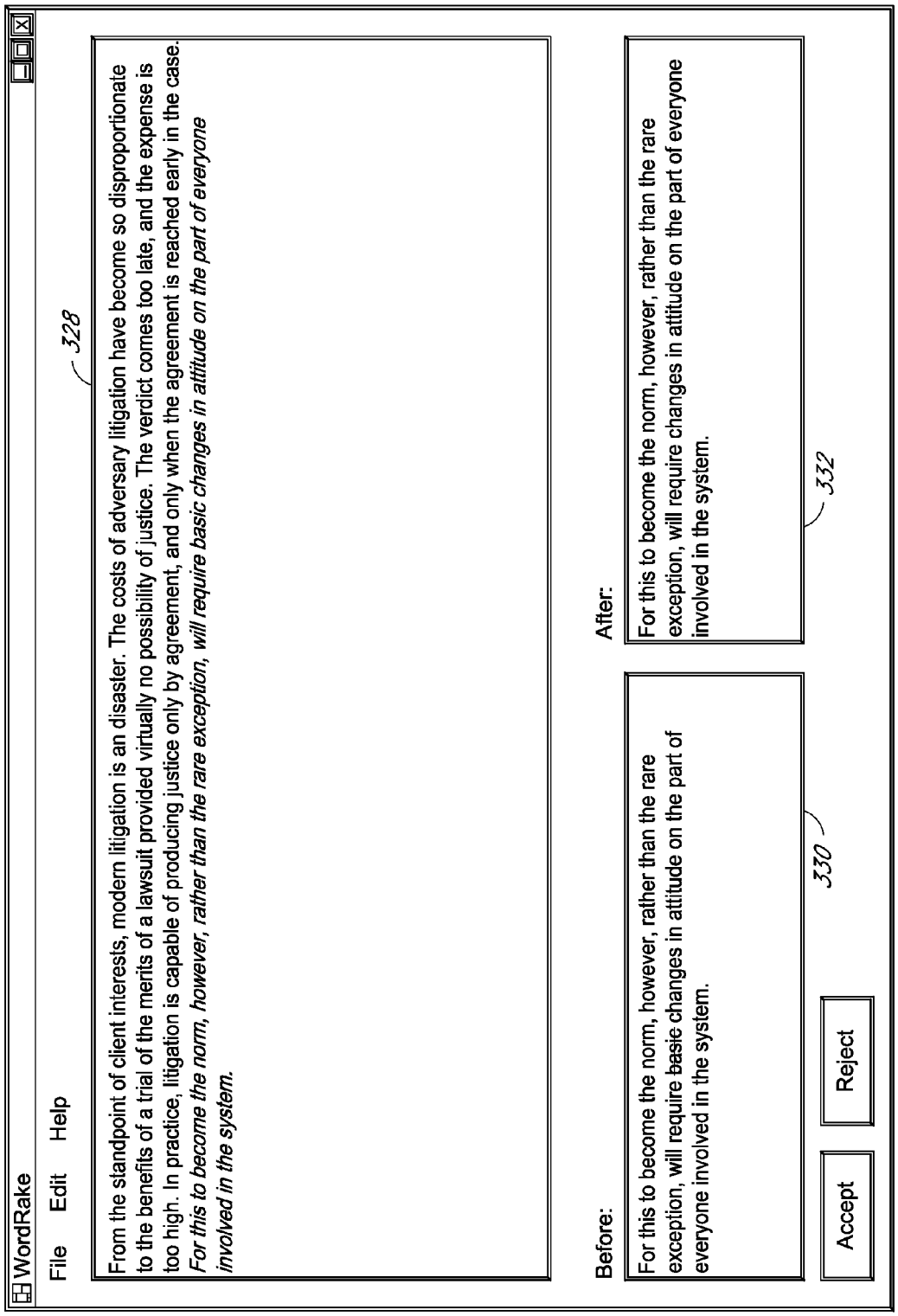
FIG. 3 is a diagram illustrating the steps of applying an example rule to text as part of the editing method illustrated in FIG. 1.
Figure 4:
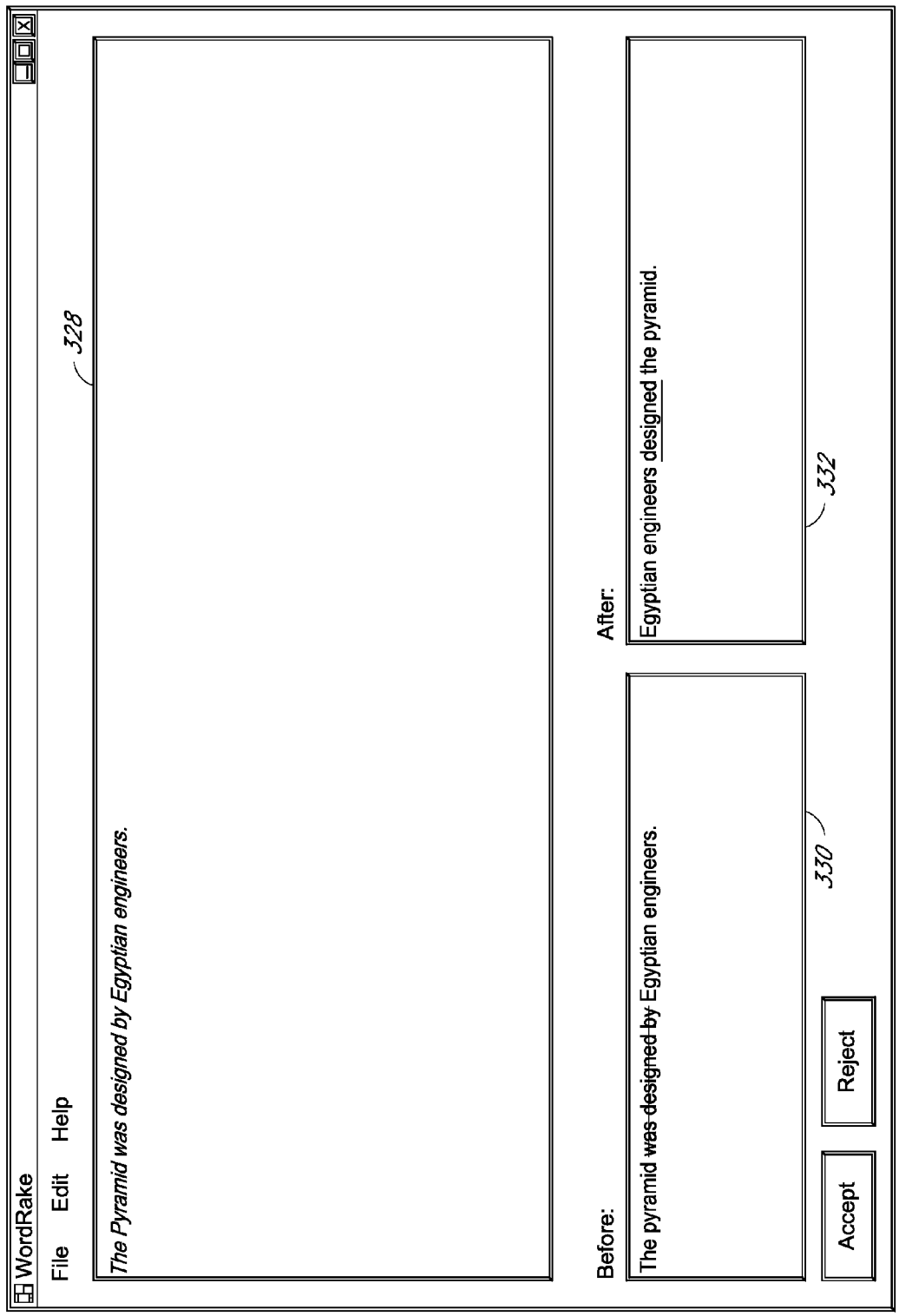
FIGS. 4 and 5 illustrate example screen displays provided by the user interface (UI) shown in FIG. 1.

With continuing reference to FIG. 2, if the first rule for the first sign does apply, then the first rule is provisionally applied 224 to the sentence (e.g., the system changes the sentence by removing and/or rearranging words), displaying to a user what the sentence would look like (e.g., the sentence can be shown with extraneous words in a different color or different intensity, font, etc.). After a rule is provisionally applied 224 to a sentence, the system prompts the user to accept or reject the suggested change (see "Writer Approves?" 226). FIGS. 3 and 4 illustrate one convenient user interface that can be employed by the system to prompt a user to accept or reject a suggested change. If the user accepts or approves of the suggestion, it is applied to the document 228; otherwise, the provisional change is removed and/or the change is not applied to the document. Whether or not the user accepts the suggested edit, the method can then determine if the rule applies again 230 to the selected sentence (e.g., by searching for additional occurrences of the first sign or other indicators corresponding to the first sign rule). If so, the method iterates by applying the rule 224 and repeating the subsequent steps as described above. In some embodiments, the method does not repeat the same analysis for the first sign rule for the first sign, because it has already ascertained the writer's preference on that question, but it can determine if the same rule applies to a different portion of the sentence, for example.

When the method queries whether the rule applies again 230, if the answer is "no," the system determines if there are more sign rules 232 for that first sign (e.g., by searching a database or listing of sign rules). If there are more sign rules, the system selects the next sign rule 234 and determines if the rule applies, as shown at 222, iterating the steps described above for a second sign rule. These iterations can continue until there are no more sign rules for that sign, or until the method is otherwise stopped.

When the method queries whether there are more sign rules, if the answer is "no," the method determines if there are any more signs 236 in the selected sentence. If so, the method selects the next sign 238 and determines if the sign is in the sentence 218, iterating the steps described above for a second sign.

When the method queries whether there are more signs, if the answer is "no," the method determines if there are any "no-sign" rules 240 that have not yet been applied to the sentence. If so, then the next "no-sign" rule is selected 242, and the method determines if the rule applies 222. In this case, the steps used for applying sign rules can be followed, asking for writer approval, as illustrated at steps 222 through 230, iterating as needed. Although the illustrated iteration of the application of "no-sign" rules includes queries about further sign rules and/or signs, in some embodiments, the method can skip (or otherwise expedite the processing of) these redundant questions, having already determined that the selected sentence has no more sign rules and/or signs.

When the method queries whether there are more "no-sign" rules, if the answer is "no" and it has been determined that there are no remaining signs or sign rules for that sentence, the method queries whether there are more sentences 244, selects the next sentence 246, and iterates by selecting the first sign 216 again and processing the second sentence in the same way as the first sentence, following the steps and iterations outlined above. When there are no more sentences, the method can finish 248.

This rule, and all rules and methods disclosed herein, can be applied not only to sentences, but also to other text portions, including paragraphs, clauses, chapters, blurbs, etc. Furthermore, the steps can be performed in different orders. For example, a system can scan all sentences for one sign, and apply the rules for that sign to each of those sentences before going on to a different sign. This is an alternative approach to scanning each sentence for the various signs and sign rules and then moving on to the next sentence to repeat the process. Similarly, the entire text can be scanned and the "no-sign" rules applied to the various sentences in the text. In some embodiments, the writer or user is not asked for approval before changes are made to the document or sentence according to the rule. In some embodiments, each sign rule is not grouped underneath a sign, but instead the text is independently searched according to any signs or other indicators for each sign rule and/or "no-sign" rule. Any of the steps described above in connection with FIG. 1 can include subroutines and/or underlying method steps. For example, application of any given rule 124 can involve method steps of looking up information in a computer memory, comparing information, altering the appearance or other properties of the text as displayed or communicated, etc. Some of the rules, including sub-routines, are described further below.

As depicted in FIGS. 1 and 3-4, the text analysis program 220 can include a user interface (UI) that enables users to interactively accept and reject specific edits suggested by the system. In the particular example shown in FIGS. 3 and 4, the user interface includes three text boxes. The main text box 328 shows the document, or a portion of the document, currently being analyzed, with the currently selected sentence highlighted in blue (shown in the italics to account for lack of color in patent drawings). The "before" and "after" text boxes 330, 332 show how the text analysis program suggests modifying the currently selected sentence. Any words or phrases to be deleted are shown in red in the "before" box 330 (shown in strikethrough in the drawings). Any words or phrases to be added are shown in green in the "after" box 332 (shown underlined in the drawings).

The user can accept or reject each suggested edit using the "accept" and "reject" buttons. Selecting "accept" causes the suggested edit to be made in the input text, and selecting "reject" causes the suggestion to be ignored. Whenever a user selects either "accept" or "reject," the system records the user's selection together with, or in association with, event metadata. The event metadata preferably include an identifier of the rule, and at least some of the words in the vicinity of the associated sign or signs. In some embodiments, the identity of the user is also logged or taken into consideration, as discussed below. The accept and reject actions of users are a form of implicit feedback that is highly relevant to whether particular editing suggestions represent false positives.

The interface shown in the drawings is just one example of an interface that can be used for accepting and rejecting suggested edits, and the invention is not limited to any particular interface. For example, the interface may alternatively enable the user to view and select from multiple alternative rewrites (revised versions) of the selected sentence, with each such rewrite corresponding to a respective rule. In such embodiments, the selection of a particular rewrite may be treated as an acceptance of the corresponding rule's suggestion and a rejection of the other rule's suggestions. Further, a voice interface may be provided for accepting and rejecting the suggested edits.

The system 110 can analyze text according to rules, each one of which can comprise an independent algorithm for improving the readability of text. The system can perform steps of a method as shown in FIG. 2, determining whether a rule applies 222 and applying the rule 224. Alternatively, a system can determine whether a rule applies and apply the rule without performing the other steps outlined in FIG. 2. Various rules are described further below, each one of which may be the subject of a separate patentable claim. A computer system such as that illustrated in FIG. 1 can implement rules independently, or be used by a user to perform the steps of the rules and methods described below.

I. Passive Voice

A rule for recognizing and improving problems of passive voice in a text can comprise sub-rules such as the following:

A. "to be" verb—"required to" (True Positive);

B. "to be" verb—"involved" (False Positive);

C. "to be" verb—infinitive (False Positive);

D. "to be"—past participle—"by"

E. "to be" verb—past participle "by" "time noun" (False Positive);

F. Determining the object noun unit preceding the "to be" verb;

G. Object "to be" verb, past participle "by" actor;

H. "to be" verb—past participle—"by"—"transport noun" (False Positive);

I. "to be" verb—past participle—"and" or "or"—past participle

J. object—"to be" verb—past participle—no "by"

K. "to be" verb—"being"—past participle

These rules are described in more detail below.

A. "To be" Verb—"Required to" (True Positive)

Figure 5A:
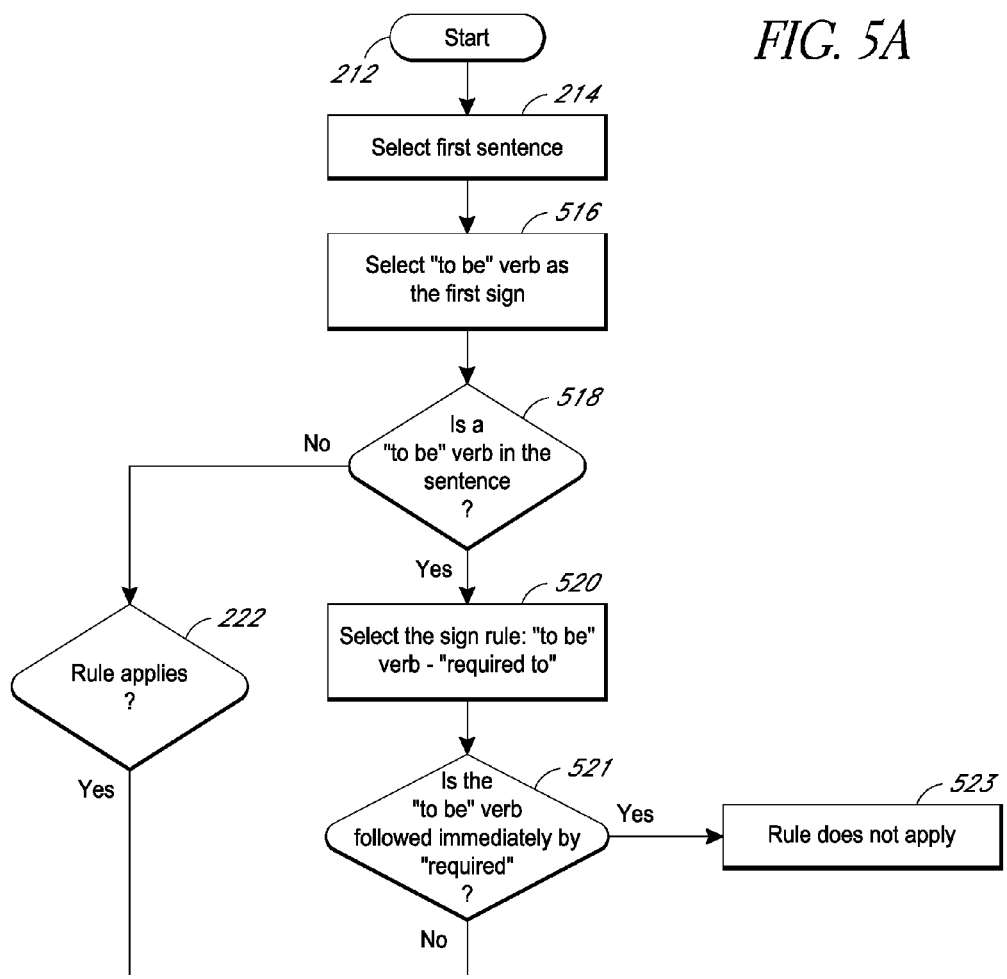
Figure 5:
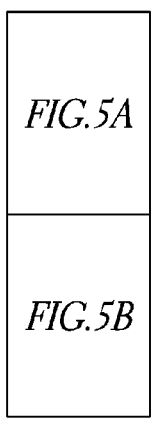
Figure 5B:
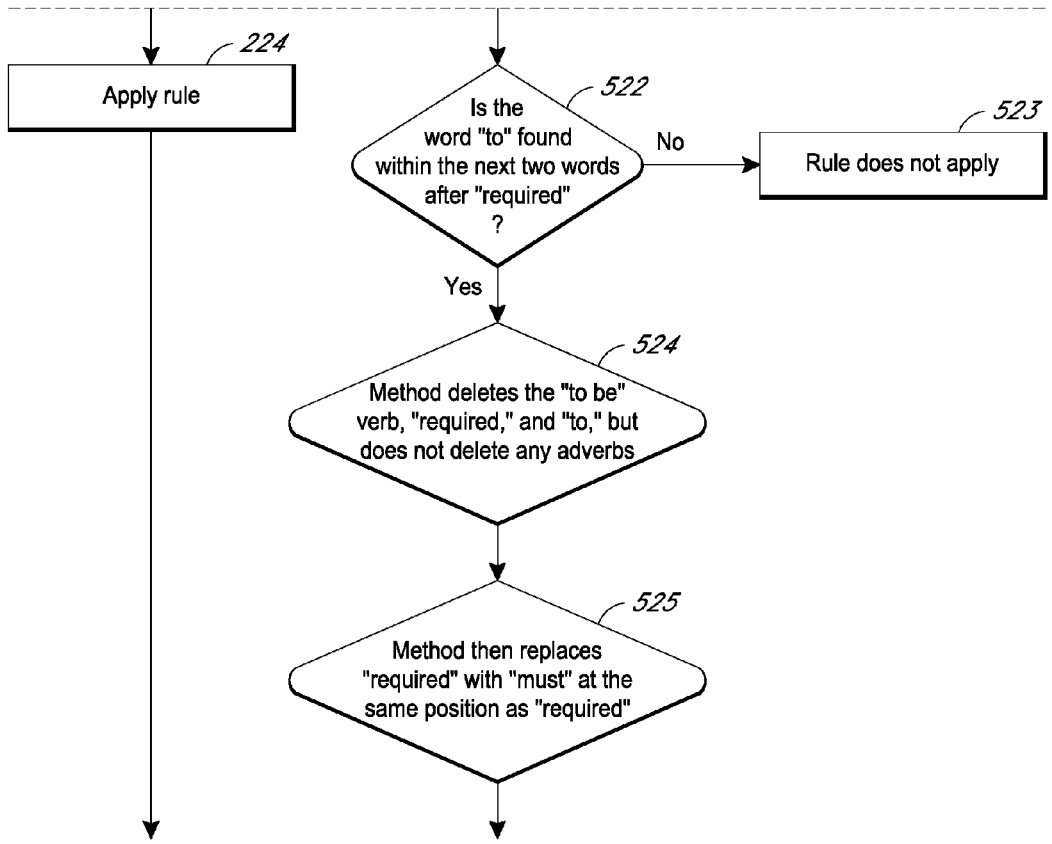

The "to be" verb "required to" rule identifies words that are extraneous and can be appropriately removed. Thus, this rule is a "True Positive" rule. FIG. 5 illustrates a logical flow that can be implemented by a computer to accomplish this rule. The method as illustrated can fit into the flow illustrated in FIG. 1, as indicated by the reference numerals 112, 114, 122, and 124, which correspond to those same reference numerals used in FIG. 1.

The system can first determine that a "to be" verb is present 518. Then, the "to be" verb—"required to" rule can be selected 520. To implement "to be" verb—"required to" rule, the system queries: "is the 'to be' verb followed immediately by 'required'?" 521. If not, the rule does not apply 523 (the fact that a "no" answer to this question is associated with the rule not applying makes it a "True Positive" rule. If the "to be" verb is followed immediately by "required," then the system determines if the word "to" is found within the next two words after "required" 522. If not, the rule does not apply 523. If so, then the system deletes the "to be" verb, "required" and "to," but does not delete any adverbs 524. The system then replaces "required" with "must" at the same position as "required" 525.

The "to be" verb "required to" rule can be applied to sample sentences as illustrated in Example 1 below.

Example 1

---

The Big Stone II partners will argue that the Minnesota PUC will be required to give full faith and credit to an order of the South Dakota PUC finding if the State of Minnesota has notice of and an opportunity to participate in the South Dakota proceeding.
 . . . will someday be required to . . .
 . . . will be required someday to . . .
The Big Stone II partners will argue that the Minnesota PUC <u>will be</u> required to give full faith and credit to an order of the South Dakota PUC finding if the State of Minnesota has notice of and an opportunity to participate in the South Dakota proceeding.
 . . . <u>will</u> someday <u>be</u> required to . . .
 . . . <u>will be</u> required someday to . . .
The Big Stone II partners will argue that the Minnesota PUC <u>will be</u> <u>required</u> to give full faith and credit to an order of the South Dakota PUC finding if the State of Minnesota has notice of and an opportunity to participate in the South Dakota proceeding.
 . . . <u>will</u> someday <u>be required</u> to . . .
 . . . <u>will be required</u> someday to . . .
The Big Stone II partners will argue that the Minnesota PUC <u>will be</u> <u>required to</u> give full faith and credit to an order of the South Dakota PUC finding if the State of Minnesota has notice of and an opportunity to participate in the South Dakota proceeding.
 . . . <u>will</u> someday <u>be required to</u> . . .
 . . . <u>will be required</u> someday <u>to</u> . . .
The Big Stone II partners will argue that the Minnesota PUC <u>required</u> <u>to</u> give full faith and credit to an order of the South Dakota PUC finding if the State of Minnesota has notice of and an opportunity to participate in the South Dakota proceeding.
 . . . someday <u>required</u> <u>to</u> . . .
 . . . <u>required</u> someday <u>to</u> . . .
The Big Stone II partners will argue that the Minnesota PUC <u>to</u> give full faith and credit to an order of the South Dakota PUC finding if the State of Minnesota has notice of and an opportunity to participate in the South Dakota proceeding.
 . . . someday <u>to</u> . . .
 . . . someday <u>to</u> . . .
The Big Stone II partners will argue that the Minnesota PUC *must* give full faith and credit to an order of the South Dakota PUC finding if the State of Minnesota has notice of and an opportunity to participate in the South Dakota proceeding."
 . . . someday *must* . . .
 . . . *must* someday . . .

---

B. "To be" Verb—"Involved" (False Positive)

The "to be" verb "involved" rule identifies words that are not extraneous and thus cannot be appropriately removed. It identifies constructions that are not improper passive voice. Thus, this rule is a "False Positive" rule.

To implement this rule, the system searches for a "to be" verb. The system then determines if the "to be" verb is followed by the word "involved," the word "dedicated," or the word "engaged." If the "to be" verb is followed by the word "involved," the word "dedicated," or the word "engaged," then the system will ignore the "to be" verb. (Note that the words "involved," "dedicated," and "engaged" are included in this list, but that the list can include additional words that play the same role as a false positive. Indeed, other idiomatic usages that have no stylistically preferable alternative can also be included in this step.) An example of how the "to be" verb "involved" rule can be implemented is illustrated in Example 2 below.

Because the first portion of the "to be" verb "involved" rule is identical to the first portion of the "to be" verb "required to" rule, the two rules can be implemented automatically in series one after another. For example, if a "to be" verb has already been identified, but "required to" is not present, the method can subsequently search for the terms "involved," "dedicated," etc. as described in this rule.

Example 2

The evidence also proves that Google is involved in speech and natural language technologies.
Dr. Lee was deeply involved in all aspects of Microsoft's China operations and business strategies, including its R&D facilities.
On Jun. 26, 2004, a bus being leased by Transportes from ABC was involved in an accident in Phoenix, Arizona.
It is rather for us to be dedicated to the great task remaining before us.
Now we are engaged in a great Civil War, testing whether that nation, or any nation, so conceived and so dedicated, can long endure.
Not only is the village process working there, but the national government is very deeply engaged so even though it's a village program, it's also a national program.

The "to be" verb "involved" rule searches for a "to be" verb:

The evidence also proves that Google *is* involved in speech and natural language technologies.
Dr. Lee *was* deeply involved in all aspects of Microsoft's China operations and business strategies, including its R&D facilities.
On Jun. 26, 2004, a bus *being* leased by Transportes from ABC *was* involved in an accident in Phoenix, Arizona.
It *is* rather for us *to be* dedicated to the great task remaining before us.
Now we *are* engaged in a great Civil War, testing whether that nation, or any nation, so conceived and so dedicated, can long endure.
Not only *is* the village process working there, but the national government *is* very deeply engaged so even though it's a village program, it's also a national program.

The system then determines if the "to be" verb is followed by the word "involved," the word "dedicated," or the word "engaged":

The evidence also proves that Google *is involved* in speech and natural language technologies.
Dr. Lee *was* deeply *involved* in all aspects of Microsoft's China operations and business strategies, including its R&D facilities.
On Jun. 26, 2004, a bus *being* leased by Transportes from ABC *was involved* in an accident in Phoenix, Arizona.
It *is* rather for us *to be dedicated* to the great task remaining before us.
Now we *are engaged* in a great Civil War, testing whether that nation, or any nation, so conceived and so *dedicated*, can long endure.
Not only *is* the village process working there, but the national government *is* very deeply *engaged* so even though it's a village program, it's also a national program.

Where the "to be" verb is followed by one of these three words, the system has identified a place where passive voice has not been used incorrectly. Thus, these are "False Positives." If the "to be" verb is followed by the word "involved," the word "dedicated," or the word "engaged," then the system will ignore the "to be" verb. If the "to be" verb is removed and treated as a "True Positive," the sentences no longer make sense:

The evidence also proves that Google involved in speech and natural language technologies.
Dr. Lee deeply involved in all aspects of Microsoft's China operations and business strategies, including its R&D facilities.
On Jun. 26, 2004, a bus being leased by Transportes from ABC involved in an accident in Phoenix, Arizona.
It rather for us to be dedicated to the great task remaining before us.
Now we engaged in a great Civil War, testing whether that nation, or any nation, so conceived and so dedicated, can long endure.
Not only is the village process working there, but the national government very deeply engaged so even though it's a village program, it's also a national program.

C. "To be" Verb=Infinitive

In some embodiments, the system searches for a "to be" verb. If the "to be" verb is the phrase "to be," then the system moves to the "to be"—past participle—"by" rule below. If, however, the "to be" verb is not the specific phrase "to be," then the system determines if the "to be" verb is followed soon thereafter by the word "involved." If it is not, the system then determines if the "to be" verb is followed by an infinitive. If it is, then the system ignores the "to be" verb. As with other rules that search for a "to be" verb as a first step, this rule can be iterated in a series with those rules, so that the first step of searching for a "to be" verb is not performed redundantly. The "to be" verb=infinitive rule is illustrated in Example 3 below.

Example 3

The smart move, the seaman's move, would have been to allow them to run for their lives.
The Hull's job was to screen for enemy submarines, as Halsley's fighting task forces rendezvoused and refueled, mid-ocean, from the bunkers of the lumbering oiler groups.
Although he was never to speak of it for the rest of his life, this could well have been the moment Admiral Housey determined his need for legal counsel.
Nimitz was not about to repeat the error.

The method searches for a "to be" verb:

The smart move, the seaman's move, *would have been* to allow them to run for their lives.
The Hull's job *was* to screen for enemy submarines, as Halsley's fighting task forces rendezvoused and refueled, mid-ocean, from the bunkers of the lumbering oiler groups.
Although he *was* never to speak of it for the rest of his life, this *could well have been* the moment Admiral Housey determined his need for legal counsel.
Nimitz *was* not about to repeat the error.

The system determines if the "to be" verb is followed by an infinitive:

The smart move, the seaman's move, *would have been to allow* them to run for their lives.
The Hull's job *was to screen* for enemy submarines, as Halsley's fighting task forces rendezvoused and refueled, mid-ocean, from the bunkers of the lumbering oiler groups.
Although he *was* never *to speak* of it for the rest of his life, this *could well have been* the moment Admiral Housey determined his need for legal counsel.
Nimitz *was* not about *to repeat* the error.

If it is, then the system ignores the "to be" verb:

---

The smart move, the seaman's move, would have been to allow them to run for their lives.

The Hull's job was to screen for enemy submarines, as Halsley's fighting task forces rendezvoused and refueled, mid-ocean, from the bunkers of the lumbering oiler groups.

Although he was never to speak of it for the rest of his life, this <u>could</u> well <u>have been</u> the moment Admiral Housey determined his need for legal counsel.

Nimitz was not about to repeat the error.

---

D. "To be"—Past Participle—"by"

An exception to the "to be" verb—infinitive rule described above arises if the "to be" verb is the actual infinitive "to be." Thus, in some embodiments, the system searches for a "to be" verb and determines if the "to be" verb is the actual phrase "to be." If the "to be" verb is the phrase "to be," then the system determines if the phrase "to be" is followed by a past participle followed by the word "by." If the "to be" verb is followed by a past participle followed by the word "by," then the system deletes the "be" from the "to be" verb, and the word "by" (but does not delete the helping verb). The system also deletes the letter "d" or the letters "ed" from the past participle. The system moves the object of the preposition "by" to a position immediately before the past participle and its helping verb. The system also moves the preceding object noun unit to follow immediately after the past participle. The system matches the number of "to be" verb to the actor. The "to be"—past participle—"by" rule is illustrated in Example 4 below.

Example 4

---

This is essential if a program is to be upgraded on a regular basis by different programmers.

---

The system searches for a "to be" verb and determines if the "to be" verb is the actual phrase "to be":

---

This <u>is</u> essential if a program <u>is to be</u> upgraded on a regular basis by different programmers.

---

If the "to be" verb is the phrase "to be," then the system determines if the phrase "to be" is followed by a past participle followed by the word "by":

---

This <u>is</u> essential if a program <u>is to be</u> <u>*upgraded*</u> on a regular basis <u>*by*</u> different programmers.

---

If the "to be" verb is followed by a past participle followed by the word "by," then the system deletes the "be" from the "to be" verb, and the word "by" (but does not delete the helping verb). The system also deletes the letter "d" or the letters "ed" from the past participle:

---

This <u>is</u> essential if a program <u>is to</u> <u>upgrade</u> on a regular basis different programmers.

---

The system moves the object of the preposition "by" to a position immediately before the past participle and its helping verb. The system also moves the preceding object noun unit to follow immediately after the past participle:

---

This <u>is</u> essential if different <u>programmers</u> <u>is to</u> <u>upgrade</u> a program on a regular basis.

---

The system matches the number of "to be" verb to the actor:

---

This is essential if different programmers <u>are to</u> <u>upgrade</u> a program on a regular basis.

---

E. "To be" Verb, Past Participle "by," "Time Noun"

In some embodiments, the system searches for a "to be" verb. Then the system determines if the "to be" verb is followed by an infinitive. If it is not, the system determines if the "to be" verb is followed by a past participle. If it is, the system determines if the past participle is followed by the word "by." If the past participle is followed by the word "by," then the system determines if the object of "by" is a noun expressing "time" from the "time noun" pool and their plurals (see Table 1 below for examples). If the object of "by" is followed by a noun expressing time from the time noun pool, then the system determines if the particular "time noun" is followed by the word "of". If it is not, then the system proceeds as though it is another preposition (see, e.g., section H, Example 8 below). If the "time noun" is followed by the word "of," then the system proceeds as though the phrase is a preposition "by" following a "to be" verb (see section G, Example 7 below). If the "time noun" is not followed by "of," the system determines whether the object of "by" is followed by "of". If it is, the system asks "Is the object of 'of' a 'time noun'"? If it is, the system then proceeds as though it is another preposition. In some embodiments, a time noun pool can comprise the following words and/or words similar thereto, as wells as their plurals:

TABLE 1

Example Time Noun Pool

| | | | |
|---|---|---|---|
| Monday | one | January | minute |
| Tuesday | two | February | moment |
| Wednesday | three | March | afternoon |
| Thursday | four | April | morning |
| Friday | five | May | night |
| Saturday | six | June | nighttime |
| Sunday | seven | July | tomorrow |
| yesterday | eight | August | next week |
| tomorrow | nine | September | day |
| week | ten | October | daytime |
| year | eleven | November | hour |
| decade | twelve | December | second |
| century | season | year | date |
| millennium | age | era | epoch |
| eon | period | instant | cycle |
| quarter | semester | trimester | fortnight |

The "to be" verb, past participle "by," "time noun" rule is illustrated in Example 5 below:

Example 5

---
It has to be picked up by tomorrow afternoon.
The corn has been parched by days of hot weather.
Our inventory will be counted by the end of the year.
All wounds can be healed by time.
You can be moved to action by an idea.

---

In some embodiments, the system searches for a "to be" verb.

---
It <u>has to be</u> picked up by tomorrow afternoon.
The corn <u>has been</u> parched by days of hot weather.
Our inventory <u>will be</u> counted by the end of the year.
All wounds <u>can be</u> healed by time.
You <u>can be</u> moved to action by an idea.

---

Then the system determines if the "to be" verb is followed by an infinitive. If it is not, the system determines if the "to be" verb is followed by a past participle.

---
It <u>has to be</u> *picked up* by tomorrow afternoon.
The corn <u>has been</u> *parched* by days of hot weather.
Our inventory <u>will be</u> *counted* by the end of the year.
All wounds <u>can be</u> *healed* by time.
You <u>can be</u> *moved* to action by an idea.

---

If it is, the system determines if the past participle is followed by the word "by."

---
It <u>has to be</u> *picked up* by tomorrow afternoon.
The corn <u>has been</u> *parched* by days of hot weather.
Our inventory <u>will be</u> *counted* by the end of the year.
All wounds <u>can be</u> *healed* by time.
You <u>can be</u> *moved* to action by an idea.

---

If the past participle is followed by the word "by," then the system determines if the object of "by" is a noun expressing "time" from the time noun pool and their plurals.

---
It <u>has to be</u> *picked up* by *tomorrow afternoon*.
The corn <u>has been</u> *parched* by *days* of hot weather.
Our inventory <u>will be</u> *counted* by the end of the year.
All wounds <u>can be</u> *healed* by time.
You <u>can be</u> *moved* to action by an idea.

---

If the object of "by" is followed by a noun expressing time from the "time noun" pool, then the system determines if the particular "time noun" is followed by the word "of."

---
It <u>has to be</u> *picked up* by *tomorrow afternoon*.
The corn <u>has been</u> *parched* by *days* of hot weather.
Our inventory <u>will be</u> *counted* by the end of the year.
All wounds <u>can be</u> *healed* by time.
You <u>can be</u> *moved* to action by an idea.

---

If it is not, then the system can proceed to other sub-routines, examining the text under other sub-rules that assume there is no "by." (See, e.g., the subrule discussed below in section J: object—"to be" verb—past participle—no "by"). If the "time noun" is followed by the word "of," then the system can proceed to other sub-routines, as though the phrase is the preposition "by" following a "to be" verb (see, e.g., the subrule discussed below in section G).

---
It has to be picked up by tomorrow afternoon.
The corn <u>has been</u> *parched* by *days* of hot weather.
Our inventory <u>will be</u> *counted* by the end of the year.
All wounds <u>can be</u> *healed* by time.
You <u>can be</u> *moved* to action by an idea.
The corn has been parched by days of hot weather.
Our inventory <u>will be</u> *counted* by the end of the year.
All wounds <u>can be</u> *healed* by time.
You <u>can be</u> *moved* to action by an idea.

---

If the "time noun" is not followed by "of," the system determines whether the object of "by" is followed by "of". If it is, the system determines if the object of "of" is a "time noun"? If it is, the system then proceeds as though it is another preposition.

---
Our inventory <u>will be</u> *counted* by the end of the *year*.
All wounds can be healed by time.
You <u>can be</u> *moved* to action by an idea.
Our inventory will be counted by the end of the year.
All wounds <u>can be</u> *healed* by time.
You <u>can be</u> *moved* to action by an idea.

---

F. Determining the "Object" Noun Unit Preceding the "to be" Verb

In the example sequence described here, an "object" noun unit can be identified after the sub-rule described in the section immediately above ("to be" verb, past participle "by," "time noun"). However, the identification of an "object" noun unit also applies to other situations and can occur with other rules and in other sequences. Indeed, as described below, each rule, sub-rule, sequence, and sub-sequence described herein can be considered a distinct and separately novel invention in its own right. The method described here for determining the "object" noun unit can apply to any situation where "by" follows a past participle and an exception or false positive is not identified, not just those where a "time noun" is followed by "of" not followed by a "time noun." Thus, even though this rule is described in this context, this rule can be appropriately applied anytime a "to be" verb is followed by a past participle followed by "by."

In some embodiments, after completing the "to be" verb, past participle "by," "time noun" rule, the system then determines if the object of "of" is a "time noun." If the object of the word "of" is not a "time noun," then the system proceeds to the "object" noun unit. More generally stated, after completing all "to be" verb rules and determining the presence of passive voice, the system searches all noun units preceding the "to be" verb for an object. To determine the object, the system asks "Does 'that,' 'who,' 'if,' 'when,' 'where,' 'whether,' 'as,' 'which,' 'while,' 'after,' 'before,' or ', and' precede the 'to be' verb?" If one does, the system ignores the noun units preceding the closest of those words. The system then determines whether more than one noun unit still precedes the "to be" verb. If more than one noun unit does precede the "to be" verb, then the system asks "Is a preceding noun: the object of a preposition, or part of a clause set off by commas, or preceding another 'to be' verb followed by a past participle?" If the answer to that question is yes, then the system ignores the identified noun units. If the answer is no, the system then asks "Is the core 'to be' verb 'am' or 'is' or 'was'?" If the answer to that question is yes, then the system ignores all of the preceding plural noun units. If the answer is no, the system ignores all preceding singular noun units. The system then queries: "Does more than one noun unit still remain?" The system then determines whether the answer to that question is yes. If the answer is yes, the system asks "Does 'and' appear between two noun units or in a series of noun units?" If the answer to that question is yes, the system will select both or all. If the answer is no, the system will highlight the remaining noun units and will form a question by placing the words "who" or "what" before the "to be" verb and past participle. For example, the phrase "Who or what was rocked?" Or "Who" or "what" are required?" At this point, the system prompts the user to select the correct object from the question presented to the user. Determining the "object" noun unit preceding the "to be" verb rule is illustrated in Example 6 below.

Example 6

---

The evidence demonstrates that Dr. Lee's group at Microsoft developed technologies that would be used by Microsoft for Chinese language search.

It includes services delivered over the Internet, and "accelerators" that can be used by Microsoft partners and customers to speed their development of office-based solutions.

In the pilot house, beneath the starboard portal, DeRyckere watched as Joe Jambor was knocked to his knees as the hull was rocked by another mountainous surge.

The lawyer said that consideration and mutual assent, the modern expression for a meeting of the minds, are required by the statute.

---

The system can apply one or various "to be" verb rules and determine the presence of passive voice. In the process, "to be" verbs, past participles, etc. can be identified.

---

The evidence demonstrates that Dr. Lee's group at Microsoft developed technologies that <u>would be</u> <u>used</u> by Microsoft for Chinese language search.

It includes services delivered over the Internet, and "accelerators" that can be <u>used</u> by Microsoft partners and customers to speed their development of office-based solutions.

In the pilot house, beneath the starboard portal, DeRyckere watched as Joe Jambor was knocked to his knees as the Hull <u>was</u> <u>rocked</u> by another mountainous surge.

The lawyer said that consideration and mutual assent, the modern expression for a meeting of the minds, <u>are</u> <u>required</u> by the statute.

---

After completing all "to be" verb rules and determining the presence of passive voice, the system searches all noun units preceding the "to be" verb for objects:

---

*The evidence* demonstrates that *Dr. Lee's group* at *Microsoft* developed *technologies* that <u>would be</u> <u>used</u> by Microsoft for Chinese language search.

*It* includes *services* delivered over *the Internet*, and "*accelerators*" that can be <u>used</u> by Microsoft partners and customers to speed their development of office-based solutions.

In *the pilot house*, beneath *the starboard portal*, *DeRyckere* watched as *Joe Jambor* was knocked to his knees as *the Hull* <u>was</u> <u>rocked</u> by another mountainous surge.

The lawyer said that *consideration* and *mutual assent*, *the modern expression* for *a meeting of the minds*, <u>are</u> <u>required</u> by the statute.

---

The system can then determine if 'that,' 'who,' 'if,' 'when,' 'where,' 'whether,' 'as,' 'which,' 'while,' 'after,' 'before,' or ', and' precede the 'to be' verb:

---

*The evidence* demonstrates that *Dr. Lee's group* at *Microsoft* developed *technologies* that <u>would be</u> <u>used</u> by Microsoft for Chinese language search.

*It* includes *services* delivered over *the Internet*, and "*accelerators*" that <u>can be</u> <u>used</u> by Microsoft partners and customers to speed their development of office-based solutions.

In *the pilot house*, beneath *the starboard portal*, *DeRyckere* watched as *Joe Jambor* was knocked to his knees as *the Hull* <u>was</u> <u>rocked</u> by another mountainous surge.

The lawyer said that *consideration* and *mutual assent*, *the modern expression* for *a meeting of the minds*, <u>are</u> <u>required</u> by the statute.

---

If one of these words does precede the "to be" verb, the system ignores the noun units preceding the closest of those words. Note that under this analysis, in the first two examples, there is no object.

---

The evidence demonstrates that Dr. Lee's group at Microsoft developed technologies that <u>would be</u> <u>used</u> by Microsoft for Chinese language search.

It includes services delivered over the Internet, and "accelerators"that <u>can be</u> <u>used</u> by Microsoft partners and customers to speed their development of office-based solutions.

In the pilot house, beneath the starboard portal, DeRyckere watched as Joe Jambor was knocked to his knees as *the Hull* <u>was</u> <u>rocked</u> by another mountainous surge.

The lawyer said that *consideration* and *mutual assent*, the modern expression for *a meeting of the minds*, <u>are</u> <u>required</u> by the statute.

---

The system determines whether there is still more than one noun unit preceding the "to be" verb (aside from those already ignored by the method). If there is still more than one noun unit preceding the "to be" verb, the system asks: "Is a preceding noun unit: the object of a preposition, or part of a clause set off by commas, or preceding another 'to be' verb followed by a past participle?"

---

In the pilot house, beneath the starboard portal, DeRyckere watched as Joe Jambor was knocked to his knees as *the Hull* <u>was</u> <u>rocked</u> by another mountainous surge.

The lawyer said that *consideration* and *mutual assent*, the modern expression for *a meeting of the minds*, <u>are</u> <u>required</u> by the statute.

---

If the answer to that question is yes, then the system ignores the identified noun units:

---

In the pilot house, beneath the starboard portal, DeRyckere watched as Joe Jambor was knocked to his knees as *the Hull* <u>was</u> <u>rocked</u> by another mountainous surge.

The lawyer said that *consideration* and *mutual assent*, the modern expression for a meeting of the minds, <u>are</u> <u>required</u> by the statute.

---

If the answer is no, the system then asks "Is the core 'to be' verb 'am,' 'is,' or 'was'?" If the answer to that question is yes, then the system ignores all of the preceding plural noun units. If the answer is no, the system ignores all preceding singular noun units. (Although not illustrated here, in some embodiments, the core "to be" verb is 'am,' 'is,' or 'was' and the "object" noun unit cannot otherwise be identified.) The system then queries: "Does more than one noun unit still remain?"

---

In the pilot house, beneath the starboard portal, DeRyckere watched as Joe Jambor was knocked to his knees *as* the Hull was *rocked* by another mountainous surge.
The lawyer said *that* consideration and *mutual assent*, the modern expression for a meeting of the minds, are *required* by the statute.

---

If the answer is yes, the system asks "Does 'and' appear between two noun units or in a series of noun units?"

---

In the pilot house, beneath the starboard portal, DeRyckere watched as Joe Jambor was knocked to his knees *as* the Hull was *rocked* by another mountainous surge.
The lawyer said *that* consideration *and* *mutual assent*, the modern expression for a meeting of the minds, are *required* by the statute.

---

If the answer to that question is yes, the system will select both or all (e.g., treating "consideration and mutual assent" as one compound noun unit):

---

In the pilot house, beneath the starboard portal, DeRyckere watched as Joe Jambor was knocked to his knees *as* the Hull was *rocked* by another mountainous surge.
The lawyer said *that* consideration and *mutual assent*, the modern expression for a meeting of the minds, are *required* by the statute.

---

If the answer is no, the system will highlight the remaining noun units and form a question by placing the words "Who or what" before the "to be" verb and past participle. For example, the phrase "Who or what was rocked?" Or "Who or what are required?" At this point, the system prompts the user to select the correct object from the question presented to the user. Because the "object" noun units have already been identified here, these examples do not illustrate where this is necessary.

G. Object "to be" Verb, Past Participle "by" Actor

In some embodiments, after completing the "to be" verb, past participle "by," "time noun" rule, (see section E, including Example 5 above) if the object of the word "of" is not a "time noun," then the system can search for an "object" noun unit preceding the "to be" verb. When the system identifies the "object" noun unit, it then deletes the "to be" verb and "by," but does not delete the helping verb. The system then moves the object of the preposition "by" noun unit to a position immediately before the past participle and its helping verb. The system then moves the preceding "object" noun unit to follow immediately after the past participle and asks the question "Was the deleted 'to be' verb 'be'?" If the answer is yes, then the system removes "d" or "ed" from the past participle.

The system then asks "Was the preceding object noun unit 'I', 'he,' 'she,' 'we,' or 'they'?" If the answer is yes, the system converts the noun unit to its objective form. For example, "I" becomes "me," "he" becomes "him," "she" becomes "her," "we" becomes "us," and "they" becomes "them." The system then asks "Was the object of the preposition 'by' noun unit 'me,' 'him,' 'her,' 'us,' or 'them.'?" If the answer is yes, the system converts the object noun unit to its subjective form, for example, "I," "he," "she," "we," or "they."

The system then asks "Does 'not' appear in the middle of the 'to be' verb?" If it does, then the system removes "d" or "ed" from the past participle. The system then asks "Was the deleted 'to be' verb in the past tense?" If it was, then the system places "did" in front of "not." If the deleted verb was not in the past tense, then the system asks "Is the new noun unit 'not' the third person singular, e.g., 'he,' 'she,' 'it,' or almost anything not ending in 's'?" If yes, the system places "does" in front of "not." If it does not, the system places "do" in front of "not." The system then will recapitalize as needed. The object "to be" verb, past participle "by" actor rule is illustrated in Example 7 below.

Example 7

---

All wounds can be healed by time.
You can be moved to action by an idea.
The evidence demonstrates that Dr. Lee's group at Microsoft developed technologies that would be used by Microsoft for Chinese language search.
A local scientist, a wonderful young Ethiopian, was selected by the local government to head the project for us and get the community together.
Secondly, I was not advised by your office until June 15, 2006, that Mr. Kelly had recently been diagnosed with lung cancer.
Current Windows users are not impacted by this Court ruling.

---

Applying the steps of the "to be" verb, past participle "by," "time noun" rule, (see section E, including Example 5 above), including searching for "to be" verbs, determining if the "to be" verbs are followed by infinitives or past participles, and determining if the past participles are followed by the word "by":

---

All wounds <u>can be</u> *healed* by time.
You <u>can be</u> *moved* to action by an idea.
The evidence demonstrates that Dr. Lee's group at Microsoft developed technologies that <u>would be</u> *used* by Microsoft for Chinese language search.
A local scientist, a wonderful young Ethiopian, <u>was</u> *selected* by the local government to head the project for us and get the community together.
Secondly, I <u>was</u> not *advised* by your office until June 15, 2006, that Mr. Kelly <u>had</u> recently <u>been</u> *diagnosed* with lung cancer.
Current Windows users <u>are</u> not *impacted* by this Court ruling.

---

If the past participle is followed by the word "by," then the system determines if the object of "by" is a noun expressing "time" from the "time noun" pool and their plurals.

---

All wounds <u>can be</u> *healed* by time.
You <u>can be</u> *moved* to action by an idea.
The evidence demonstrates that Dr. Lee's group at Microsoft developed technologies that <u>would be</u> *used* by Microsoft for Chinese language search.
A local scientist, a wonderful young Ethiopian, <u>was</u> *selected* by the local government to head the project for us and get the community together.
Secondly, I <u>was</u> not *advised* by your office until June 15, 2006, that Mr. Kelly <u>had</u> recently <u>been</u> *diagnosed* with lung cancer.
Current Windows users <u>are</u> not *impacted* by this Court ruling.

---

If the object of "by" is not from the "time noun" pool, or if the object of "by" is not followed by "of," the system searches for an object noun unit preceding the "to be" verb. Alternatively stated, after completing all "to be" verb rules and determining the presence of passive voice, the system searches all noun units preceding the "to be" verb for objects:

> *All wounds* <u>can be</u> <u>*healed*</u> by time.
> *You* <u>can be</u> <u>*moved*</u> to action by an idea.
> The evidence demonstrates that Dr. Lee's group at Microsoft developed technologies that <u>would be</u> <u>*used*</u> by Microsoft for Chinese language search.
> *A local scientist, a wonderful young Ethiopian,* <u>was</u> <u>*selected*</u> by the local government to head the project for us and get the community together.
> Secondly, *I* <u>was</u> not <u>*advised*</u> by your office until June 15, 2006, that Mr. Kelly <u>had</u> recently <u>been</u> <u>*diagnosed*</u> with lung cancer.
> *Current Windows users* <u>are</u> not <u>*impacted*</u> by this Court ruling.

The system deletes the "to be" verb, but not the help verb, and also deletes the word "by":

> *All wounds* can <u>*healed*</u> time.
> *You* can <u>*moved*</u> to action an idea.
> The evidence demonstrates that Dr. Lee's group at Microsoft developed technologies that would <u>*used*</u> Microsoft for Chinese language search.
> *A local scientist, a wonderful young Ethiopian,* <u>was</u> <u>*selected*</u> the local government to head the project for us and get the community together.
> Secondly, *I* not <u>*advised*</u> your office until June 15, 2006, that Mr. Kelly <u>had</u> recently <u>been</u> <u>*diagnosed*</u> with lung cancer.
> *Current Windows users* not <u>*impacted*</u> this Court ruling.

The system moves the object of the preposition "by" noun units to a position immediately before the past participle and its help verb (and negative, if applicable):

> *All wounds* <u>time</u> can <u>*healed*</u>.
> *You* <u>an idea</u> can <u>*moved*</u> to action.
> The evidence demonstrates that Dr. Lee's group at Microsoft developed technologies that <u>Microsoft</u> would <u>*used*</u> for Chinese language search.
> *A local scientist, a wonderful young Ethiopian,* <u>the local government</u> <u>*selected*</u> to head the project for us and get the community together.
> Secondly, *I* <u>your office</u> not <u>*advised*</u> until June 15, 2006, that Mr. Kelly <u>had</u> recently <u>been</u> <u>*diagnosed*</u> with lung cancer.
> *Current Windows users* <u>this court ruling</u> not <u>*impacted*</u>.

The system then moves the preceding object noun unit to follow immediately after the past participle:

> <u>time</u> can <u>*healed*</u> *All wounds*
> <u>an idea</u> can <u>*moved*</u> *You* to action.
> The evidence demonstrates that Dr. Lee's group at Microsoft developed technologies that <u>Microsoft</u> would <u>*used*</u> for Chinese language search.
> <u>the local government</u> <u>*selected*</u> *A local scientist, a wonderful young Ethiopian*, to head the project for us and get the community together.
> Secondly, <u>your office</u> not <u>*advised*</u> *I* until June 15, 2006, that Mr. Kelly <u>had</u> recently <u>been</u> <u>*diagnosed*</u> with lung cancer.
> <u>this court ruling</u> not <u>*impacted*</u> *Current Windows users*.

The system then asks "Was the deleted 'to be' verb 'be?'" If yes, the system removes the "-d" or "-ed" from the past participle (as with each of the first three examples here):

> <u>time</u> can <u>*heal*</u> *All wounds*
> <u>an idea</u> can <u>*move*</u> *You* to action.

> The evidence demonstrates that Dr. Lee's group at Microsoft developed technologies that <u>Microsoft</u> would <u>*use*</u> for Chinese language search.
> <u>the local government</u> <u>*selected*</u> *A local scientist, a wonderful young Ethiopian*, to head the project for us and get the community together.
> Secondly, <u>your office</u> not <u>*advised*</u> *I* until June 15, 2006, that Mr. Kelly <u>had</u> recently <u>been</u> <u>*diagnosed*</u> with lung cancer.
> <u>this court ruling</u> not <u>*impacted*</u> *Current Windows users*.

The system then determines if the preceding object noun unit "I," "he," "she," "we," or "they." If so, the system converts the noun unit to its object form: "me," "him," "her," "us," or "them." (Similarly, the system also determines if the object of the preposition "by" noun unit was "me," "him," "her," "us," or "them"; if so, the system converts the object noun unit into its subject form: "I," "he," "she," "we," or "they." This is not illustrated in these examples).

> Secondly, <u>your office</u> not <u>*advised*</u> *me* until June 15, 2006, that Mr. Kelly <u>had</u> recently <u>been</u> <u>*diagnosed*</u> with lung cancer.

Does "not" appear in the middle of a "to be" verb unit? If so, the system removes the "d" or "-ed" from the past participle:

> Secondly, <u>your office</u> not <u>*advise*</u> *me* until June 15, 2006, that Mr. Kelly <u>had</u> recently <u>been</u> <u>*diagnosed*</u> with lung cancer.
> <u>this court ruling</u> not <u>*impact*</u> *Current Windows users*.

The system then determines if the deleted "to be" verb was past tense. If so, the system places "did" in front of "not":

> Secondly, <u>your office</u> did not <u>*advise*</u> *me* until June 15, 2006, that Mr. Kelly <u>had</u> recently <u>been</u> <u>*diagnosed*</u> with lung cancer.

If the deleted "to be" verb was not past tense, on the other hand, the system determines if the new noun unit preceding "not" is the third person singular (e.g., he, she, it, or almost anything not ending in "s.") If so, the system places "does" in front of "not." (If not, the system places "do" in front of "not.")

> <u>this court ruling</u> *does* not <u>*impact*</u> *Current Windows users*.

The system then fixes capitalization:

> Time can heal all wounds.
> An idea can move you to action.
> The evidence demonstrates that Dr. Lee's group at Microsoft developed technologies that Microsoft would use for Chinese language search.
> The local government selected a local scientist, a wonderful young Ethiopian, to head the project for us and get the community together.
> Secondly, your office did not advise me until June 15, 2006, that Mr. Kelly had recently been diagnosed with lung cancer.
> This court ruling does not impact current Windows users.

H. "To be" Verb—Past Participle—"by"—"Transport Noun"—FALSE POSITIVE

This rule can be implemented in connection with other rules that search for "to be" verbs. Thus, the "to be" verb can be considered a sign for this rule. This rule can begin at the step numbered, "51" below, after other rules have been considered and rejected or considered and applied. Thus, steps 1-3, and 6-13 can be pre-cursor steps to this rule, in some embodiments.

(1) system searches for "to be" verb
(2) is "to be" verb followed immediately by "required"?
(3) if yes, is "to" found in the next two words?
6. [referring to the question posed in Step 2] if no, is "to be" verb followed by "involved," "engaged," or "dedicated?"
7. if yes, system ignores
8. [referring to the question posed in Step 6], if no, is "to be" verb followed by infinitive?
9. if yes, system ignores
10. [referring to the question posed in Step 8] if no, is "to be" verb followed by past participle?
11. if yes, is past participle followed by "by"?
12. if yes, is the object of "by" a noun expressing "time" from the "time noun" pool (and their plurals): minute, moment, afternoon, morning, night, nighttime, tomorrow, next week, yesterday, day, daytime, hour, second, season, year, date, decade, age, era, epoch, eon, period, instant, cycle, quarter, semester, trimester, century (other time nouns can also be included) (The word "time" is not a "time noun.")
13. if yes, is "time noun" followed by "of"?
51. [referring to the question posed in Step 12] if no, is the object of "by" a noun representing something that transports people or things (and their plurals): car, automobile, truck, van, motorcycle, plane, jet, airplane, boat, ship, scooter, wagon, covered wagon, train, bus, cart, carriage, sled, sleigh, wheelbarrow, ambulance, ski, skate, roller skate, snowshoe, bike, bicycle, coach, chariot, cab, hansom, stagecoach, motor home, subway, trolley, horse, pony, colt)
52. if yes, does an article appear between "by" and the "transport noun"?
53. if no, system examines under Sub Rule 9 (as though there is no "by")
54. if yes, system examines under Sub Rule 6

In some embodiments, the system searches for a "to be" verb and determines if the "to be" verb is followed immediately by the word "required." If the "to be" verb is followed immediately by the word "required," then the system determines if the word "to" is found within the next two words. If, however, the "to be" verb is not immediately followed by the word "required," then the system determines if the "to be" verb is followed by the word "involved." If the "to be" verb is followed by the word "involved," the word "engaged," or the word "dedicated," then the system ignores the phrase. If, however, the "to be" verb is not followed by the word "involved," then the system determines if the "to be" verb is followed by an infinitive. If the "to be" verb is followed by an infinitive, then the system ignores the phrase. If, however, the "to be" verb is not followed by an infinitive, then the system determines if the "to be" verb is followed by a past participle. If the "to be" verb is followed by a past participle, then the system determines if the past participle is followed by the word "by." If the past participle is followed by the word "by," then the system determines if the object of the word "by" is a noun expressing "time" from the "time noun" pool (and their plurals) including words like "minute," "moment," "afternoon," "morning," "night," "night time," "tomorrow," "next week," "yesterday," "day," "daytime," "hour," "second," "season," "year," "date," "decade," "age," "era," "epic," "eon," "period," "instant," "cycle," "quarter," "semester," "trimester," and "century." If the object of "by" is a noun expressing "time" from the "time noun" pool, then the system determines if the "time noun" is followed by the word "of" (The word "time" is not a "time noun.")

If, however, the object of the word "by" is not a noun expressing "time" from the "time noun" pool, then the system determines if the object of "by" is a noun representing something that transports people or things (and their plurals), for example, "car," "automobile," "truck," "van," "motorcycle," "plane," "jet," "airplane," "boat," "ship," "skooter," "wagon," "covered wagon," "train," "bus," "cart," "carriage," "sled," "sleigh," wheelbarrow," "ambulance," "ski," "skate," "roller-skate," "snowshoe," "bike," "bicycle," "coach," "chariot," "cab," "Hanson," "stage coach," "motor home," "subway," "trolley," "horse," "pony," and "colt." If the object of "by" is a noun representing something that transports people, then the system determines if an article appears between the word "by" and the "transport noun." If an article does not appear between the word "by" and the "transport noun," then the system examines the phrase as though there is no word "by." If, however, an article does appear between the word "by" and the "transport noun," then the system examines the phrase under the object "to be" verb, past participle, "by" actor rule. The "to be" verb—past participle—"by"—"transport noun"—FALSE POSITIVE rule is illustrated in Example 8 below.

Example 8

Creole was flown back to the Hailey shelter by private jet.
The Queen was almost hit by a runaway carriage.
Creole <u>was</u> <u>flown</u> back to the Hailey shelter <u>by</u> private jet.
The Queen <u>was</u> almost <u>hit</u> <u>by</u> a runaway carriage.
Creole <u>was</u> <u>flown</u> back to the Hailey shelter <u>by</u> private <u>jet</u>.
The Queen <u>was</u> almost <u>hit</u> <u>by</u> a runaway <u>carriage</u>.
Creole <u>was</u> <u>flown</u> back to the Hailey shelter <u>by</u> private <u>jet</u>.
The Queen <u>was</u> almost <u>hit</u> <u>by</u> <u>a</u> runaway <u>carriage</u>.

I. "To be" Verb—Past Participle—"and" or "or"—Past Participle

This rule can be implemented in connection with other rules that search for "to be" verbs. Thus, the "to be" verb can be considered a sign for this rule. This rule can begin at the step numbered, "55" below, after other rules have been considered and rejected or considered and applied. Thus, steps 1-3, and 6-12 can be pre-cursor steps to this rule, in some embodiments.

(1) system searches for "to be" verb
(2) is "to be" verb followed immediately by "required"?
(3) if yes, is "to" found in the next two words?
6. [referring to the question posed in Step 2] if no, is "to be" verb followed by "involved," "engaged," or "dedicated?"
7. if yes, system ignores
8. [referring to the question posed in Step 6], if no, is "to be" verb followed by infinitive?
9. if yes, system ignores
10. [referring to the question posed in Step 8] if no, is "to be" verb followed by past participle?
11. if yes, is past participle followed by "by"?
12. if yes, is the object of "by" a noun expressing "time" from the "time noun" pool (and their plurals): minute, moment, afternoon, morning, night, nighttime, tomorrow, next week, yesterday, day, daytime, hour, second, season, year, date, decade, age, era, epoch, eon, period, instant, cycle, quarter, semester, trimester, century 55. is past participle followed by "and" or "or"?

56. if yes, is "and" or "or" followed by another past participle?

57. if no, system ignores 58. if yes, system treats "and" or "or" and second past participle as part of the first participle In some embodiments, the system searches for a "to be" verb and determines if the "to be" verb is followed immediately by the word "required." If the "to be" verb is followed immediately by the word "required," then the system determines if the word "to" is found within the next two words. If the "to be" verb is not followed immediately by the word "required," then the system determines if the "to be" verb is followed by the word "involved." If the "to be" verb is followed by the word "involved," "engaged," or "dedicated," then the system ignores the phrase. If, however, the "to be" verb is not followed by the word "involved," then the system determines if the "to be" verb is followed by an infinitive. If the "to be" verb is followed by an infinitive, then the system ignores the phrase.

If the "to be" verb is not followed by an infinitive, then the system determines if the "to be" verb is followed by a past participle. If the "to be" verb is followed by a past participle, then the system determines if the past participle is followed by the word "by." If the past participle is followed by the word "by," then the system determines if the object of the word "by" is a noun expressing "time" from the "time noun" pool or a "transport noun." If, however, the past participle is not followed by the word "by," then the system determines if the past participle is followed by the word "and" or the word "or." If the past participle is followed by the word "and" or the word "or," then the system determines if either the word "and" or the word "or" is followed by another past participle. If not, then the system ignores the phrase. If, however, the word "and" or the word "or" is followed by another past participle, then the system treats the word "and" or the word "or" and the second past participle as if it were part of the first participle in the phrase. The "to be" verb—past participle—"and" or "or"—past participle rule is illustrated in Example 9 below.

Example 9

---

Instead, we're using SharePoint workspaces, intranet sites where documents and other data can be centrally located and accessed.

---

J. Object—"to be" Verb—Past Participle—No "by"

This rule can be implemented in connection with other rules that search for "to be" verbs. Thus, the "to be" verb can be considered a sign for this rule. This rule can begin at the step numbered, "59" below, after other rules have been considered and rejected or considered and applied. Thus, other steps can be pre-cursor steps to this rule, in some embodiments, as indicated. For example, the system can delete certain words under the "There Rule" before it applies the "Passive Rule." (See, e.g., section V, in the "third there" rule).

59. [referring to the question posed in Step 11] if no, system highlights sentence 60. System asks user: "This sentence is passive; would you like to make it active?"

61. User selects "Yes" or "No"

62. if User selects "No", system ignores 63. if User selects "Yes", system forms a question 64. system begins question "Who or what"

65. system follows those words with the help verbs and adverbs in "to be" verb unit (but not "to be" verb)

66. is "to be" verb "am" "is" "are" or "be"?

67. if yes, system forms the question by converting the past participle to its present tense form 68. if no, system forms the question by converting the past participle to its past tense form 69. using the noun unit that forms the object, system finishes question 70. User answers question by typing the actor 71. system replaces "Who or what" with the typed in actor 72. system removes question mark 73. system deletes words that form passive part of sentence 74. system places new active version where system deleted passive part of sentence 75. system matches number and capitalizes In some embodiments, the system, following pairing down of sentences and phrases using other rules disclosed herein, will search for the "to be" verb. The system will determine if the "to be" verb is followed immediately by the word "required." If the "to be" verb is followed immediately by the word "required," the system will determine if the word "to" is found within the next two words. If, however, the "to be" verb is not immediately followed by the word "required," then the system will determine if the "to be" verb is followed by the word "involved." If the "to be" verb is followed by the word "involved," then the system will ignore the phrase.

If, however, the "to be" verb is not followed by the word "involved," "engaged," or "dedicated," then the system will determine if the "to be" verb is followed by an infinitive. If the "to be" verb is followed by an infinitive, then the system will ignore the phrase. If, however, the "to be" verb is not followed by an infinitive, then the system determines if the "to be" verb is followed by a past participle. If the "to be" verb is followed by a past participle, then the system will determine if the past participle is followed by the word "by." If the past participle is followed by the word "by," then the system will determine if the object of the word "by" is a noun expressing "time" from the "time noun" pool, or a "transport noun." If, however, the past participle is not followed by the word "by," then the system will highlight the sentence and prompt the user: "This sentence is passive; would you like to make it active?"

The user will then select the word "Yes" or the word "No." If the user selects the word "No," then the system will ignore the phrase. If the user selects the word "Yes," then the system will form a question, beginning the question "Who or what." The system will follow the words "Who or what" with helping verbs and adverbs in the "to be" verb unit without using the "to be" verb. The system determines if the "to be" verb is "am," "is," "are," or "be." If the "to be" verb is one of those verbs from the list, the system forms the question by converting the past participle to its present tense form. If, however, the "to be" verb is not from the above list, then the system forms the question by converting the past participle to its past tense form.

Using the noun unit that forms the object, the system finishes the question. The user answers the question by typing the appropriate actor. The system then replaces "Who or what" with the typed actor. The system removes the question mark, deletes words that form the passive part of the sentence, places a new active version where the system deleted the passive part of the sentence, and matches the verb number and capitalizes or recapitalizes as appropriate. The object—"to be" verb—past participle—no "by" rule is illustrated in Example 10 below.

Example 10

---

A distinction must also be made between conflicts and hassles.
He had borne the Allied cause on his shoulders during the war's first, flickering hours, and this would not soon be forgotten.
That is the kind of scrutiny each gift received before it was approved.
Instead, we're using SharePoint workspaces, intranet sites where documents and other data can be centrally located and accessed.
There is a tremendous amount of local research that has been done on African agriculture.
A distinction must also be made between conflicts and hassles.
He had borne the Allied cause on his shoulders during the war's first, flickering hours, and this would not soon be forgotten.
That is the kind of scrutiny each gift received before it was approved.
Instead, we're using SharePoint workspaces, intranet sites where documents and other data can be centrally located and accessed.
There is a tremendous amount of local research that has been done on African agriculture.
A distinction must also be made between conflicts and hassles.
He had borne the Allied cause on his shoulders during the war's first, flickering hours, and this would not soon be forgotten.
That is the kind of scrutiny each gift received before it was approved.
Instead, we're using SharePoint workspaces, intranet sites where documents and other data can be centrally located and accessed.
a tremendous amount of local research has been done on African agriculture.
*A distinction must also be made between conflicts and hassles.*
*He had borne the Allied cause on his shoulders during the war's first, flickering hours, and this would not soon be forgotten.*
*That is the kind of scrutiny each gift received before it was approved.*
*Instead, we're using SharePoint workspaces, intranet sites where documents and other data can be centrally located and accessed.*
*a tremendous amount of local research has been done on African agriculture.*
A distinction must also be made between conflicts and hassles.
He had borne the Allied cause on his shoulders during the war's first, flickering hours, and this would not soon be forgotten.
That is the kind of scrutiny each gift received before it was approved.
Instead, we're using SharePoint workspaces, intranet sites where documents and other data can be centrally located and accessed.
a tremendous amount of local research has been done on African agriculture.
A distinction must also be made between conflicts and hassles.
[Who or what must also?]
He had borne the Allied cause on his shoulders during the war's first, flickering hours, and this would not soon be forgotten.
[Who or what would not soon?]
That is the kind of scrutiny each gift received before it was approved.
[Who or what?]
Instead, we're using SharePoint workspaces, intranet sites where documents and other data can be centrally located and accessed.
[Who or what can centrally?]
a tremendous amount of local research has been done on African agriculture.
[Who or what has?]
A distinction must also be made between conflicts and hassles.
[Who or what must also?]
He had borne the Allied cause on his shoulders during the war's first, flickering hours, and this would not soon be forgotten.
[Who or what would not soon?]
That is the kind of scrutiny each gift received before it was approved.
[Who or what?]
Instead, we're using SharePoint workspaces, intranet sites where documents and other data can be centrally located and accessed.
[Who or what can centrally?]
a tremendous amount of local research has been done on African agriculture.
[Who or what has?]
A distinction must also be made between conflicts and hassles.
[Who or what must also make?]
He had borne the Allied cause on his shoulders during the war's first, flickering hours, and this would not soon be forgotten.
[Who or what would not soon forget?]

-continued

That is the kind of scrutiny each gift received before it was approved.
[Who or what?]
Instead, we're using SharePoint workspaces, intranet sites where documents and other data can be centrally located and accessed.
[Who or what can centrally locate and access?]
a tremendous amount of local research has been done on African agriculture.
[Who or what has?]
A distinction must also be made between conflicts and hassles.
[Who or what must also make?]
He had borne the Allied cause on his shoulders during the war's first, flickering hours, and this would not soon be forgotten.
[Who or what would not soon forget?]
That is the kind of scrutiny each gift received before it was approved.
[Who or what approved?]
Instead, we're using SharePoint workspaces, intranet sites where documents and other data can be centrally located and accessed.
[Who or what can centrally locate and access?]
a tremendous amount of local research has been done on African agriculture.
[Who or what has done?]
A distinction must also be made between conflicts and hassles.
[Who or what must also make a distinction?]
He had borne the Allied cause on his shoulders during the war's first, flickering hours, and this would not soon be forgotten.
[Who or what would not soon forget this?]
That is the kind of scrutiny each gift received before it was approved.
[Who or what approved it?]
Instead, we're using SharePoint workspaces, intranet sites where documents and other data can be centrally located and accessed.
[Who or what can centrally locate and access documents and other data?]
a tremendous amount of local research has been done on African agriculture.
[Who or what has done a tremendous amount of local research?]
A distinction must also be made between conflicts and hassles.
[Who or what must also make a distinction?] [[*politicians*]]
He had borne the Allied cause on his shoulders during the war's first, flickering hours, and this would not soon be forgotten.
[Who or what would not soon forget this? [[*his men*]]
That is the kind of scrutiny each gift received before it was approved.
[Who or what approved it? [[*our shipper*]]
Instead, we're using SharePoint workspaces, intranet sites where documents and other data can be centrally located and accessed.
[Who or what can centrally locate and access documents and other data?] [[*we*]]
a tremendous amount of local research has been done on African agriculture.
[Who or what has done a tremendous amount of local research?] [[*high school students*]]
A distinction must also be made between conflicts and hassles.
[*politicians* must also make a distinction?]
He had borne the Allied cause on his shoulders during the war's first, flickering hours, and this would not soon be forgotten.
[*his men* would not soon forget this?]
That is the kind of scrutiny each gift received before it was approved.
[*our shipper* approved it?]
Instead, we're using SharePoint workspaces, intranet sites where documents and other data can be centrally located and accessed.
[*we* can centrally locate and access documents and other data?]
a tremendous amount of local research has been done on African agriculture.
[*high school students* has done a tremendous amount of local research?]
A distinction must also be made between conflicts and hassles.
[*politicians* must also make a distinction]
He had borne the Allied cause on his shoulders during the war's first, flickering hours, and this would not soon be forgotten.
[*his men* would not soon forget this]
That is the kind of scrutiny each gift received before it was approved.
[*our shipper* approved it]
Instead, we're using SharePoint workspaces, intranet sites where documents and other data can be centrally located and accessed.
[*we* can centrally locate and access documents and other data]
a tremendous amount of local research has been done on African agriculture.
[*high school students* has done a tremendous amount of local research]
between conflicts and hassles.
[*politicians* must also make a distinction]

-continued

He had borne the Allied cause on his shoulders during the war's first, flickering hours, and .
[*his men* would not soon forget this]
That is the kind of scrutiny each gift received before .
[*our shipper* approved it]
Instead, we're using SharePoint workspaces, intranet sites where .
[*we* can centrally locate and access documents and other data]
on African agriculture.
[*high school students* has done a tremendous amount of local research]
  *politicians* must also make a distinction between conflicts and hassles.
  He had borne the Allied cause on his shoulders during the war's first, flickering hours, and *his men* would not soon forget this.
  That is the kind of scrutiny each gift received before *our shipper approved it*.
  Instead, we're using SharePoint workspaces, intranet sites where we can centrally locate and access documents and other data.
  *high school students* has done a tremendous amount of local research on African agriculture.
  politicians must also make a distinction between conflicts and hassles.
  He had borne the Allied cause on his shoulders during the war's first, flickering hours, and his men would not soon forget this.
  That is the kind of scrutiny each gift received before our shipper approved it.
  Instead, we're using SharePoint workspaces, intranet sites where we can centrally locate and access documents and other data.
  high school students have done a tremendous amount of local research on African agriculture.
  Politicians must also make a distinction between conflicts and hassles.
  He had borne the Allied cause on his shoulders during the war's first, flickering hours, and his men would not soon forget this.
  That is the kind of scrutiny each gift received before our shipper approved it.
  Instead, we're using SharePoint workspaces, intranet sites where we can centrally locate and access documents and other data.
  High school students have done a tremendous amount of local research on African agriculture.

K. "To be" Verb—"being"—Past Participle

This rule can be implemented in connection with other rules that search for "to be" verbs. Thus, the "to be" verb can be considered a sign for this rule. This rule can begin at the step numbered, "76" below, after other rules have been considered and rejected or considered and applied. Thus, other steps can be pre-cursor steps to this rule (e.g., 1-3, 6-11), in some embodiments, as indicated.

(1) system searches for "to be" verb
(2) is "to be" verb followed immediately by "required"?
(3) if yes, is "to" found in the next two words?
6. [referring to the question posed in Step 2] if no, is "to be" verb followed by "involved," "engaged," or "dedicated?"
7. if yes, system ignores
8. [referring to the question posed in Step 6], if no, is "to be" verb followed by infinitive?
9. if yes, system ignores
10. [referring to the question posed in Step 8] if no, is "to be" verb followed by past participle?
11. if yes, is past participle followed by "by"?
76. [referring to the question posed in Step 10], if no, is "to be" verb followed by "being"?
77. if yes, is "being" followed by past participle?
78. if yes, system continues with Steps 60 through 64
79. system adds the "to be" verb
80. system adds the adverbs in "to be" verb unit
81. system adds present participle form of past participle
82. system continues with Steps 69 through 75

In some embodiments, the system searches for a "to be" verb and determines if the "to be" verb is followed immediately by the word "required." If the "to be" verb is followed immediately by the word "required," then the system determines if the word "to" is found within the next two words. If, however, the "to be" verb is not followed immediately by the word "required," then the system determines if the "to be" verb is followed by the word "involved." If the "to be" verb is followed by the word "involved," the word "engaged," or the word "dedicated," then the system ignores the phrase. If, however, the "to be" verb is not followed by the word "involved," then the system determines if the "to be" verb is followed by an infinitive. If the "to be" verb is followed by an infinitive, then the system ignores the phrase. If the "to be" verb is not followed by an infinitive, then the system determines if the "to be" verb is followed by a past participle. If the "to be" verb is followed by a past participle, the system determines if the past participle is followed by the word "by." If, however, the "to be" verb is not followed by a past participle, then the system determines if the "to be" verb is followed by the word "being." If the "to be" verb is followed by the word "being," then the system determines if the word "being" is followed by a past participle. If the word "being" is followed by a past participle, then the system highlights the sentence and prompts the user: "This sentence is passive; would you like to make it active?" The user will select "Yes" or "No." If the user selects "No," then the system will ignore the phrase. If the user selects "Yes," then the system forms a question, beginning "Who or what." Then the system adds the "to be" verb, adds the adverbs in the "to be" verb unit, adds the present participle form of the past participle, and, using the noun that forms the object, the system finishes the question. The user answers the question by typing the actor, and the system responds by replacing "Who or what" with the typed actor, removing the question mark, deleting words that form the passive part of the sentence, and placing a new active version where the system deleted the passive part of the sentence. At this juncture, the system matches the verb number with the number of noun or nouns and capitalizes or recapitalizes as appropriate. The "to be" verb—"being"—past participle rule is illustrated in Example 11 below.

Example 11

In the meantime, the clinic is being built and the school is being expanded.
After the G8, on to Ghana, where much of the interesting work is being done.
As Kohn was being interviewed, the newly adopted dog sat loyally next to her new owner.
In the meantime, the clinic is being built and the school is being expanded.
After the G8, on to Ghana, where much of the interesting work is being done.
As Kohn was being interviewed, the newly adopted dog sat loyally next to her new owner.
In the meantime, the clinic is being built and the school is being expanded.
After the G8, on to Ghana, where much of the interesting work is being done.
As Kohn was being interviewed, the newly adopted dog sat loyally next to her new owner.
In the meantime, the clinic is being built and the school is being expanded.
[Who or what?]
[Who or what?]
After the G8, on to Ghana, where much of the interesting work is being done.
[Who or what?]
As Kohn was being interviewed, the newly adopted dog sat loyally next to her new owner.
[Who or what?]
In the meantime, the clinic is being built and the school is being expanded.
[Who or what is?]

-continued

[Who or what is?]
        After the G8, on to Ghana, where much of the interesting work is being done.
    [Who or what is?]
        As Kohn was being interviewed, the newly adopted dog sat loyally next to her new owner.
    [Who or what was?]
        In the meantime, the clinic is being built and the school is being expanded.
    [Who or what is building the clinic?]
    [Who or what is expanding the school?]
        After the G8, on to Ghana, where much of the interesting work is being done.
    [Who or what is doing much of the interesting work?]
        As Kohn was being interviewed, the newly adopted dog sat loyally next to her new owner.
    [Who or what was interviewing Kohn?]
        In the meantime, the clinic is being built and the school is being expanded.
    [Who or what is building the clinic? [[*the locals*]]
    [Who or what is expanding the school? [[*the locals*]]
        After the G8, on to Ghana, where much of the interesting work is being done.
    [Who or what is doing much of the interesting work? [[*the UN*]]
        As Kohn was being interviewed, the newly adopted dog sat loyally next to her new owner.
    [Who or what was interviewing Kohn? [[*I*]]
        In the meantime, the clinic is being built and the school is being expanded.
    [*the locals* is building the clinic?]
    [*the locals* is expanding the school?]
        After the G8, on to Ghana, where much of the interesting work is being done.
    [*the UN* is doing much of the interesting work?]
        As Kohn was being interviewed, the newly adopted dog sat loyally next to her new owner.
    [*I* was interviewing Kohn?]
        In the meantime, the clinic is being built and the school is being expanded.
    [*the locals* is building the clinic]
    [*the locals* is expanding the school]
        After the G8, on to Ghana, where much of the interesting work is being done.
    [*the UN* is doing much of the interesting work]
        As Kohn was being interviewed, the newly adopted dog sat loyally next to her new owner.
    [*I* was interviewing Kohn]
        In the meantime, and.
    [the locals is building the clinic]
    [the locals is expanding the school]
        After the G8, on to Ghana, where.
    [the UN is doing much of the interesting work]
        As, the newly adopted dog sat loyally next to her new owner.
    [I was interviewing Kohn]
        In the meantime, the locals is building the clinic and the locals is expanding the school.
        After the G8, on to Ghana, where the UN is doing much of the interesting work.
        As I was interviewing Kohn, the newly adopted dog sat loyally next to her new owner.
        In the meantime, the locals is building the clinic and the locals is expanding the school.
        After the G8, on to Ghana, where the UN is doing much of the interesting work.
        As I was interviewing Kohn, the newly adopted dog sat loyally next to her new owner.
        In the meantime, the locals are building the clinic and the locals are expanding the school.
        After the G8, on to Ghana, where the UN is doing much of the interesting work.
        As I was interviewing Kohn, the newly adopted dog sat loyally next to her new owner.

II. Passive Voice

A. First Passive Voice

In some embodiments, the system searches for signs such as "am," "is," "was," "were," "are," "been," or "be." Next, the system determines whether the word following the sign is a past participle (from a pool of past participles.) If the word is not a past participle from the pool, the system queries if the word is an adverb from the pool of adverbs or a negative from the pool of negatives. If the answer is yes, the system then determines whether the adverb or negative is followed by a past participle from the pool. If it is, then the adverb or the negative becomes part of the past participle as the system turns the sentence active (see, e.g., sub-rules A-E of section I regarding passive voice, above). Thereafter, the system determines if the deleted "to be" verb is a present tense verb. If it is, then the past participle is changed to the present tense. The first passive voice rule is illustrated in Example 12 below.

Example 12

| |
|---|
| The issue of fraud is rarely raised by the defendant. |
| The issue of fraud is rarely raised by the defendant. |
| The issue of fraud is rarely raised by the defendant. |
| The issue of fraud is never raised by the defendant. |
| The issue of fraud is never raised by the defendant. |
| The defendant never raised the issue of fraud. |
| The defendant rarely raised the issue of fraud. |
| The defendant rarely raises the issue of fraud. |

B. Second Passive Voice

In some embodiments, the system searches for signs, such as "am," "is," "was," "were," "are," "been," or "be." Then the system determines if the word following the "to be" verb is a past participle from the pool. If it is not, the system queries: "Is the following word an adverb from the pool or negative from the pool followed by a past participle from the pool?" If the word following the "to be" verb is a negative followed by a past participle, then the system turns the sentence active (see, e.g., sub-rules A-E of section I regarding passive voice, above). Then, the system determines if the deleted "to be" verb is present tense or past tense. If the deleted verb was in the present tense, then the system determines if the actor is a third person singular.

If the actor is a third person singular, then the system adds the word "does" just before the word "not" and changes the past participle to present tense, usually by dropping "ed" or "ded." If the deleted verb was in the present tense, however, but the actor is not third person singular, the system will add "do" just before "not" and will change the past participle to present tense. If the deleted verb was in the past tense with an actor who was singular or plural, the system adds the word "did" in front of "not" and changes the past participle to present tense. The second passive voice rule is illustrated in Example 13 below.

Example 13

| |
|---|
| The issue of fraud is not raised by the defendant. |
| The defendant not raised the issue of fraud. |
| The defendant not raised the issue of fraud. |
| The defendant does not raise the issue of fraud. |
| The defendants do not raise the issue of fraud. |
| The defendants did not raise the issue of fraud. |
| The defendant did not raise the issue of fraud. |
| The defendant did not raise the issue of fraud. |

C. Third Passive Voice

In some embodiments, the system searches for the "to be" verb sign, such as "am," "is," "was," "were," "are," "been," or "be." Second, the system determines if the word following that "to be" verb is a past participle (e.g., from a pool of past participles). If it is not, then the system determines if the following word is an adverb from an adverb pool (see Appendix C in U.S. Provisional Patent Application No. 60/825,218, filed Sep. 11, 2006, which is hereby incorporated by reference for all disclosure relating to Appendix C thereof) or a negative from a pool. If it is not, the system determines if the following word is "being." If the word is "being," then the system queries if "being" is followed by a past participle from the pool of past participles. If the system determines that the word following "being" is a past participle from the pool, then the system turns the sentence active (see, e.g., sub-rules A-E of section I regarding passive voice, above). Then, with "to be" verb, word "being," past participle and object and actor units identified, the system deletes the word "being" and the preposition, but keeps the "to be" verb.

At this point, the system turns the past participle into an "ing" word. Then the system moves the object noun unit to follow immediately after the new "ing" word. The system then moves the actor noun unit to precede the new "ing" word. Then, the system determines if the actor noun unit is singular or plural and changes the "number" of the corresponding "to be" verbs to agree with the actor noun unit. Finally, the system punctuates appropriately. The third passive voice rule is illustrated in Example 14 below.

Example 14

---
The pyramid <u>was</u> being designed by Egyptian architects.
The pyramid <u>was being</u> designed by Egyptian architects.
The pyramid <u>was being designed</u> by Egyptian architects.
The pyramid was *being* designed *by* <u>Egyptian</u> architects.
<u>The</u> pyramid was designed <u>Egyptian</u> architects.
<u>The</u> pyramid was design<u>ing</u> Egyptian architects.
was designing The pyramid Egyptian architects.
Egyptian architects was designing The pyramid.
Egyptian architects <u>were</u> designing the pyramid.
Egyptian architects were designing the pyramid.
---

D. "This" or "these"

In some embodiments, the system searches for a "to be" verb, and upon finding one, determines if the "to be" verb is preceded by "this" or "these." If so, the system determines whether the "to be" verb is followed by a noun unit. If so, the system determines whether the noun unit is followed immediately by another noun unit. If so, the system determines whether the second noun unit is followed immediately by a verb unit. If so, the system deletes "to be" verb and any article preceding the first noun unit. The system then moves the second noun unit and verb unit to a position immediately before "[T]hese" or "[T]his". The system then capitalizes. This rule is illustrated below:

---
*These* are words no good writer would use.
*This* is an employee we can't do without.
*These* are <u>words</u> no good writer would use.
*This* is <u>an employee</u> we can't do without.
*These* are <u>words</u> [no good writer] would use.
*This* is <u>an employee</u> [we] can't do without.
*These* are <u>words</u> [no good writer] {would use}.
*This* is <u>an employee</u> [we] {can't do without}.
*These* <u>words</u> [no good writer] {would use}.
*This* <u>employee</u> [we] {can't do without}.
[no good writer] {would use}*These* <u>words.</u>
[we] {can't do without}*This* <u>employee.</u>
---

No good writer would use these words.
We can't do without this employee.

III. Nominalization Rule

A. First Nominalization

In some embodiments, the system searches for words ending in "ion," "ions," "al," "ant," "ance," "ancy," "ent," "enc," "ency," "ity," "ing," "sis," "ise," and "ure." After finding one of those words, the system tries to match the word to the pool of false positive nominalizations. False positive nominalizations are illustrated below in Table 2. If the system finds a match in the false positive pool, it will ignore the word. If, however, the system finds no match in the false positive pool, it determines if the word preceding the nominalization is an adjective from an adjective pool. (See Appendix D in U.S. Provisional Patent Application No. 60/825,218, filed Sep. 11, 2006, which is hereby incorporated by reference for all disclosure relating to Appendix D thereof). If the system finds a match, it then tries to match the nominalization and the adjective to the second false positive pool, something that would be akin to "like an important decision." If the system finds a match, then it ignores the two words. If the system finds no match, however, it returns to the step later.

TABLE 2

| Example Nominalization False Positives | |
|---|---|
| sophistication | nation |
| ammunition | potion |
| foundation | vision |
| notion | premonition |
| lotion | reputation |
| section | privation |
| commotion | tension |
| excursion | circumstance |
| locomotion | defence |
| fence | defense |
| proposal | flagrant |

If the system finds a match in the false positive pool, it will ignore the words.

If the system finds no match, it searches the first four words preceding the nominalization for a "to be" verb or verb from a verb pool (which will often be "make," "take," "cause," "reach," "have," "effect," and "engage" and their past tense and third person forms). For additional verbs in a verb pool, see Appendix A in U.S. Provisional Patent Application No. 60/825,218, filed Sep. 11, 2006, which is hereby incorporated by reference for all disclosure relating to Appendix A thereof. If more than one of these verbs precedes the nominalization, the system chooses the verb closest to the nominalization. If the system finds the verb, then the system will delete the verb plus any article between the verb and the nominalization, or prompt the user to do so. If the system additionally finds the word "in" between the verb and the nominalization that it has just deleted, it will also delete the word "in." If the system finds the word "of" immediately following the nominalization it has just deleted, it will also delete the word "of."

At this point, the system will determine the tense of the deleted verb. The system will then match the tense of the deleted verb and turn a nominalization not modified by an adjective into its verb form. If the nominalization is modified by an adjective and there was no match found in the second false positive pool, the system then tries to match the nominalization and the adjective to the true positive pool (like immediate termination). If the system finds a match, it turns the nominalization into its verb form and the adjective into an adverb form (like immediately terminated). If the system, however, finds no match, the system will still turn the nominalization into its verb form and the adjective into the adverb form, then highlight both the adverb and the verb, prompting the user, "Does this make sense, or would you like to leave it in the original wording?"

While an exhaustive list would be very long, an example nominalization word pool can comprise words such as the following:

TABLE 3

Example Nominalization True Positives

| Nominalization | Corresponding Verb |
|---|---|
| agreement | agree |
| circumvention | circumvent |
| contention | contend |
| intention | intend |
| pertinence | pertain |
| requirement | require |
| suspicion | suspect |

The first nominalization sub-rule is illustrated in Example 15 below.

Example 15

We should reject the proposal because it is a flagrant circumvention of established rules.
We stand in agreement that this section has pertinence to any contract.
We should reject the proposal because it is a flagrant circumvent<u>ion</u> of established rules.
We stand in agreem<u>ent</u> that this section has pertin<u>ence</u> to any contract.
We should reject the proposal because it is a flagrant <u>circumvention</u> of established rules.
We stand in <u>agreement</u> that this section has <u>pertinence</u> to any contract.
We should reject the proposal because it is a <u>flagrant circumvention</u> of established rules.
We stand in <u>agreement</u> that this section has <u>pertinence</u> to any contract.
We should reject the proposal because it <u>is</u> a <u>flagrant circumvention</u> of established rules.
We <u>stand</u> in <u>agreement</u> that this section <u>has</u> <u>pertinence</u> to any contract.
We should reject the proposal because it a flagrant circumvention of established rules.
We in agreement that this section pertinence to any contract.
We should reject the proposal because it a <u>flagrant circumvention of</u> established rules.
We <u>in</u> <u>agreement</u> that this section <u>pertinence</u> to any contract.
We should reject the proposal because it <u>flagrant circumvention</u> established rules.
We <u>agreement</u> that this section <u>pertinence</u> to any contract.
We should reject the proposal because it <u>flagrant circumvention</u> established rules.
We <u>agree</u> that this section <u>pertains</u> to any contract.
We should reject the proposal because it flagrant circumvent<u>s</u> established rules.
We agree that this section pertains to any contract.
We should reject the proposal because it flagrant<u>ly</u> circumvent<u>s</u> established rules.
We agree that this section pertains to any contract.
We should reject the proposal because it flagrantly circumvents established rules.
We agree that this section pertains to any contract.

B. Second Nominalization Sub-Rule

In some embodiments, when the system has completed steps to convert a nominalization to a verb, the system then searches for any word remaining between the deleted verb and the nominalization. If the system finds a word between the deleted verb and nominalization, it deletes or diminishes that word (e.g., by reducing the brightness of the word on the screen, changing it to a relatively smaller font, changing its color, reducing its loudness, etc.). If the system diminishes the word, a user can be prompted to decide if the word should be deleted. The second verb unit rule is illustrated in Example 16 below.

Example 16

The manager may have some suspicion with respect to the customer's honesty.
Downstream water quality has as a requirement that we treat the sewage first.
The manager may <u>have</u> some <u>suspicion</u> <u>with respect</u> to the customer's honesty.
Downstream water quality <u>has</u> as <u>a</u> <u>requirement</u> that we treat the sewage first.
The manager may some <u>suspect</u> the customer's honesty.
Downstream water quality as <u>requires</u> that we treat the sewage first.
The manager may some <u>suspect</u> the customer's honesty.
Downstream water quality <u>as</u> <u>requires</u> we treat the sewage first.
The manager may <u>suspect</u> the customer's honesty.
Downstream water quality <u>requires</u> that we treat the sewage first.

C. Third Nominalization Sub-Rule

In some embodiments, after the system has completed the first nominalization rule, the system then determines if the word "it" appears within the first six words preceding the nominalization and if the nominalization is modified by a possessive pronoun or possessive noun. The system then replaces the word "it" with the subjective form of the possessive pronoun or possessive noun. If the word "it" appears within a certain number of (e.g., the first six) words preceding the nominalization and the nominalization is immediately followed by a prepositional phrase, the system preferably replaces the word "it" with the object of the preposition and its article and adjectives. The system can then delete the prepositional phrase. At this point the system capitalizes and uncapitalizes the sentence appropriately. The system then determines if the possessive noun or pronoun is in the third person and the system will match the verb form of the nominalization. The third verb unit rule is illustrated in Example 17 below.

Example 17

If it is your intention to cause delay, we will oppose you.
It was the contention of the weaker players that the owners were being unfair.
If it is your <u>intention</u> to cause delay, we will oppose you.
It was the <u>contention</u> of the weaker players that the owners were being unfair.
If it <u>is</u> your <u>intention</u> to cause delay, we will oppose you.
It <u>was</u> the <u>contention</u> of the weaker players that the owners were being unfair.
If it is your <u>intend</u> to cause delay, we will oppose you.
It <u>contended</u> of the weaker players that the owners were being unfair.
If <u>it</u> your <u>intend</u> to cause delay, we will oppose you.
It <u>contended</u> of the weaker players that the owners were being unfair.
If <u>it</u> <u>your</u> <u>intend</u> to cause delay, we will oppose you.
It <u>contended</u> of the weaker players that the owners were being unfair.
If <u>you</u> <u>intend</u> to cause delay, we will oppose you.
It <u>contended</u> of the weaker players that the owners were being unfair.
If <u>you</u> <u>intend</u> to cause delay, we will oppose you.
It <u>contended</u> <u>of the weaker players</u> that the owners were being unfair.

If you intend to cause delay, we will oppose you.
the weaker players contended of that the owners were being unfair.
If you intend to cause delay, we will oppose you.
the weaker players contended that the owners were being unfair.
If you intend to cause delay, we will oppose you.
The weaker players contended that the owners were being unfair.
If it is his intention to cause delay, we will oppose him.
The weaker players contended that the owners were being unfair.
If it is his intention to cause delay, we will oppose him.
The weaker players contended that the owners were being unfair.
If he intends to cause delay, we will oppose him.
The weaker players contended that the owners were being unfair.
If he intends to cause delay, we will oppose him.
The weaker players contended that the owners were being unfair.

IV. The Noun Unit and Verb Unit Rules

A. First Noun Unit Sub-Rule

In some embodiments, a noun unit is defined as a noun plus the preceding article and adjectives and adverbs modifying the adjectives and immediately following the words "of," "with," or "in," and the object noun unit.

The first noun unit sub-rule is illustrated in Example 18:

Example 18

There was no explanation beyond the highly-rumored, unproved possibility of cold drafts in the gallery over the weekend.
There are a lot of men who feel that our personal value is defined by our net worth.
There is an abundance of interesting facts relating to all our major diseases.
If nothing was done by political leaders in the Middle East, things would get worse.
There was no explanation beyond the highly-rumored, unproved possibility of cold drafts in the gallery over the weekend.
There are a lot of men who feel that our personal value is defined by our net worth.
There is an abundance of interesting facts relating to all our major diseases.
If nothing was done by political leaders in the Middle East, things would get worse.
There was no explanation beyond *the* highly-rumored, unproved possibility of cold drafts in *the* gallery over *the* weekend.
There are *a* lot of men who feel that our personal value is defined by our net worth.
There is *an* abundance of interesting facts relating to all our major diseases.
If nothing was done by political leaders in *the* Middle East, things would get worse.
There was no explanation beyond *the* highly-rumored, unproved possibility of cold drafts in *the* gallery over *the* weekend.
There are *a* lot of men who feel that our personal value is defined by our net worth.
There is *an* abundance of interesting facts relating to all our major diseases.
If nothing was done by political leaders in *the* Middle East, things would get worse.
There was no explanation beyond *the* highly-rumored, unproved possibility of cold drafts in *the* gallery over *the* weekend.
There are *a* lot of men who feel that our personal value is defined by our net worth.
There is *an* abundance of interesting facts relating to all our major diseases.
If nothing was done by political leaders in *the* Middle East, things would get worse.
There was no explanation beyond *the* highly-rumored, unproved possibility *of* cold drafts in *the* gallery over *the* weekend.
There are *a* lot *of* men who feel that our personal value is defined by our net worth.
There is *an* abundance *of* interesting facts relating to all our major diseases.
If nothing was done by political leaders *in* *the* Middle East, things would get worse.

Thus, the noun units are as indicated:

There was no explanation beyond the highly-rumored, unproved possibility of cold drafts in the gallery over the weekend.
There are a lot of men who feel that our personal value is defined by our net worth.
There is an abundance of interesting facts relating to all our major diseases.
If nothing was done by political leaders in the Middle East, things would get worse.

B. Second Noun Unit Sub-Rule

In some embodiments, a noun unit may also be a string of noun units in a series. This string of noun units in a series may be separated by commas and the word "and" or the word "or". Furthermore, a "noun unit" may be a group of more than one noun unit. Thus, a noun unit may further comprise: 1) any word or group of words immediately following a "noun unit" (as defined above); 2) set off by commas; and 3) composed entirely of another "noun unit" (as defined above).

The second noun unit rule is illustrated in Example 19:

Example 19

There were toxic levels of mercury found in the lakes, the rivers, the sound, and the ocean.
Seattle, Portland, or San Francisco will have openings.
There were toxic levels of mercury found in the lakes, the rivers, the sound, and the ocean.
Seattle, Portland, or San Francisco will have openings.
There were toxic levels of mercury found in the lakes, the rivers, the sound, and the ocean.
Seattle, Portland, or San Francisco will have openings.
There were toxic levels of mercury found in the lakes, the rivers, the sound, and the ocean.
Seattle, Portland, or San Francisco will have openings.

C. Verb Unit Sub-Rule

As defined herein, a verb unit includes the verb plus preceding helping verbs including words like "be," "do," "may," "have," "will," "have," "shall," and all of their tenses and combination for example, "will have been." The verb unit also includes all preceding adverbs and their following adverbs. Under the "there" rule, all helping verbs and adverbs remain after the system deletes "there," "to be" verbs, the word "that" and prepositions. Under the "there" rule, if a user is asked to insert a verb in a blank, the helping verbs and the adverbs will immediately precede the blank. The fourth verb unit rule is illustrated in Examples 20 and 21 below.

Example 20

Two men so alike in their features, they
might have been twins swiftly
rode through the night.
He settled comfortably against the wood
and the fish swam steadily and
the boat moved slowly through the dark water.
Two men so alike in their features, they
might have been twins swiftly
rode through the night.
He settled comfortably against the wood
and the fish swam steadily and
the boat moved slowly through the dark water.

Two men so alike in their features, they
might have been twins swiftly
rode through the night.
   He settled comfortably against the wood
and the fish swam steadily and
the boat moved slowly through the dark water.
   Two men so alike in their features,
they might have been twins swiftly
rode through the night.
   He settled comfortably against the
wood and the fish swam steadily and
the boat moved slowly through the dark water.
   Two men so alike in their features,
they might have been twins swiftly
rode through the night.
   He settled comfortably against the
wood and the fish swam steadily and
the boat moved slowly through the dark water.

Example 21

There rarely have been so many banks that let you manage your own account.
There has already been a string of hopeful political events in the last year.
There rarely have been so many banks that let you manage your own account.
There has already been a string of hopeful political events in the last year.
There rarely have been so many banks that let you manage your own account.
There has already been a string of hopeful political events in the last year.
   rarely have been so many banks that let you manage
   your own account.
   has already been a string of hopeful political events in the past year.
   rarely have so many banks that let you manage your own account.
   has already a string of hopeful political events in the past year.
   rarely have been so many banks let you manage your own account.
   has already been a string of hopeful political events the past year.
   rarely have been so many banks let you manage your own account.
   has already a string of hopeful political events the past year.
   rarely have so many banks that let you manage your own account.
   the past year has already _____ a string of hopeful
   political events.
Rarely have so many banks let you manage your own account.
The past year has already brought a string of hopeful political events.

V "There" Rule
  A. First "there" Sub-Rule
  In some embodiments, the system searches for the word "there." The system then determines if the word following "there" is a "to be" verb. If it is not, then the system determines if the word following "there" is a preposition. If it is a preposition, then the system will delete "[T]here." The first "there" rule is illustrated in Example 22 below.

Example 22

There in the woods stood a fawn.
There beside the cookie jar sat two brownies.
He was just standing there in the doorway.
There in the woods stood a fawn.
There beside the cookie jar sat two brownies.
He was just standing there in the doorway.
There in the woods stood a fawn.
There beside the cookie jar sat two brownies.

He was just standing there in the doorway.
in the woods stood a fawn.
beside the cookie jar sat two brownies.
He was just standing in the doorway.
In the woods stood a fawn.
Beside the cookie jar sat two brownies.
He was just standing in the doorway.

B. Second "there" Sub-Rule
  If the word following "[T]here" is a "to be" verb, then the system will identify the noun unit immediately following the "to be" verb. At this point the system will determine if the word "that" (or "who" or "which") follows immediately after the noun unit. If it does, then the system queries if the word following "that" (or "who" or "which") is a noun from the noun pool (see Appendix B in U.S. Provisional Patent Application No. 60/825,218, filed Sep. 11, 2006, which is hereby incorporated by reference for all disclosure relating to Appendix B thereof). If the answer is yes, then the system deletes "there" and the "to be" verb. The system then inserts an underlying space in front of "that" and the system prompts the user: "What verb would you like to insert here?" The user then types in the verb. The system can then apply a "that" rule. For example, the "that" rule can be applied to determine if the word "that" automatically remains or automatically is deleted, or the system can prompt the user: "Do you want to keep 'that'?" The user at this point indicates a "yes" or a "no" and the system capitalizes accordingly.
  If the word following "that" is not a noun from the noun pool, the system queries whether it is a verb from the verb pool. If it is a verb from the verb pool (See Appendix A in U.S. Provisional Patent Application No. 60/825,218, filed Sep. 11, 2006, which is hereby incorporated by reference for all disclosure relating to Appendix A thereof), then the system deletes "there," the "to be" verb, and the word "that." At this point, the system will capitalize and prompt the user: "Do you like this better?" If the user at this point says, "No," the system will replace the edited sentence with the original. The second "there" rule is illustrated in Example 23 below.

Example 23

There are several syntactic devices that let you manage where you locate new units.
There are three principles that help to resolve this issue.
There are pieces of evidence that we have had it the wrong way round.
There are several syntactic devices that let you manage where you locate new units.
There are three principles that help to resolve this issue.
There are pieces of evidence that we have had it the wrong way round.
There are several syntactic devices that let you manage where you locate new units.
There are three principles that help to resolve this issue.
There are pieces of evidence that we have had it the wrong way round.
There are several syntactic devices that let you manage where you locate new units.
There are three principles that help to resolve this issue.
There are pieces of evidence that we have had it the wrong way round.
There are several syntactic devices that let you manage where you locate new units.
There are three principles that help to resolve this issue.
There are pieces of evidence that we have had it the wrong way round.

-continued

There are several syntactic devices that let you manage where you locate new units.
There are three principles that help to resolve this issue.
There are pieces of evidence that we have had it the wrong way round.
There are several syntactic devices that let you manage where you locate new units.
There are three principles that help to resolve this issue.
pieces of evidence that we have had it the wrong way round.
There are several syntactic devices that let you manage where you locate new units.
There are three principles that help to resolve this issue.
pieces of evidence _____ that we have had it the wrong way round.
There are several syntactic devices that let you manage where you locate new units.
There are three principles that help to resolve this issue.
pieces of evidence suggest that we have had it the wrong way round.
There are several syntactic devices that let you manage where you locate new units.
There are three principles that help to resolve this issue.
Pieces of evidence suggest we have had it the wrong way round.
There are several syntactic devices that let you manage where you locate new units.
There are three principles that help to resolve this issue.
Pieces of evidence suggest that we have had it the wrong way round.
several syntactic devices let you manage where you locate new units.
three principles help to resolve this issue.
Pieces of evidence suggest that we have had it the wrong way round.
Several syntactic devices let you manage where you locate new units.
Three principles help to resolve this issue.
Pieces of evidence suggest we have had it the wrong way round.
There are several syntactic devices that let you manage where you locate new units.
There are three principles that help to resolve this issue.
Pieces of evidence suggest we have had it the wrong way round.

C. Third "there" Sub-Rule

In some embodiments, the system searches for the word "there" and determines if the following word is a "to be" verb. If it is, then the system identifies the noun unit immediately following the "to be" verb and queries: "Does the word 'that' (or 'who' or 'which') follow immediately after the noun unit. If it does not, then the system determines if the following word is a past participle. If it is, then the system determines if the word following the preposition is "by," "in," "from," "for," or "through?" If it is not, then the system deletes the word "there" and moves the "to be" verb to a position between the first noun unit and the past participle. At this point, the system will capitalize appropriately and prompt the user: "Do you like this better?" If the user says no, the system replaces the edited sentence with the original. If the user says yes, the system dims the "to be" verb and prompts the user: "Can you think of a better verb to go here?" If the user says no, the system "un-dims" the "to be" verb. If the user types a preferred verb, the system inserts that preferred verb.

If the word following the past participle is a preposition "by," "in," "from," "for," or "through," then the system identifies the noun unit that forms the object of the preposition. At this point, the system deletes "there," the "to be" verb, and the preposition. The system then will move the first noun unit to a position immediately after the participle, and the system will move the object noun unit to a position immediately before the participle and recapitalize appropriately. At this point, the system will prompt the user: "Do you like this better?" If the user says no, the system will replace the new sentence with the original.

The third "there" rule is illustrated in Example 24 below.

Example 24

There were a few good reasons offered by the court for denying punitive damages.
There were four grounds stated in the Perault case for ordering the involuntary partition.
There are balloons stapled to every post.
There were a few good reasons offered by the court for denying punitive damages.
There were four grounds stated in the Perault case for ordering the involuntary partition.
There are balloons stapled to every post.
There were a few good reasons offered by the court for denying punitive damages.
There were four grounds stated in the Perault case for ordering the involuntary partition.
There are balloons stapled to every post.
There were a few good reasons offered by the court for denying punitive damages.
There were four grounds stated in the Perault case for ordering the involuntary partition.
There are balloons stapled to every post.
There were a few good reasons offered by the court for denying punitive damages.
There were four grounds stated in the Perault case for ordering the involuntary partition.
Balloons are stapled to every post.
There were a few good reasons offered by the court for denying punitive damages.
There were four grounds stated in the Perault case for ordering the involuntary partition.
Balloons are stapled to every post.
There were a few good reasons offered by the court for denying punitive damages.
There were four grounds stated in the Perault case for ordering the involuntary partition.
Balloons are stapled to every post.
There were a few good reasons offered by the court for denying punitive damages.
There were four grounds stated in the Perault case for ordering the involuntary partition.
Balloons hang stapled to every post.
There were a few good reasons offered by the court for denying punitive damages.
There were four grounds stated in the Perault case for ordering the involuntary partition.
Balloons hang stapled to every post.
There were a few good reasons offered by the court for denying punitive damages.
There were four grounds stated in the Perault case for ordering the involuntary petition.
Balloons hang stapled to every post.
were a few good reasons offered by the court for denying punitive damages.
were four grounds stated in the Perault case for ordering the involuntary partition.
Balloons hang stapled to every post.
a few good reasons offered by the court for denying punitive damages.
four grounds stated in the Perault case for ordering the involuntary partition.
Balloons hang stapled to every post.
a few good reasons offered the court for denying punitive damages.
four grounds stated the Perault case for ordering the involuntary partition.
Balloons hang stapled to every post.
offered a few good reasons the court for denying punitive damages.
stated four grounds the Perault case for ordering the involuntary partition.
Balloons hang stapled to every post.
the court offered a few good reasons for denying punitive damages.
the Perault case stated four grounds for ordering the involuntary partition.
Balloons hang stapled to every post.
The court offered a few good reasons for denying punitive damages.
The Perault case stated four grounds for ordering the involuntary partition.
Balloons hang stapled to every post.

D. Fourth "there" Sub-Rule

In some embodiments, the system searches for the word "there." Second, the system determines if the word following "there" is a "to be" verb. If it is, then the system identifies a noun unit immediately following the "to be" verb, and queries: "Does the word 'that' (or 'who,' or 'which' or 'where') follow immediately after the noun unit?" If it does not, then the system determines if the following word is a past participle.

If the following word is not a past participle, then the system will determine if the following word is a preposition. If it is, then the system will identify the object noun unit of that preposition. At this point, the system will delete the words "there," the "to be" verb, and the preposition. The system moves the first noun unit to a position immediately following the object noun unit. The system will then insert an underlined space between the two units and prompt the user: "What verb would you like to insert here?" After the user types in a verb, the user has the opportunity to make additional changes. The system will then recapitalize accordingly. The fourth "there" rule is illustrated further in Example 25 below.

Example 25

---

There is no factual basis for the second cause of action.
Absent fraud, there is no way for plaintiff
to avoid the plain language of
the statute.
There are two errors in this report.
There are three misstatements of fact in appellant's brief.
There is no factual basis for the second cause of action.
Absent fraud, there is no way for plaintiff
to avoid the plain language of
the statute.
There are two errors in this report.
There are three misstatements of fact in appellant's brief.
There is no factual basis for the second cause of action.
Absent fraud, there is no way for plaintiff
to avoid the plain language of
the statute.
There are two errors in this report.
There are three misstatements of fact in appellant's brief.
There is no factual basis for the second cause of action.
Absent fraud, there is no way for plaintiff
to avoid the plain language of
the statute.
There are two errors in this report.
There are three misstatements of fact in appellant's brief.
is no factual basis for the second cause of action.
Absent fraud, is no way for plaintiff to
avoid the plain language of the
statute.
are two errors in this report.
are three misstatements of fact in appellant's brief.
no factual basis the second cause of action.
Absent fraud, no way plaintiff to avoid the plain language of the
statute.
two errors this report.
three misstatements of fact appellant's brief.
the second cause of action no factual basis.
Absent fraud, plaintiff no way to avoid the plain language of the
statute.
this report two errors.
appellant's brief three misstatements of fact.
the second cause of action _____ no factual basis.
Absent fraud, plaintiff _____ no way
to avoid the plain language of
the statute.
this report _____ two errors.
appellant's brief _____ three misstatements of fact.
the second cause of action has no factual basis.
Absent fraud, plaintiff has no way to
avoid the plain language of the -continued statute.
this report contains two errors.
appellant's brief contains three misstatements of fact.
the second cause of action has no factual basis.
Absent fraud, plaintiff has no way to
avoid the plain language of the
statute.
this report contains two errors.
appellant's brief contains three misstatements of fact.
the second cause of action has no factual basis.
Absent fraud, plaintiff cannot avoid the plain
language of the statute.
this report contains two errors.
appellant's brief contains three misstatements of fact.
The second cause of action has no factual basis.
Absent fraud, plaintiff cannot avoid the
plain language of the statute.
This report contains two errors.
Appellant's brief contains three misstatements of fact.

---

E. Fifth "there" Sub-Rule

After the system searches for the word "there" and determines that the following word is a "to be" verb, the system then will identify a noun unit immediately following the "to be" verb and determine if the word immediately following the noun unit is "that," "who," "which," or "where." If the word immediately following the noun unit is "who-" or "where," then the same rules applying to "that" as outlined in the subrules above will apply to the words "who" and "where." If that word is "which," then the system determines if a comma appears immediately before the "which." If it does, then the same rules applying to the word "that" apply to the word "which." The fifth "there" rule is illustrated in Example 26 below.

Example 26

---

There are a lot of men who feel that
our personal value is defined by
our net worth.
There is, for sure, not a lack of websites
which inadvertently contain
serious mistakes.
There are a lot of men who feel that
our personal value is defined by
our net worth.
There is, for sure, not a lack of websites
which inadvertently contain
serious mistakes.
There are a lot of men who feel that
our personal value is defined by
our net worth.
There is, for sure, not a lack of websites
which inadvertently contain
serious mistakes.
There are a lot of men who feel that our
personal value is defined by
our net worth.
There is, for sure, not a lack of websites
which inadvertently contain
serious mistakes.
a lot of men feel that our personal
value is defined by our net worth.
for sure, not a lack of websites inadvertently
contain serious mistakes.
a lot of men feel that our personal value
is defined by our net worth.
for sure, not a lack of websites inadvertently
contain serious mistakes.
a lot of men feel that our personal value
is defined by our net worth.

-continued

*not a lack of* websites inadvertently
contain serious mistakes.
<u>a lot of men</u> feel that our personal value
is defined by our net worth.
*many* websites inadvertently contain serious mistakes.
A lot of men feel that our personal
value is defined by our net worth.
Many websites inadvertently contain serious mistakes.

F. Sixth "there" Sub-Rule

In some embodiments, the system searches for the word "there" and determines if the word following "there" is a "to be" verb. If it is, then the system identifies a noun unit immediately following the "to be" verb and determines if the word "that" (or "who" or "which" or "where") follows immediately after the noun unit. If no word follows the noun unit, the system deletes the word "there" and the "to be" verb. After the noun unit, the system adds the word "exist," matching the number of the word "exist" to the noun. The system recapitalizes accordingly and prompts the user: "Do you like this better?" If the user says "No," then the system replaces the provisional new sentence with the original. If the user says "Yes," then the provisional new sentence permanently replaces the original sentence. The sixth "there" rule is illustrated in Example 27 below.

Example 27

There is no other source.
There <u>is</u> no other source.
There is <u>no other source</u>.
no other source.
no other source <u>exist</u>.
no other source exist<u>s</u>.
<u>No</u> other source exists.
There is no other source.

VI. It Rule

A. First "it" Sub-Rule

In some embodiments, the system searches for the word "it." The system then determines if the word "it" is part of a contraction or if a "to be" verb appears within the next five words. If yes, then the system determines if the word "that" (or who or which, etc.) follows the "to be" verb. If the word "that" follows the "to be" verb, then the system matches the phrase from "it" through "that" with the phrase in the "it" pool listed in Table 4 below, which includes many examples, but is not meant to be exhaustive.

TABLE 4

| Example "it" Pool | |
|---|---|
| It is said that | It is argued that |
| It was said that | It was argued that |
| It may be said that | It may be argued that |
| It must be said that | It must be argued that |
| It might be said that | It might be argued that |
| It should be said that | It should be argued that |
| It could be said that | It could be argued that |
| It will be said that | It will be argued that |
| It has been said that | It has been argued that |
| It bears saying that | It is remembered that |
| It bore saying that | It was remembered that |
| It is stated that | It may be remembered that |
| It was stated that | It must be remembered that |
| It may be stated that | It might be remembered that |

TABLE 4-continued

| Example "it" Pool | |
|---|---|
| It must be stated that | It should be remembered that |
| It might be stated that | It could be remembered that |
| It should be stated that | It will be remembered that |
| It could be stated that | It bears remembering that |
| It will be stated that | It bore remembering that |
| It has been stated that | It is appreciated that |
| It bears stating that | It was appreciated that |
| It bore stating that | It may be appreciated that |
| It is noted that | It must be appreciated that |
| It was noted that | It might be appreciated that |
| It may be noted that | It should be appreciated that |
| It must be noted that | It could be appreciated that |
| It might be noted that | It will be appreciated that |
| It should be noted that | It is likely that |
| It could be noted that | It was likely that |
| It will be noted that | It is most likely that |
| It has been noted that | It is more likely that |
| It bears noting that | It was most likely that |
| It bore noting that | It was more likely that |
| It is no secret that | It is recognized that |
| It was no secret that | It was recognized that |
| It may be no secret that | It may be recognized that |
| It might be no secret that | It must be recognized that |
| It must be no secret that | It might be recognized that |
| It should be no secret that | It should be recognized that |
| It could be no secret that | It could be recognized that |
| It will be no secret that | It will be recognized that |
| It has been no secret that | It has been recognized that |
| It comes as no secret that | It is axiomatic that |
| It came as no secret that | It was axiomatic that |
| It may come as no secret that | It should be axiomatic that |
| It might come as no secret that | It may be axiomatic that |
| It must come as no secret that | It is fair to say that |
| It could be that | It was fair to say that |
| It should be that | It is a must that |
| It may be that | It was a must that |
| It might be that | It is imperative that |
| It must be that | It is true that |
| It could have been that | It became apparent to me that |
| It should have been that | It was well-settled that |
| It may have been that | It is well-settled that |
| It might have been that | It must have been that |
| It seemed to me that | It would seem to me that |

If the system finds a match in the "it" pool, the system deletes all words from "it" through "that." If the system finds no match in the "it" pool, the system determines if all words between the "to be" verb and the word "that" are any combination of verbs (including participles, help verbs, and infinitives); adverbs; and adjectives. If the system determines that this condition is met, then the system deletes all words from "[I]t" through "that." The system then recapitalizes appropriately. The first "it" rule is illustrated in Example 28 below.

Example 28

It is known that Churchill often used
  photographs to help him compose
his paintings.
  It should be noted that the protagonists do not acknowledge the
inevitability of failure until that failure stares them in the face.
  It's entirely possible that we are on the verge of developing a proper
applied science, but it has to be said that we don't have one yet.
  <u>It</u> is known that Churchill often used
  photographs to help him compose
his paintings.
  <u>It</u> should be noted that the protagonists do not acknowledge the
inevitability of failure until that failure stares them in the face.
  <u>It's</u> entirely possible that we are on the verge of developing a proper
applied science, but it has to be said that we don't have one yet.

-continued

It is known that Churchill often used
photographs to help him compose
his paintings.
It should be noted that the protagonists do not acknowledge the
inevitability of failure until that failure stares them in the face.
It's entirely possible that we are on the verge of developing a proper
applied science, but it has to be said that we don't have one yet.
It is known that Churchill often used
photographs to help him compose
his paintings.
It should be noted that the protagonists do not acknowledge the
inevitability of failure until that failure stares them in the face.
It's entirely possible that we are on the verge of developing a proper
applied science, but it has to be said that we don't have one yet.
It is known that Churchill often used
photographs to help him compose
his paintings.
It should be noted that the protagonists do not acknowledge the
inevitability of failure until that failure stares them in the face.
It's entirely possible that we are on the verge of developing a proper
applied science, but it has to be said that we don't have one yet.
It is known that Churchill often used
photographs to help him compose
his paintings.
It should be noted that the protagonists do not acknowledge the
inevitability of failure until that failure stares them in the face.
It's entirely possible that we are on the verge of developing a proper
applied science, but it has to be said that we don't have one yet.
It is known that Churchill used
photographs to help him compose his
paintings.
the protagonists do not acknowledge the inevitability of failure until
that failure stares them in the face.
It's entirely possible that we are on the verge of developing a proper
applied science, but it has to be said that we don't have one yet.
It is *known* that Churchill used photographs to help him compose his
paintings.
the protagonists do not acknowledge the inevitability of failure until
that failure stares them in the face.
It's entirely possible that we are on the verge of developing a proper
applied science, but it *has to be* said that we don't have one yet.
It is known that Churchill used
photographs to help him compose his
paintings.
the protagonists do not acknowledge the inevitability of failure until
that failure stares them in the face.
It's entirely possible that we are on
the verge of developing a proper
applied science, but it has to be said that we don't have one yet.
Churchill often used photographs to help him compose his paintings.
the protagonists do not acknowledge the inevitability of failure until
that failure stares them in the face.
we are on the verge of developing a proper applied science, but we
don't have one yet.
Churchill often used photographs to help him compose his paintings.
The protagonists do not acknowledge the inevitability of failure until
that failure stares them in the face.
We are on the verge of developing a proper applied science, but we
don't have one yet.

B. Second "it" Sub-Rule

If the system determines that all words between the "to be" verb and the word "that" are verbs, adverbs, and adjectives, the verbs including past participles, helping verbs, and infinitives, the system then determines if two commas appear between the "to be" verb and the word "that." If two commas do appear, then the system deletes all the words from "it" through "that," except for the words between the two commas. At this point, the system capitalizes appropriately, keeping only the second comma. The second "it" rule is illustrated in Example 29 below.

Example 29

It is clear, even then, that Webster had an abundant capacity for
leadership.
It is clear, even then, that Webster had an abundant capacity for
leadership.
It is clear, even then, that Webster had an abundant capacity for
leadership.
, even then, Webster had an abundant capacity for leadership.
Even then, Webster had an abundant capacity for leadership.

C. Third "it" Sub-Rule

In some embodiments, the system searches for the word "it" and determines if the word "it" is part of a contraction or if a "to be" verb appears within the next five words after the word "it." If it does, then the system determines if the word "who" follows the "to be" verb. If it does, then the system deletes "it" and the "to be" verb and determines if the "who" appears immediately after a pronoun. If it does, then the system will ignore it. If the "who" does not appear immediately after a pronoun, then the system deletes "who" and recapitalizes accordingly. The third "it" rule is illustrated in Example 30 below.

Example 30

It was Frank Daniel who first formulated a deceptively simple
delineation of the basic dramatic circumstance.
It is their son who is reading for the first time.
It's those who strive to honor the indigenous who get our readers'
acclaim.
It was Frank Daniel who first formulated a deceptively simple
delineation of the basic dramatic circumstance.
It is their son who is reading for the first time.
It's those who strive to honor the indigenous who get our readers'
acclaim.
It was Frank Daniel who first formulated a deceptively simple
delineation of the basic dramatic circumstance.
It is their son who is reading for the first time.
It's those who strive to honor the indigenous who get our readers'
acclaim.
Frank Daniel who first formulated a deceptively simple delineation of
the basic dramatic circumstance.
their son who is reading for the first time.
those who strive to honor the indigenous who get our readers' acclaim.
Frank Daniel who first formulated a deceptively simple delineation of
the basic dramatic circumstance.
their son who is reading for the first time.
those who strive to honor the indigenous who get our readers' acclaim.
Frank Daniel who first formulated a deceptively simple delineation of
the basic dramatic circumstance.
their son who is reading for the first time.
those who strive to honor the indigenous who get our readers' acclaim.
Frank Daniel first formulated a deceptively simple delineation of the
basic dramatic circumstance.
their son is reading for the first time.
those who strive to honor the indigenous get our readers' acclaim.
Frank Daniel first formulated a deceptively simple delineation of the
basic dramatic circumstance.
Their son is reading for the first time.
Those who strive to honor the indigenous get our readers' acclaim.

D. Fourth "it" Sub-Rule

In some embodiments, the system searches for "it" and determines if "it" is part of a contraction or if a "to be" verb appears within the next five words after the word "it." If "Yes," then the system determines if the word "that" (or "who" or "which") follows the "to be" verb. If it does not, then the system determines if the word "who" follows the "to be" verb. If it does not, then the system determines if the "to be" verb is followed immediately by "not until" or "n't until." If "Yes," then the system determines if the word "that" appears between "until" and the end of the sentence. If it does, then the system deletes "it," the "to be" verb and converts "n't" to "not," if necessary.

The system ignores the word "that" if it appears between commas, in a prepositional phrase or after the first "that." The system will identify the past tense verb within three words following the word "that" and will convert the past tense verb to a first person present tense. At this point, the system has two options, both of which can be presented to the user. The first option it offers is to replace "that" with the word "did" and capitalize, creating a first provisional sentence to show to the user. In the second option, the system deletes the word "not" and the word "that" and inserts "did not" in front of the new present tense verb, and will present this second provisional sentence option to the user. Following either the first option or the second option, the system will move all the words following the position of "that" to a position immediately before the word "until" and will recapitalize accordingly. The fourth "it" rule is illustrated in Example 31 below.

Example 31

Groves had Du Pont make Teflon for the bomb, but it was not until 1960 that it coated pans and muffin tins.
It wasn't until later, when the show was absolutely blowing up and Evangeline was on the covers of all kinds of magazines, that I realized that I'd gotten my foot in the door.
Groves had Du Pont make Teflon for the bomb, but it *was not until* 1960 that it coated pans and muffin tins.
It was*n't until* later, when the show was absolutely blowing up and Evangeline was on the covers of all kinds of magazines, that I realized that I'd gotten my foot in the door.
Groves had Du Pont make Teflon for the bomb, but it *was not until* 1960 that it coated pans and muffin tins.
It was*n't until* later, when the show was absolutely blowing up and Evangeline was on the covers of all kinds of magazines, that I realized that I'd gotten my foot in the door.
Groves had Du Pont make Teflon for the bomb, but not until 1960 that it coated pans and muffin tins.
not until later, when the show was absolutely blowing up and Evangeline was on the covers of all kinds of magazines, that I realized that I'd gotten my foot in the door.
Groves had Du Pont make Teflon for the bomb, but not until 1960 that it coated pans and muffin tins.
not until later, when the show was absolutely blowing up and Evangeline was on the covers of all kinds of magazines, that I realized that I'd gotten my foot in the door.
Groves had Du Pont make Teflon for the bomb, but not until 1960 that it coat pans and muffin tins.
not until later, when the show was absolutely blowing up and Evangeline was on the covers of all kinds of magazines, that I realize that I'd gotten my foot in the door.
Groves had Du Pont make Teflon for the bomb, but not until 1960 did it coat pans and muffin tins.
Not until later, when the show was absolutely blowing up and Evangeline was on the covers of all kinds of magazines, did I realize that I'd gotten my foot in the door.

-continued

Groves had Du Pont make Teflon for the bomb, but until 1960 it did not coat pans and muffin tins.
until later, when the show was absolutely blowing up and Evangeline was on the covers of all kinds of magazines,
I did not realize that I'd gotten my foot in the door.
Groves had Du Pont make Teflon for the bomb, but until 1960 it did not coat pans and muffin tins.
until later, when the show was absolutely blowing up and Evangeline was on the covers of all kinds of magazines,
I did not realize that I'd gotten my foot in the door.
Groves had Du Pont make Teflon for the bomb, but it did not coat pans and muffin tins until 1960.
I did not realize that I'd gotten my foot in the door until later, when the show was absolutely blowing up and Evangeline was on the covers of all kinds of magazines,.
Groves had Du Pont make Teflon for the bomb, but it did not coat pans and muffin tins until 1960.
I did not realize that I'd gotten my foot in the door until later, when the show was absolutely blowing up and Evangeline was on the covers of all kinds of magazines.

E. Fifth "it" Sub-Rule

Referring to the first "it" sub-rule, paragraph 0136, if the system determines that not all words between the "to be" verb and the word "that" are verbs, adverbs and adjectives, then the system determines if the word immediately following the "to be" verb is a preposition or is an adverb followed by a preposition. If it is, then the system determines if the word "that" follows immediately after the preposition. If it does, then the system will ignore it. At this juncture, the system will delete the words "it," the "to be" verb and any "that" not following immediately after the preposition. The system will then recapitalize in the sentence accordingly. The fifth "it" rule is illustrated in Example 32 below.

Example 32

It was at that moment that I knew he could really see me.
It was during those penitential laps that my attitude hardened.
It's in that context of skepticism toward science that some reasonable questions have been raised.
It was shortly after the British Red Cross arrived that a large quantity of lip stick arrived.
It was at that moment that I knew he could really see me.
It was during those penitential laps that my attitude hardened.
It's in that context of skepticism toward science that some reasonable questions have been raised.
It was shortly after the British Red Cross arrived that a large quantity of lip stick arrived.
It was at that moment that I knew he could really see me.
It was during those penitential laps that my attitude hardened.
It's in that context of skepticism toward science that some reasonable questions have been raised.
It was *shortly* after the British Red Cross arrived that a large quantity of lip stick arrived.
It was at *that* moment that I knew he could really see me.
It was during those penitential laps that my attitude hardened.
It's in *that* context of skepticism toward science that some reasonable questions have been raised.
It was *shortly* after the British Red Cross arrived that a large quantity of lip stick arrived.
It was at that moment that I knew he could really see me.
It was during those penitential laps that my attitude hardened.
It's in that context of skepticism toward science that some reasonable -continued questions have been raised.
  It was *shortly* after the British Red Cross arrived that a large quantity of lip stick arrived.
    was at that moment that I knew he could really see me.
    was during those penitential laps that my attitude hardened.
    's in that context of skepticism toward science that some reasonable questions have been raised.
    was *shortly* after the British Red Cross arrived that a large quantity of lipstick arrived.
      at that moment that I knew he could really see me.
      during those penitential laps that my attitude hardened.
      in that context of skepticism toward science that some reasonable questions have been raised.
      *shortly* after the British Red Cross arrived that a large quantity of lipstick arrived.
        at that moment I knew he could really see me.
        during those penitential laps my attitude hardened.
        in that context of skepticism toward science some reasonable questions have been raised.
        shortly after the British Red Cross arrived a large quantity of lipstick arrived.
        At that moment I knew he could really see me.
        During those penitential laps my attitude hardened.
        In that context of skepticism toward science some reasonable questions have been raised.
        Shortly after the British Red Cross arrived a large quantity of lipstick arrived.

F. Sixth "it" Sub-Rule

This rule can be implemented in connection with other rules that search for "it." Thus, the term "it" can be considered a sign for this rule. This rule can begin at the step numbered, "29" below, after other rules have been considered and rejected or considered and applied. Thus, other steps can be pre-cursor steps to this rule (e.g., 1-5, 6-7), in some embodiments, as indicated.

(1) System searches for "[I]t"
(2) is "Mt" part of contraction, or does "to be" verb appear within next five words?
(3) if yes, does word "that" [or "who"—see Step 12] follow "to be" verb
(4) if yes, system tries to match phrase from "[I]t" through "that" with phrase in "it" pool
(5) if system finds match, it deletes all words from "[I]t" through "that"
6. if system finds no match in "it" pool, are all words between "to be" verb and "that" verbs (including participles, help verbs, and infinitives), adverbs, and adjectives?
7. if yes, system deletes all words from "[I]t" through "that"
29. [referring to the question posed in Step 6], if no, is word following "to be" verb a preposition, or an adverb followed by a preposition?
30. if yes, does a "that" follow immediately after the preposition?
34. [referring to the question posed in Step 29], if no, is word or words following immediately after "to be" verb a noun unit?
35. if yes, does the "that" follow immediately after noun unit, or a prepositional phrase attached to noun unit?
36. if yes, system deletes "[I]t" "to be" verb and "that"
37. does another "that" appear later in sentence?
38. if yes, does a verb follow "that"?
39. if yes, system also deletes that "that", and replaces it with a comma
40. System capitalizes In some embodiments, the system searches for the word "it" and determines if "it" is part of a contraction or if a "to be" verb appears within the next five words following the word "it." If it does, then the system determines if the word "that" (or "who" or "which") follows the "to be" verb. If it does, then the system tries to match the phrase from "it" through "that" with a phrase in the "it" pool above. If the system finds a match, then it finds a match in the "it" pool. It deletes all of the words from "it" through "that."

If the system finds no match in the "it" pool, the system determines if all of the words between the "to be" verb and the word "that" are verbs (including participles, helping verbs and infinitives), adverbs and adjectives. If they are, then the system will delete all of the words from "it" through "that." If they are not, however, the system will determine if the word following the "to be" verb is a preposition or an adverb followed by a preposition. If it is, the system determines if the word "that" follows immediately after the preposition. If it does not, the system determines if a word or words following immediately after the "to be" verb is a noun unit. If it is, then the system determines if the word "that" follows immediately after the noun unit or a prepositional phrase attached to the noun unit. If so, then the system will delete the word "it," the "to be" verb and the word "that" (except in the case of the idiomatic phrase "it is a shame that," which the system can ignore as a false positive). At this point, the system determines if another word "that" appears later in the sentence. And if so, does a verb follow the word "that?" If so, then the system will delete the word "that" and will replace it with a comma. At this point, the system will recapitalize accordingly. The sixth "it" rule is illustrated in Example 33 below.

Example 33

It is their decisions that determine both characters' actions, and it is their desire that overwhelms the partner's desire.
It is the character's belief that keeps the story alive that gives us the needed shred of hope that the goal might still be achieved.
It is the protagonist's pursuit of his objective that we follow as the story unfolds, and it is this pursuit that draws us into the story.
It is their decisions that determine both characters' actions, and it is their desire that overwhelms the partner's desire.
It is the character's belief that keeps the story alive that gives us the needed shred of hope that the goal might still be achieved.
It is the protagonist's pursuit of his objective that we follow as the story unfolds, and it is this pursuit that draws us into the story.
It is their decisions that determine both characters' actions, and it is their desire that overwhelms the partner's desire.
It is the character's belief that keeps the story alive that gives us the needed shred of hope that the goal might still be achieved.
It is the protagonist's pursuit of his objective that we follow as the story unfolds, and it is this pursuit that draws us into the story.
It is their decisions *that* determine both characters' actions, and it is their desire *that* overwhelms the partner's desire.
It is the character's belief *that* keeps the story alive that gives us the needed shred of hope that the goal might still be achieved.
It is the protagonist's pursuit of his objective that we follow as the story unfolds, and it is this pursuit *that* draws us into the story.
It is their decisions *that* determine both characters' actions, and it is their desire *that* overwhelms the partner's desire.
It is the character's belief *that* keeps the story alive that gives us the needed shred of hope that the goal might still be achieved.
It is the protagonist's pursuit *of his objective that* we follow as the story unfolds, and it is this pursuit *that* draws us into the story.
their decisions determine both characters' actions, and their desire overwhelms the partner's desire.
the character's belief keeps the story alive that gives us the needed shred of hope that the goal might still be achieved.
the protagonist's pursuit *of his objective* we follow as the story unfolds, and this pursuit draws us into the story.
their decisions determine both characters' actions, and their desire overwhelms the partner's desire.
the character's belief keeps the story alive that gives us the needed shred of hope that the goal might still be achieved.
the protagonist's pursuit *of his objective* we follow as the story -continued unfolds, and this pursuit draws us into the story.
  their decisions determine both characters' actions, and their desire overwhelms the partner's desire.
  the character's belief keeps the story alive, gives us the needed shred of hope that the goal might still be achieved.
  the protagonist's pursuit *of his objective* we follow as the story unfolds, and this pursuit draws us into the story.
  Their decisions determine both characters' actions, and their desire overwhelms the partner's desire.
  The character's belief keeps the story alive, gives us the needed shred of hope that the goal might still be achieved.
  The protagonist's pursuit of his objective we follow as the story unfolds, and this pursuit draws us into the story.

G. Seventh "it" Sub-Rule

This rule can be implemented in connection with other rules that search for "it." Thus, the term "it" can be considered a sign for this rule. This rule can begin at the step numbered, "41" below, after other rules have been considered and rejected or considered and applied. Thus, other steps can be pre-cursor steps to this rule (e.g., 1-4), in some embodiments, as indicated.

(1) System searches for "[I]t"
(2) is "[I]t" part of contraction, or does "to be" verb appear within next five words?
(3) if yes, does word "that" [or "who"—see Step 12] follow "to be" verb
(4) if yes, system tries to match phrase from "[I]t" through "that" with phrase in "it" pool
41. [referring to the question posed in Step 3], if no, is "it" preceded by conjunction from conjunction pool?
42. If yes, system deletes "it" and "to be" verb In some embodiments, the system searches for the word "it" and determines if "it" is part of a contraction or if a "to be" verb appears within the next five words following the word "it." If so, the system determines if the word "that" (or "who or "which") follows the "to be" verb. If so, then the system tries to match the phrase "it" through "that" with a phrase in the "it" pool above. If not, however, the system determines if "it" is preceded by a conjunction from a conjunction pool (see section XVIII, Table 12). If so, then the system deletes the word "it" and the "to be" verb. The seventh "it" rule is illustrated by Example 34 below.

Example 34

Making the movie meant spending nine months of my life suffering - whether it was real or imagined.
  This can be a very effective tool, but it is not the tool of first choice under most circumstances.
  Exposition can usually be made more engrossing if it is revealed in conflict.
  Making the movie meant spending nine months of my life suffering - whether it was real or imagined.
  This can be a very effective tool, but it is not the tool of first choice under most circumstances.
  Exposition can usually be made more engrossing if it is revealed in conflict.
  Making the movie meant spending nine months of my life suffering - whether it was real or imagined.
  This can be a very effective tool, but it is not the tool of first choice under most circumstances.
  Exposition can usually be made more engrossing if it is revealed in conflict.
  Making the movie meant spending nine months of my life suffering - whether real or imagined.
  This can be a very effective tool, but not the tool of first choice under most circumstances.

-continued

Exposition can usually be made more engrossing if revealed in conflict.
  Making the movie meant spending nine months of my life suffering - whether real or imagined.
  This can be a very effective tool, but not the tool of first choice under most circumstances.
  Exposition can usually be made more engrossing if revealed in conflict.

H. Eighth "it" Sub-Rule

This rule can be implemented in connection with other rules that search for "it." Thus, the term "it" can be considered a sign for this rule. This rule can begin at the step numbered, "43" below, after other rules have been considered and rejected or considered and applied. Thus, other steps can be pre-cursor steps to this rule (e.g., 1-4), in some embodiments, as indicated.

(1) System searches for "[I]t"
(2) is "[I]t" part of contraction, or does "to be" verb appear within next five words?
(3) if yes, does word "that" [or "who"—see Step 12] follow "to be" verb
(4) if yes, system tries to match phrase from "[I]t" through "that" with phrase in "it" pool
43. [referring to the question posed in Step 3], if yes, or no, is "to be" verb followed by noun unit, followed by infinitive?
44. If yes, system deletes "it", "to be" verb, noun unit, and "to"
45. System capitalizes In some embodiments, the system searches for the word "it" and determines if the word "it" is part of a contraction or if a "to be" verb appears within the next five words following the word "it." If "Yes," then the system determines if the word "that" (or "who" or "which" or "where") follows the "to be" verb. If "Yes," then the system tries to match the phrase from "it" through "that" with a phrase in the "it" pool. As discussed above, the "it" pool contains various "it" phrases.

If the system is able to match the word "it" through "that" with a phrase in the "it" pool, or if it is not, the system determines if the "to be" verb is followed by a noun unit followed by an infinitive. If "Yes," then the system deletes the word "it," the "to be" verb, the noun unit and the word "to." At this point, the system recapitalizes as appropriate. The eighth "it" rule is illustrated in Example 35 below.

Example 35

It is a good idea to remember that the characters don't know who the protagonist is, who the antagonist is, and who the supporting players are.
  It is a good idea to think of the three acts as a set of landmarks an explorer tries to keep sight of when traveling through new and dangerous territory.
  It is a good idea to remember that the characters don't know who the protagonist is, who the antagonist is, and who the supporting players are.
  It is a good idea to think of the three acts as a set of landmarks an explorer tries to keep sight of when traveling through new and dangerous territory.
  It is a good idea to remember that the characters don't know who the protagonist is, who the antagonist is, and who the supporting players are.
  It is a good idea to think of the three acts as a set of landmarks an explorer tries to keep sight of when traveling through new and dangerous territory.
  It is a good idea to remember that the characters don't know who the protagonist is, who the antagonist is, and who the supporting players are.
  It is a good idea to think of the three acts as a set of landmarks an explorer tries to keep sight of when traveling through new and dangerous territory.

-continued

It is a good idea to remember that the characters don't know who the protagonist is, who the antagonist is, and who the supporting players are.
It is a good idea to think of the three acts as a set of landmarks an explorer tries to keep sight of when traveling through new and dangerous territory.
remember that the characters don't know who the protagonist is, who the antagonist is, and who the supporting players are.
think of the three acts as a set of landmarks an explorer tries to keep sight of when traveling through new and dangerous territory.
Remember that the characters don't know who the protagonist is, who the antagonist is, and who the supporting players are.
Think of the three acts as a set of landmarks an explorer tries to keep sight of when traveling through new and dangerous territory.

I. Ninth "it" Sub-Rule

This rule can be implemented in connection with other rules that search for "it." Thus, the term "it" can be considered a sign for this rule. This rule can begin at the step numbered, "46" below, after other rules have been considered and rejected or considered and applied. Thus, other steps can be pre-cursor steps to this rule (e.g., 1-3), in some embodiments, as indicated.

(1) System searches for "[I]t"
(2) is "[I]t" part of contraction, or does "to be" verb appear within next five words?
(3) if yes, does word "that" [or "who"—see Step 12] follow "to be" verb
46. [referring to the question posed in Step 2], if no, is "it" followed immediately by any other verb?
47. If yes, does any infinitive follow?
48. If yes, system deletes "it", and moves all words beginning with infinitive to position "it" occupied
49. System capitalizes In some embodiments, the system searches for the word "it" and determines if the word "it" is part of a contraction or if a "to be" verb appears within the next five words following the word "it." If it does, then the system determines if the word "that" (or "who" or "which") follows the "to be" verb. If the word "it" is not part of a contraction or a "to be" verb does not appear within the next five words following the word "it," then the system determines if the word "it" is followed immediately by any other verb. If it is, then the system queries: "Does any infinitive follows the word 'it'?" If "Yes," then the system deletes the word "it" and moves all words beginning with the infinitive to the position that the word "it" occupied. At this point, the system recapitalizes as appropriate. The ninth "it" rule is illustrated in Example 36 below.

Example 36

It overlooks a staggering amount of basic research to say that modern medicine began with the era of antibiotics.
It overlooks a staggering amount of basic research to say that modern medicine began with the era of antibiotics.
It overlooks a staggering amount of basic research to say that modern medicine began with the era of antibiotics.
It overlooks a staggering amount of basic research to say that modern medicine began with the era of antibiotics.
overlooks a staggering amount of basic research to say that modern medicine began with the era of antibiotics.
overlooks a staggering amount of basic research to say that modern medicine began with the era of antibiotics.
to say that modern medicine began with the era of antibiotics overlooks a staggering amount of basic research.
To say that modern medicine began with the era of antibiotics overlooks a staggering amount of basic research.

VII. What Rule

The What Rule has seven sub-rules. They are: (A) "[W]hat"—verb unit—"to be" verb—"that" (or no "that"); (B) "[W]hat"—verb unit—no "to be" verb=FALSE POSITIVE; (C) "[W]hat"—noun or pronoun—verb unit—"to do"—"to be" verb—verb; (D) "[W]hat"—noun or pronoun—"to do" verb—"to be" verb—verb; (E) "[W]hat"—noun or pronoun—verb unit—"to be" verb; (F) "[W]hat"—noun unit—"to be" verb; (G) "[W]hat"—noun or pronoun—no "to be" verb=FALSE POSITIVE. Each is discussed in greater detail below.

A. "[W]hat"—Verb Unit—"to be" Verb—"that" (or No "that")

1. System searches for "[W]hat"
2. is "[W]hat" followed by a verb unit?
3. if yes, is verb unit followed by a "to be" verb?
4. if yes, is "to be" verb followed by "that"
5. if yes, system deletes "[W]hat", verb unit, "to be" verb, and "that"
6. if no, is "to be" verb followed by noun unit?
7. if yes, system deletes "[W]hat", verb unit, and "to be" verb
8. System capitalizes In some embodiments, the system searches for the word "what" and determines if the word "what" is followed by a verb unit. If it is, then the system determines if the verb unit is followed by a "to be" verb. If it is, then the system determines if the "to be" verb is followed by the word "that." If the word "that" does follow a "to be" verb, then the system deletes the word "what," the verb unit, the "to be" verb, and the word "that." If it does not, however, the system determines if the "to be" verb is followed by a noun unit. If the "to be" verb is followed by a noun unit, then the system deletes the word "what," the verb unit, and the "to be" verb. At this juncture, the system recapitalizes as appropriate. The "[W]hat"—verb unit—"to be" verb—"that" (or no "that") rule is illustrated in Example 37 below.

Example 37

A lot of the time what happens is that the little impulse that gets me started on a story leads to something that's more interesting.
A lot of the time what happens is that the little impulse that gets me started on a story leads to something that's more interesting.
A lot of the time what happens is that the little impulse that gets me started on a story leads to something that's more interesting.
A lot of the time what happens is that the little impulse that gets me started on a story leads to something that's more interesting.
A lot of the time what happens is that the little impulse that gets me started on a story leads to something that's more interesting.
A lot of the time the little impulse that gets me started on a story leads to something that's more interesting.
A lot of the time what happens is the little impulse that gets me started on a story leads to something that's more interesting.
A lot of the time the little impulse that gets me started on a story leads to something that's more interesting.
A lot of the time the little impulse that gets me started on a story leads to something that's more interesting.

B. "[W]hat"—Verb Unit—No "to be" Verb=FALSE POSITIVE (1) System searches for "[W]hat"
(2) is "[W]hat" followed by a verb unit?
3. if yes, is verb unit followed by a "to be" verb?
4. if yes, is "to be" verb followed by "that"
9. [referring to the question posed in Step 3] if no, system ignores as FALSE POSITIVE In some embodiments, the system detects the word "what" followed by a verb unit that is not followed by a "to be" verb. When the system determines that no "to be" verb follows the verb unit, the system ignores the phrase as a FALSE POSITIVE. The "[W]hat"—verb unit—no "to be" verb=FALSE POSITIVE rule is illustrated in Example 38 below.

Example 38

---

If the user panders to the audience, what determines the action is the user's guess at what the audience wants a priori of the story at hand.
What makes it so surpassingly strange is the fact that it's so resolutely ordinary.
What are your smallest particles?
What was being said late last summer, however, was hard for him to take.
If the user panders to the audience, <u>what</u> <u>determines</u> the action is the user's guess at what the audience wants a priori of the story at hand.
<u>What</u> <u>makes</u> it so surpassingly strange is the fact that it's so resolutely ordinary.
<u>What</u> <u>are</u> your smallest particles?
<u>What</u> <u>was being said</u> late last summer, however, was hard for him to take.
If the user panders to the audience, <u>what</u> <u>determines</u> *the action* is the user's guess at what the audience wants a priori of the story at hand.
<u>What</u> <u>makes</u> *it* so surpassingly strange is the fact that it's so resolutely ordinary.
<u>What</u> <u>are</u> *your* smallest particles?
<u>What</u> <u>was being</u> *said* late last summer, however, was hard for him to take.
If the user panders to the audience, what determines the action is the user's guess at what the audience wants a priori of the story at hand.
What makes it so surpassingly strange is the fact that it's so resolutely ordinary.
What are your smallest particles?
What was being said late last summer, however, was hard for him to take.

---

In some embodiments, when help verbs appear, and they are also "to be" verbs, they should not be interpreted as "to be" verbs but as part of another verb unit. E.g., "What was being said late last summer, however, was hard for him to take." This example appears under the What Rule #2, which says that if "[W]hat" is followed by a verb unit that is not followed by a "to be" verb, a false positive is present. Preferably, the system interprets the example above as "[W]hat" followed by a verb unit that is not followed by a "to be" verb. I.e., "was" is not a verb followed by the "to be" verb "being".

C. "[W]hat"—Noun or Pronoun—Verb Unit—"to do"—"to be" Verb—Verb (1) System searches for "[W]hat"
(2) is "[W]hat" followed by a verb unit?
3. if yes, is verb unit followed by a "to be" verb?
10. [referring to the question posed in Step 2] if no, is "[W]hat" followed by a noun or pronoun?
11. if yes, is noun or pronoun followed by a verb unit?
12. if yes, is verb unit followed by infinitive "to do"?
13. if yes, is infinitive "to do" followed by "to be" verb?
14. if yes, is "to be" verb followed by a verb unit?
15. if yes, system deletes "[W]hat", do, and "to be" verb
16. if "to" now appears twice in a row, system deletes one
17. System capitalizes In some embodiments, the system searches for the word "what" and determines if the word "what" is followed by a verb unit. If it is not followed by a verb unit, then the system determines if the word "what" is followed by a noun or a pronoun. If it is, then the system determines if the noun or pronoun is followed by a verb unit. If it is, then the system determines if the verb unit is followed by an infinitive "to do." If the verb unit is followed by the infinitive "to do," then the system determines if the infinitive "to do" is followed by a "to be" verb. If it is, the system determines if the "to be" verb is followed by a verb unit. If it is, then the system deletes the word "what," the word "do" and the "to be" verb. If the word "to" now appears twice in a row in the sentence or phrase, the system deletes one of the words "to." At this juncture, the system will recapitalize as appropriate. The "[W]hat"—noun or pronoun—verb unit—"to do"—"to be" verb—verb rule is illustrated in Example 39 below.

Example 39

---

Ultimately, what you are trying to do is to find what the story's going to be.
What he decides to do is have his wife kidnapped.
What I've figured out how to do is make people feel comfortable on television and on the radio.
Ultimately, <u>what</u> you are trying to do is to find <u>what</u> the story's going to be.
<u>What</u> he decides to do is have his wife kidnapped.
<u>What</u> I've figured out how to do is make people feel comfortable on television and on the radio.
Ultimately, <u>what</u> <u>you</u> are trying to do is to find <u>what</u> <u>the story</u>'s going to be.
<u>What</u> <u>he</u> decides to do is have his wife kidnapped.
<u>What</u> <u>I</u>'ve figured out how to do is make people feel comfortable on television and on the radio.
Ultimately, <u>what</u> <u>you are trying</u> to do is to find <u>what</u> <u>the story's going</u> to be.
<u>What</u> <u>he decides</u> to do is have his wife kidnapped.
<u>What</u> <u>I've figured out how</u> to do is make people feel comfortable on television and on the radio.
Ultimately, <u>what</u> <u>you are trying</u> <u>to do</u> is to find <u>what</u> <u>the story's going</u> to be.
<u>What</u> <u>he decides</u> <u>to do</u> is have his wife kidnapped.
<u>What</u> <u>I've figured out how</u> <u>to do</u> is make people feel comfortable on television and on the radio.
Ultimately, <u>what</u> <u>you are trying</u> <u>to do</u> is to find <u>what</u> <u>the story's going</u> to be.
<u>What</u> <u>he decides</u> <u>to do</u> <u>is</u> have his wife kidnapped.
<u>What</u> <u>I've figured out how</u> <u>to do</u> <u>is</u> make people feel comfortable on television and on the radio.
Ultimately, <u>what</u> <u>you are trying</u> <u>to do</u> <u>is</u> *to find* <u>what</u> <u>the story's going</u> to be.
<u>What</u> <u>he decides</u> <u>to do</u> <u>is</u> *have* his wife kidnapped.
<u>What</u> <u>I've figured out how</u> <u>to do</u> <u>is</u> *make* people feel comfortable on television and on the radio.
Ultimately, you are trying to to find what the story's going to be.
he decides to have his wife kidnapped.
I've figured out how to make people feel comfortable on television and on the radio.
Ultimately, you are trying <u>to</u> <u>to</u> find what the story's going to be.
he decides <u>to</u> have his wife kidnapped.
I've figured out how <u>to</u> make people feel comfortable on television and on the radio.
Ultimately, you are trying to find what the story's going to be.
He decides to have his wife kidnapped.
I've figured out how to make people feel comfortable on television and on the radio.

---

D. "[W]hat"—Noun or Pronoun—"to do" Verb—"to be" Verb—Verb (1) System searches for "[W]hat"
(2) is "[W]hat" followed by a verb unit?
3. if yes, is verb unit followed by a "to be" verb?
10. [referring to the question posed in Step 2] if no, is "[W]hat" followed by a noun or pronoun?
11. if yes, is noun or pronoun followed by a verb unit?
12. if yes, is verb unit followed by infinitive "to do"?
13. if yes, is infinitive "to do" followed by "to be" verb?
18. [referring to the question posed in Step 12] if no, is verb unit a "to do" verb?

19. if yes, is "to do" verb followed by "to be" verb?

20. if yes, is "to be" verb followed by a verb unit?

21. if yes, system deletes "[W]hat", "to do" verb, and "to be" verb 22. if deleted "to be" verb is past tense, system converts following verb unit to past tense 23. if deleted "to be" verb is present tense, system leaves following verb unit in present tense, but matches it in number to deleted "to do" verb 24. System capitalizes In some embodiments, the system searches for the word "what" and determines if the word "what" is followed by a verb unit. If it is not followed by a verb unit, then the system determines if the word "what" is followed by a noun or pronoun. If it is, the system determines if the noun or pronoun is followed by a verb unit. If the noun or pronoun is followed by a verb unit, then the system determines if the verb unit is followed by the infinitive "to do."

If the verb unit is not followed by the infinitive "to do," then the system determines if the verb unit is a "to do" verb. If the verb unit is a "to do" verb, then the system determines if the "to do" verb is followed by a "to be" verb. If the "to do" verb is followed by a "to be" verb, then the system determines if the "to be" verb is followed by a verb unit. If the "to be" verb is followed by a verb unit, then the system deletes the word "what," the "to do" verb and the "to be" verb. If the deleted "to be" verb is past tense, then the system converts the following verb unit to past tense. If, however, the deleted "to be" verb is present tense, then the system leaves the following verb unit in present tense but matches it in number to the deleted "to do" verb. At this stage, the system recapitalizes as appropriate. The "[W]hat"—noun or pronoun—"to do" verb—"to be" verb—verb rule is illustrated in Example 40 below.

Example 40

What Nora and Carl did was write their version of my screenplay.
What the Millennium Project does is bring these different groups together, because villages don't live only on farming
or only on water or only on clinics.
What <u>Nora and Carl</u> did was write their version of my screenplay.
What <u>the Millennium Project</u> does is bring these different groups together, because villages don't live only on farming
or only on water or only on clinics.
What <u>Nora and Carl</u> <u>did</u> was write their version of my screenplay.
What <u>the Millennium Project</u> <u>does</u> is bring these different groups together, because villages don't live only on farming
or only on water or only on clinics.
What <u>Nora and Carl</u> <u>did</u> <u>was</u> write their version of my screenplay.
What <u>the Millennium Project</u> <u>does</u> <u>is</u> bring these different groups together, because villages don't live only on farming
or only on water or only on clinics.
What <u>Nora and Carl</u> did <u>was</u> <u>write</u> their version of my screenplay.
What <u>the Millennium Project</u> does <u>is</u> <u>bring</u> these different groups together, because villages don't live only on farming
or only on water or only on clinics.
 <u>Nora and Carl</u> <u>write</u> their version of my screenplay.
 <u>the Millennium Project</u> <u>bring</u> these different groups together, because villages don't live only on farming or only on water or only on clinics.
 Nora and Carl (<u>was</u>) <u>write</u> their version of my screenplay.
 the Millennium Project <u>bring</u> these different groups together, because villages don't live only on farming or only on water or only on clinics.
 Nora and Carl <u>wrote</u> their version of my screenplay.
 the Millennium Project <u>bring</u> these different groups together, because villages don't live only on farming or only on water or only on clinics.
 Nora and Carl <u>wrote</u> their version of my screenplay.
 the Millennium Project (<u>is</u>) <u>bring</u> these different groups together, because villages don't live only on farming
or only on water or only on clinics.

-continued

Nora and Carl <u>wrote</u> their version of my screenplay.
 the Millennium Project (does) (<u>is</u>) <u>bring(s)</u> these different groups together, because villages don't live only on farming
or only on water or only on clinics.
 Nora and Carl wrote their version of my screenplay.
 The Millennium Project brings these different groups together, because villages don't live only on farming or only on water or only on clinics.

E. "[W]hat"—Noun or Pronoun—Verb Unit—"to be" Verb (1) System searches for "[W]hat"

(2) is "[W]hat" followed by a verb unit?

3. if yes, is verb unit followed by a "to be" verb?

10. [referring to the question posed in Step 2] if no, is "[W]hat" followed by a noun or pronoun?

11. if yes, is noun or pronoun followed by a verb unit?

12. if yes, is verb unit followed by infinitive "to do"?

18. [referring to the question posed in Step 12] if no, is verb unit a "to do" verb?

25. [referring to the question posed in Step 18] if no, is verb unit followed by a "to be" verb?

26. if yes, system deletes "[W]hat" and "to be" verb

27. System capitalizes ((It Rule will take this further))

In some embodiments, the system searches for the word "what" and determines if the word "what" is followed by a verb unit. If it is not followed by a verb unit, then the system determines if the word "what" is followed by a noun or pronoun. If it is, then the system determines if the noun or pronoun is followed by a verb unit. If a verb unit does follow the noun or pronoun, then the system determines if the verb unit is followed by the infinitive "to do."

If the verb unit is not followed by the infinitive "to do," then the system determines if the verb unit is a "to do" verb. If it is not a "to do" verb, the system determines if the verb unit is followed by a "to be" verb. If it is, then the system deletes the word "what" and the "to be" verb. At this juncture, the system recapitalizes as appropriate. We note that the "it" rule described herein continues this portion of the method. The "[W]hat"—noun or pronoun—verb unit—"to be" verb rule is illustrated in Example 41 below.

Example 41

What I realized is that all I could do was focus on the next move.
What it comes down to is this.
What this latest tally of the world's finest accommodations
demonstrates is that it is the striving for perfection, rather than the
claiming of it that produces quality.
What <u>I</u> <u>realized</u> is that all I could do was focus on the next move.
What <u>it</u> <u>comes down to</u> is this.
What <u>this latest tally of the world's finest accommodations
demonstrates</u> is that it is the striving for perfection, rather than the
claiming of it that produces quality.
What <u>I</u> <u>realized</u> <u>is</u> that all I could do was focus on the next move.
What <u>it</u> <u>comes down to</u> <u>is</u> this.
What <u>this latest tally of the world's finest accommodations
demonstrates</u> <u>is</u> that it is the striving for perfection, rather than the
claiming of it that produces quality.
 <u>I realized</u> that all I could do was focus on the next move.
 <u>it comes down to</u> this.
 <u>this latest tally of the world's finest accommodations demonstrates</u>
that it is the striving for perfection, rather than the claiming of it that
produces quality.
 I realized that all I could do was focus on the next move.
 It comes down to this.

-continued

This latest tally of the world's finest accommodations demonstrates that it is the striving for perfection, rather than the claiming of it that produces quality.
I realized that all I could do was focus on the next move.
It comes down to this.
This latest tally of the world's finest accommodations demonstrates that <u>it is</u> the striving for perfection, rather than the claiming of it <u>that</u> produces quality.
I realized that all I could do was focus on the next move.
It comes down to this.
This latest tally of the world's finest accommodations demonstrates that the striving for perfection, rather than the claiming of it produces quality.

F. "[W]hat"—Noun Unit—"to be" Verb

This rule can be implemented in connection with other rules that search for "what." Thus, the term "what" can be considered a sign for this rule. This rule can begin at the step numbered, "28" below, after other rules have been considered and rejected or considered and applied. Thus, other steps can be pre-cursor steps to this rule, (e.g. 1-2, 3-19, 25-26) in some embodiments, as indicated. Throughout this specification, where a step includes the following: "[referring to the question posed in Step #]," the listed sub-rule can provide alternative logic for a query in the noted step (Step #) that was answered differently when previously treated. Thus, if a query is posed in Step 2 and answered "yes" in Step 3, Steps 4-9 may all be based on the assumption that the answer to the question in Step 2 was yes. Later steps, e.g., Step 10 et seq., may treat the alternative answer, e.g., where the answer to the question posed in Step 2 is "no." Where a step includes the following: "[referring to Step ##]," the listed sub-rule can provide further steps that can be performed as alternative or additional steps to the noted step (Step ##), but can in some embodiments replace that step. Thus, if in Step 1 a system searches for a sign, (e.g., the term "what"), Step 2 may include a query based on that sign, and Step 28 may also include a query based on that same sign. Moreover, steps may be listed in parenthetical format (e.g., (1), (2), instead of 1., 2.). When this is the case, the steps may be included in a list not because they new to a particular rule being described, but instead to provide context for that rule and reminder of one or more preceding steps of logic upon which a sub-rule may be based.

(1) System searches for "[W]hat"
(2) is "[W]hat" followed by a verb unit?
3. if yes, is verb unit followed by a "to be" verb?
10. [referring to the question posed in Step 2] if no, is "[W]hat" followed by a noun or pronoun?
11. if yes, is noun or pronoun followed by a verb unit?
12. if yes, is verb unit followed by infinitive "to do"?
13. if yes, is infinitive "to do" followed by "to be" verb?
18. [referring to the question posed in Step 12] if no, is verb unit a "to do" verb?
19. if yes, is "to do" verb followed by "to be" verb?
25. [referring to the question posed in Step 18] if no, is verb unit followed by a "to be" verb?
26. if yes, system deletes "[W]hat" and "to be" verb
28. [referring to Step 2] is "[W]hat" followed by a noun unit (only—no pronoun)?
29. [referring the question posed in to Step 25] if no, is verb unit a "to be" verb?
30. if yes, system deletes "[W]hat" and "to be" verb
31. System capitalizes In some embodiments, the system searches for the word "what" and determines if the word "what" is followed by a verb unit. If the word "what" is not followed by a verb unit, then the system determines if the word "what" is followed by a noun or a pronoun. If it is, then the system determines if the noun or pronoun is followed by a verb unit. If the noun or pronoun is followed by a verb unit, then the system determines if the verb unit is followed by the infinitive "to do." If the verb unit is not followed by the infinitive "to do," then the system determines if the verb unit is a "to do" verb. If the verb unit is not a "to do" verb, then the system determines if the verb unit is followed by a "to be" verb. If the verb unit is not followed by a "to be" verb, then the system determines if the verb unit is a "to be" verb. If the verb unit is a "to be" verb, then the system deletes the word "what" and the "to be" verb. At this juncture, the system recapitalizes as appropriate. The "[W]hat"—noun unit—"to be" verb rule is illustrated in Example 42 below.

Example 42

Ultimately, you are trying to find what the story's going to be.
We can be sure that the author of every great screenplay imagined what the effect of settings, costume, and music would be.
I just wanted you to know what the possibilities are.
These are all legitimate reasons to do a movie - as long as you're honest with yourself about what the reasons are.
Ultimately, you are trying to find <u>what</u> <u>the story</u>'s going to be.
We can be sure that the author of every great screenplay imagined <u>what</u> <u>the effect of settings, costume, and music</u> would be.
I just wanted you to know <u>what</u> <u>the possibilities</u> are.
These are all legitimate reasons to do a movie - as long as you're honest with yourself about <u>what</u> <u>the reasons</u> are.
Ultimately, you are trying to find <u>what</u> <u>the story</u> 's <u>going to be</u>.
We can be sure that the author of every great screenplay imagined <u>what</u> <u>the effect of settings, costume, and music</u> <u>would be</u>.
I just wanted you to know <u>what</u> <u>the possibilities</u> <u>are</u>.
These are all legitimate reasons to do a movie - as long as you're honest with yourself about <u>what</u> <u>the reasons</u> <u>are</u>.
Ultimately, you are trying to find <u>the story</u>.
We can be sure that the author of every great screenplay imagined <u>the effect of settings, costume, and music</u>.
I just wanted you to know <u>the possibilities</u>.
These are all legitimate reasons to do a movie - as long as you're honest with yourself about <u>the reasons</u>.
Ultimately, you are trying to find the story.
We can be sure that the author of every great screenplay imagined the effect of settings, costume, and music.
I just wanted you to know the possibilities.
These are all legitimate reasons to do a movie - as long as you're honest with yourself about the reasons.

G. "[W]hat"—Noun or Pronoun—No "to be" Verb=FALSE POSITIVE

This rule can be implemented in connection with other rules that search for "what." Thus, the term "what" can be considered a sign for this rule. This rule can begin at the step numbered, "32" below, after other rules have been considered and rejected or considered and applied. Thus, other steps can be pre-cursor steps to this rule, (e.g. 1-2, 3, 10-13, 18-19, 25-26, 29-30) in some embodiments, as indicated.

(1) System searches for "[W]hat"
(2) is "[W]hat" followed by a verb unit?
3. if yes, is verb unit followed by a "to be" verb?
10. [referring to the question posed in Step 2] if no, is "[W]hat" followed by a noun or pronoun?
11. if yes, is noun or pronoun followed by a verb unit?
12. if yes, is verb unit followed by infinitive "to do"?
13. if yes, is infinitive "to do" followed by "to be" verb?
18. [referring to the question posed in Step 12] if no, is verb unit a "to do" verb?
19. if yes, is "to do" verb followed by "to be" verb?
25. [referring to the question posed in Step 18] if no, is verb unit followed by a "to be" verb?

26. if yes, system deletes "[W]hat" and "to be" verb

29. [referring to the question posed in Step 25] if no, is verb unit a "to be" verb?

30. if yes, system deletes "[W]hat" and "to be" verb

32. [referring to the question posed in Step 29] if no, system ignores as FALSE POSITIVE In some embodiments, the system searches for the word "what" and determines if the word "what" is followed by a verb unit. If the word "what" is not followed by a verb unit, then the system determines if the word "what" is followed by a noun or pronoun. If the word "what" is followed by a noun or pronoun, the system determines if the noun or pronoun is followed by a verb unit. If a verb unit does follow the noun or pronoun, then the system determines if the verb unit is then followed by the infinitive "to do."

If the verb unit is not followed by the infinitive "to do," then the system determines if the verb unit is a "to do" verb. If the verb unit is not a "to do" verb, then the system determines if the verb unit is followed by a "to be" verb. If, however, the verb unit is not followed by a "to be" verb, then the system determines if the verb unit is a "to be" verb. If the verb unit is not a "to be" verb, then the system ignores the phrase as a FALSE POSITIVE. The "[W]hat"—noun or pronoun—no "to be" verb=FALSE POSITIVE rule is illustrated in Example 43 below.

Example 43

There's actually nothing wrong with what these tough, self-interested types in foreign policy have been saying, because what they have been saying is that it is completely within our national interest to be helping in these circumstances.
There's actually nothing wrong with what these tough, self-interested types in foreign policy have been saying, because what they have been saying is that it is completely within our national interest to be helping in these circumstances.
There's actually nothing wrong with what these tough, self-interested types in foreign policy have been saying, because what they have been saying is that it is completely within our national interest to be helping in these circumstances.
There's actually nothing wrong with what these tough, self-interested types in foreign policy have been saying, because they have been saying is that it is completely within our national interest to be helping in these circumstances.
There's actually nothing wrong with what these tough, self-interested types in foreign policy have been saying, because they have been saying it is completely within our national interest to be helping in these circumstances.

VIII. That Rule

As described above, the word "that" can play a role with the primary signs "it" "there" and "what." However, the word "that" can also be used as a primary sign to identify other problems. In some embodiments, the difference here is that "that" might be the last word in a series to be deleted, but the system can locate the word as a first step. After the system uses "that" to spot problems involving other words, it examines the remaining occurrences of "that" to see which ones can be deleted. Some have to stay; some can always be deleted; for a few, the system preferably requests input from a user before determining a proposed edit.

In some embodiments, the false positive and true positive Sub Rules 10-13 are combined and put at the beginning of the sequence.

In some embodiments, a "that rule" can include fourteen sub-rules: A) "what/who"—"it"—"to be" verb—"that"; B) "the reason"—_____ "to be" verb—"that"; C) "[T]his/[T]hese"—"to be" verb—"that/who"; D) "to be" verb—"one"—"that/who"—verb; E) noun unit—"that/who"—"to have" verb—"_____ to be"—past participle; F) noun unit—"that/who"—"to be" verb—infinitive; G) "that/who"—"to be" verb; H) "that which"; I) "that" in first seven words of sentence; J) "that/who"—verb unit (not including "to be" verb)=FALSE POSITIVE; K) "that"—"because" "for" "since" "as" "inasmuch"=FALSE POSITIVE; L) preposition—"that"=FALSE POSITIVE; M) "that/who/whom"—pronoun—TRUE POSITIVE; N) "that/who/whom"—noun. Each of these rules is discussed further below:

A. "What/Who"—"it"—"to be" Verb—"that"

This Rule includes seven sub-rules: 1. System searches for "that"; 2. Is word immediately preceding "that" a "to be" verb?; 3. if yes, is "to be" verb preceded immediately by "it"?; 4. if yes, is "it" preceded immediately by "what/who"?; 5. if yes, system deletes "it", "to be" verb, and "that"; 6. System capitalizes.

In some embodiments, the system searches for the word "that" and determines if the word immediately preceding the word "that" is a "to be" verb. If the word immediately preceding the word "that" is a "to be" verb, then the system determines if the "to be" verb is immediately preceded by the word "it." If the "to be" verb is preceded immediately by the word "it," then the system determines if the word "it" is preceded immediately by the word "what" or the word "who." If the word "it" is preceded immediately by either the word "what" or the word "who," then the system deletes the word "it," the "to be" verb and the word "that." At this juncture, the system can recapitalize as appropriate. The "what/who"—"it"—"to be" verb—"that" rule is illustrated in Example 44 below.

Example 44

I don't remember what it was that got me and my beloved book back together.
I don't remember what it was that got me and my beloved book back together.
I don't remember what got me and my beloved book back together.
I don't remember what got me and my beloved book back together.

B. "The Reason"—_____ "to be" Verb—"that"

This rule has sub-rules, numbered consecutively with the sub-rules for the previous rule, beginning with seven: 7. [referring to the question posed in Step 3] if no, does phrase "[T]he reason" appear in the ten words preceding the "to be" verb"?; 8. If yes, system deletes "[T]he reason", the "to be" verb, and "that"; 9. System places "because" where "that" was.

In some embodiments, the system searches for the word "that" and determines if the word immediately preceding the word "that" is a "to be" verb. If it is, then the system determines if the "to be" verb is preceded immediately by the word "it." If the "to be" verb is not preceded immediately by the word "it," then the system determines if the phrase "the reason" appears in the ten words preceding the "to be" verb. If the phrase "the reason" appears within the ten words prior to the "to be" verb, then the system deletes the phrase "the reason," the "to be" verb and the word "that." At this juncture, the system places the word "because" in the place where the word "that" was prior to being deleted. The "the reason"—_____ "to be" verb—"that" rule is illustrated in Example 45 below.

Example 45

The reason I was there is that Banksy donated one of his works to this museum.
The reason I was there is that Banksy donated one of his works to this museum.
The reason I was there is that Banksy donated one of his works to this museum.
I was there Banksy donated one of his works to this museum.
I was there because Banksy donated one of his works to this museum.

C. "[T]his/[T]hese"—"to be" Verb—"that/Who"

This rule has sub-rules, numbered consecutively with the sub-rules for the previous rule, beginning with ten: 10. [referring to the question posed in Step 2] if no, does "to be" verb appear anywhere before "that/who"?; 11. if yes, is "to be" verb preceded by "[T]his/[T]hese"; 12. If yes, system keeps "[T]his/[T]hese", deletes the "to be" verb, if present deletes the article following the "to be" verb, and "that/who".

In some embodiments, the system searches for the word "that" and determines if the word immediately preceding the word "that" is a "to be" verb. If the word immediately preceding "that" is not a "to be" verb, then the system determines if a "to be" verb appears anywhere before the words "that" or "who." If a "to be" verb does appear somewhere before the word "that" or the word "who," then the system determines if the "to be" verb is preceded by the word "this" or the word "these." If the "to be" verb is preceded by either the word "this" or the word "these," then the system keeps the word "this" or the word "these," deletes the "to be" verb, deletes the article following the "to be" verb, and deletes the word "that" or the word "who." The "[T]his/[T]hese"—"to be" verb—"that/who" rule is illustrated in Example 46 below.

Example 46

These are diet and lifestyle changes that make you feel good.
This is a diet and lifestyle change that makes you feel good.
These are diet and lifestyle changes that make you feel good.
This is a diet and lifestyle change that makes you feel good.
These are diet and lifestyle changes that make you feel good.
This is a diet and lifestyle change that makes you feel good.
These diet and lifestyle changes that make you feel good.
This a diet and lifestyle change that makes you feel good.
These diet and lifestyle changes that make you feel good.
This diet and lifestyle change that makes you feel good.
These diet and lifestyle changes make you feel good.
This diet and lifestyle change makes you feel good.

D. "To be" Verb—"One"—"that/Who"—Verb

This rule has sub-rules, numbered consecutively with the sub-rules for the previous rule, beginning with thirteen: 13. [referring to the question posed in Step 11] if no, is word immediately preceding "that/who" "one"?; 14. if yes, is word immediately following "that" a verb?; 15. if no, system ignores; 16. if yes, system deletes "to be" verb (but not "to" if infinitive), "one", and "that"; 17. is word immediately preceding "to be" verb a verb?; 18. if yes, system converts verb following "that" to infinitive form; 19. system capitalizes.

In some embodiments, the system searches for the word "that" and determines if the word immediately preceding the word "that" is a "to be" verb. If it is not a "to be" verb, then the system determines if a "to be" verb appears anywhere before the word "that" or the word "who." If it does, then the system determines if the "to be" verb is preceded by the word "this" or the word "these." If the "to be" verb is not preceded by the word "this" or the word "these," then the system determines if the word immediately preceding the word "that" or the word "who" is the word "one" (or any of the following derivatives of "one": "ones," "the one," or "the ones"). If any of these words immediately precede the word "that" or the word "who," then the system determines if the word immediately following the word "that" is a verb. If the word immediately following the word "that" is not a verb, then the system ignores the sentence. If, however, the word "that" is immediately followed by a verb, then the system deletes the "to be" verb (but not the word "to" if the verb is an infinitive), the word "one" and the word "that." At this juncture, the system determines if the word immediately preceding the "to be" verb is a verb. If the word immediately preceding the "to be" verb is a verb, then the system converts the verb following the word "that" to the infinitive form. The system will then recapitalize as appropriate. The "to be" verb—"one"—"that/who"—verb rule is illustrated below in Example 47.

Examples 47

The internet model is one that offers search, email, calendar, contacts and even word processing as services accessible remotely.
While to friend has become a frivolous verb, to bond might prove to be one that Americans are taking, if anything, more to heart than ever.
The recent upturn in housing starts appears to be one that satisfies a lot of prognosticators.
The internet model is one that offers search, email, calendar, contacts and even word processing as services accessible remotely.
While to friend has become a frivolous verb, to bond might prove to be one that Americans are taking, if anything, more to heart than ever.
The recent upturn in housing starts appears to be one that satisfies a lot of prognosticators.
The internet model is one that offers search, email, calendar, contacts and even word processing as services accessible remotely.
While to friend has become a frivolous verb, to bond might prove to be one that Americans are taking, if anything, more to heart than ever.
The recent upturn in housing starts appears to be one that satisfies a lot of prognosticators.
The internet model is one that offers search, email, calendar, contacts and even word processing as services accessible remotely.
While to friend has become a frivolous verb, to bond might prove to be one that Americans are taking, if anything, more to heart than ever.
The recent upturn in housing starts appears to be one that satisfies a lot of prognosticators.
The internet model is one that offers search, email, calendar, contacts and even word processing as services accessible remotely.
While to friend has become a frivolous verb, to bond might prove to be one that Americans are taking, if anything, more to heart than ever.
The recent upturn in housing starts appears to be one that satisfies a lot of prognosticators.
The internet model offers search, email, calendar, contacts and even word processing as services accessible remotely.
While to friend has become a frivolous verb, to bond might prove to be one that Americans are taking, if anything, more to heart than ever.
The recent upturn in housing starts appears to satisfies a lot of prognosticators.
The internet model offers search, email, calendar, contacts and even word processing as services accessible remotely.
While to friend has become a frivolous verb, to bond might prove to be one that Americans are taking, if anything, more to heart than ever.
The recent upturn in housing starts appears to satisfies a lot of prognosticators.
The internet model offers search, email, calendar, contacts and even word processing as services accessible remotely.

-continued

While to friend has become a frivolous verb, to bond might prove to be one that Americans are taking, if anything, more to heart than ever.
The recent upturn in housing starts *appears* to *satisfy* a lot of prognosticators.
The internet model offers search, email, calendar, contacts and even word processing as services accessible remotely.
While to friend has become a frivolous verb, to bond might prove to be one that Americans are taking, if anything, more to heart than ever.
The recent upturn in housing starts appears to satisfy a lot of prognosticators.

E. Noun Unit—"that/Who"—"to have" Verb—"to be"—Past Participle

This rule has sub-rules, numbered consecutively with the sub rules for the previous rule, beginning with twenty: 20. [referring to the question posed in Step 10] if no, is "that/who" immediately preceded by a noun unit?; 21. if yes, is "that/who" immediately followed by a "to have" verb?; 22. if yes, do next seven words include infinitive "to be", followed immediately by a past participle?; 23. if yes, system deletes all words from "that/who" through "to be"; 24. System capitalizes.

In some embodiments, the system searches for the word "that" and determines if the word immediately preceding the word "that" is a "to be" verb. If the word immediately preceding the "that" is not a "to be" verb, then the system determines if a "to be" verb appears anywhere before the word "that" or the word "who." If a "to be" verb does not appear anywhere before the word "that" or the word "who," then the system determines if the word "that" or the word "who" is immediately preceded by a noun unit. If the word "that" or the word "who" is immediately preceded by a noun unit, then the system determines if the word "that" or the word "who" is immediately followed by a "to have" verb. If the word "that" or the word "who" is immediately followed by a "to have" verb, then the system determines if the next seven words include the infinitive "to be," followed immediately by a past participle. If the next seven words include the infinitive "to be," followed immediately by a past participle, then the system deletes all words from the word "that" or the word "who" through the "to be" infinitive. At this juncture, the system recapitalizes as appropriate. The noun unit—"that/who"—"to have" verb—"_____ to be"—past participle rule is illustrated in Example 48 below.

Example 48

"Before these whirlwinds come on there appears a heavy cloud to the northeast which is very black near the horizon," reported Dampier, describing the wall of cumulus and cumulonimbus clouds that has since come to be referred to as the "bar" of a tropical cyclone.
"Before these whirlwinds come on there appears a heavy cloud to the northeast which is very black near the horizon," reported Dampier, describing the wall of cumulus and cumulonimbus clouds that has since come to be referred to as the "bar" of a tropical cyclone.
"Before these whirlwinds come on there appears a heavy cloud to the northeast which is very black near the horizon," reported Dampier, describing the wall of cumulus and cumulonimbus clouds that has since come to be referred to as the "bar" of a tropical cyclone.
"Before these whirlwinds come on there appears a heavy cloud to the northeast which is very black near the horizon," reported Dampier, describing the wall of cumulus and cumulonimbus clouds that has since come *to be referred* to as the "bar" of a tropical cyclone.
"Before these whirlwinds come on there appears a heavy cloud to the northeast which is very black near the horizon," reported Dampier, describing the wall of cumulus and cumulonimbus clouds *referred* to as the "bar" of a tropical cyclone.

"Before these whirlwinds come on there appears a heavy cloud to the northeast which is very black near the horizon," reported Dampier, describing the wall of cumulus and cumulonimbus clouds referred to as the "bar" of a tropical cyclone.

F. Noun Unit—"that/Who"—"to be" Verb—Infinitive

This rule has sub-rules, numbered consecutively with the sub-rules for the previous rule, beginning with twenty-five: 25. [referring to the question posed in Step 21] if no, is "that/who" immediately followed by a "to be" verb?; 26. if yes, is "to be" verb followed immediately by an infinitive?; 27. if yes, system deletes "to be" verb and "to"; 28. verb following "that/who" must match former "to be" verb in tense and number 29. System capitalizes.

In some embodiments, the system searches for the word "that" and determines if the word immediately preceding the word "that" is a "to be" verb. If the word immediately preceding the word "that" is not a "to be" verb, then the system determines if a "to be" verb appears anywhere before the word "that" or the word "who." If a "to be" verb does not appear anywhere before the word "that" or the word "who," then the system determines if the word "that" or the word "who" is immediately preceded by a noun unit.

If the word "that" or the word "who" is immediately preceded by a noun unit, the system determines if the word "that" or the word "who" is immediately followed by a "to have" verb. If the word "that" or the word "who" is not immediately followed by a "to have" verb, then the system determines if the word "that" or the word "who" is immediately followed by a "to be" verb.

If the word "that" or the word "who" is immediately followed by a "to be" verb, then the system determines if the "to be" verb is followed immediately by an infinitive. If the "to be" verb is followed immediately by an infinitive, then the system deletes the "to be" verb and the word "to." At this juncture, the system matches the verb following the word "that" or the word "who" with the former "to be" verb, both in tense and in number. At this junction, the system capitalizes or recapitalizes as appropriate. The noun unit—"that/who"—"to be" verb—infinitive rule is illustrated in Example 49 below.

Example 49

He and his ship were, in fact, destined to employ what one senior officer called Plage's "peculiar magic" and play an outsized role in an impending drama that was to change the nature of seafaring navies forever.
He and his ship were, in fact, destined to employ what one senior officer called Plage's "peculiar magic" and play an outsized role in an impending drama that was to change the nature of seafaring navies forever.
He and his ship were, in fact, destined to employ what one senior officer called Plage's "peculiar magic" and play an outsized role in an impending that was to change the nature of seafaring navies forever.
He and his ship were, in fact, destined to employ what one senior officer called Plage's "peculiar magic" and play an outsized role in an impending that change the nature of seafaring navies forever.
He and his ship were, in fact, destined to employ what one senior officer called Plage's "peculiar magic" and play an outsized role in an impending that changed the nature of seafaring navies forever.

He and his ship were, in fact, destined to employ what one senior officer called Plage's "peculiar magic" and play an outsized role in an impending drama that changed the nature of seafaring navies forever.

G. "That/Who"—"to be" Verb

This rule has sub-rules, numbered consecutively with the sub-rules for the previous rule, beginning with thirty:

30. [referring to the question posed in Step 26] if no, is "to be" verb followed immediately by a noun unit?; 31. if yes, system ignores; 32. if no, is "to be" verb followed immediately by an adjective?; 33. if yes, is "that" preceded immediately by a noun?; 34. if yes, system deletes "that/who" and "to be" verb; 35. System asks User, "Which works better?" and displays both noun before adjective and adjective before noun; 36. User selects one or the other; 37. [referring to the question posed by Step 32] if no, system deletes "that/who" and "to be" verb; 38. System capitalizes (other sub-rules will examine remaining "that"s).

In some embodiments, the system searches for the word "that" and determines if the word "that" is immediately preceded by a "to be" verb. If the word immediately preceding the word "that" is not a "to be" verb, then the system determines if a "to be" verb appears anywhere before the word "that" or the word "who."

If the "to be" verb does not appear anywhere before the word "that" or the word "who," then the system determines if the word "that" or the word "who" is immediately preceded by a noun unit. If the word "that" or the word "who" is immediately preceded by a noun unit, then the system determines if the word "that" or the word "who" is immediately followed by a "to have" verb. If the word "that" or the word "who" is not immediately followed by a "to have" verb, then the system determines if the word "that" or the word "who" is immediately followed by a "to be" verb.

If the word "that" or the word "who" is followed immediately by a "to be" verb, the system determines if the "to be" verb is followed immediately by an infinitive. If the "to be" verb is not followed immediately by an infinitive, then the system determines if the "to be" verb is followed immediately by a noun unit. If the "to be" verb is not followed immediately by a noun unit, then the system determines if the "to be" verb is followed immediately by an adjective.

If the "to be" verb is followed immediately by an adjective, then the system determines if the word "that" is preceded immediately by a noun. If the word "that" is preceded immediately by a noun, then the system deletes the word "that" or the word "who" and the "to be" verb. At this juncture, the system prompts the user: "Which works better?" And displays both the noun before the adjective and the adjective before the noun. The user will have the opportunity to select one or the other of the two options.

If, however, the "to be" verb is not followed immediately by an adjective, then the system deletes the word "that" or the word "who" and the "to be" verb. At this juncture, the system will capitalize or recapitalize as appropriate. As illustrated herein, other sub-rules examine any remaining "that" words. The "that/who"—"to be" verb rule is illustrated in Example 50 below.

Example 50

The famous example that Alfred Hitchcock gave concerns a bomb that is placed under a table.
A lot of the time what happens is that the little impulse that gets me started on a story leads to something that's more interesting.
But that is the problem we are trying to solve.
The girl then pointed to the overpass that was located directly behind me and said, "Did you see that one?"
This method forces you to create a paragraph of argument that is bulletproof.
The famous example that Alfred Hitchcock gave concerns a bomb that is placed under a table.
A lot of the time what happens is that the little impulse that gets me started on a story leads to something that's more interesting.
But that is the problem we are trying to solve.
The girl then pointed to the overpass that was located directly behind me and said, "Did you see that one?"
This method forces you to create a paragraph of argument that is bulletproof.
The famous example that Alfred Hitchcock gave concerns a bomb that is placed under a table.
A lot of the time what happens is that the little impulse that gets me started on a story leads to something that's more interesting.
But that is the problem we are trying to solve.
The girl then pointed to the overpass that was located directly behind me and said, "Did you see that one?"
This method forces you to create a paragraph of argument that is bulletproof.
The famous example that Alfred Hitchcock gave concerns a bomb that is placed under a table.
A lot of the time what happens is that the little impulse that gets me started on a story leads to something that's more interesting.
But that is the problem we are trying to solve.
The girl then pointed to the overpass that was located directly behind me and said, "Did you see that one?"
This method forces you to create a paragraph of argument that is bulletproof.
The famous example that Alfred Hitchcock gave concerns a bomb that is placed under a table.
A lot of the time what happens is that the little impulse that gets me started on a story leads to something that's more interesting.
But that is the problem we are trying to solve.
The girl then pointed to the overpass that was located directly behind me and said, "Did you see that one?"
This method forces you to create a paragraph of argument that is bulletproof.
The famous example that Alfred Hitchcock gave concerns a bomb that is placed under a table.
A lot of the time what happens is that the little impulse that gets me started on a story leads to something more interesting.
But that is the problem we are trying to solve.
The girl then pointed to the overpass that was located directly behind me and said, "Did you see that one?"
This method forces you to create a paragraph of argument bulletproof.
The famous example that Alfred Hitchcock gave concerns a bomb that is placed under a table.
A lot of the time what happens is that the little impulse that gets me started on a story leads to something more interesting. [more interesting something]
But that is the problem we are trying to solve.
The girl then pointed to the overpass that was located directly behind me and said, "Did you see that one?"
This method forces you to create a paragraph of argument bulletproof. [bulletproof argument]
The famous example that Alfred Hitchcock gave concerns a bomb that is placed under a table.
A lot of the time what happens is that the little impulse that gets me started on a story leads to something more interesting.
But that is the problem we are trying to solve.
The girl then pointed to the overpass that was located directly behind me and said, "Did you see that one?"
This method forces you to create a paragraph of bulletproof argument.
The famous example that Alfred Hitchcock gave concerns a bomb placed under a table.
A lot of the time what happens is that the little impulse that gets me started on a story leads to something more interesting.
But that is the problem we are trying to solve.
The girl then pointed to the overpass located directly behind me and -continued said, "Did you see that one?"
    This method forces you to create a paragraph of bulletproof argument.
    The famous example that Alfred Hitchcock gave concerns a bomb placed under a table.
    A lot of the time what happens is that the little impulse that gets me started on a story leads to something more interesting.
    But that is the problem we are trying to solve.
    The girl then pointed to the overpass located directly behind me and said, "Did you see that one?"
    This method forces you to create a paragraph of bulletproof argument.

H. "That which"

This rule has sub-rules, numbered consecutively with the rules for the previous rule, beginning with thirty nine: 39. [referring to the question posed in Step 25] if no, is "that" followed immediately by "which"; 40. if yes, system replaces "that which" with "what".

In some embodiments, the system searches for the word "that" and determines if the word "that" is immediately preceded by a "to be" verb. If the word "that" is not immediately preceded by a "to be" verb, then the system determines if a "to be" verb appears anywhere before the word "that" or the word "who." If a "to be" verb does not appear anywhere before the word "that" or the word "who," the system determines if the word "that" or the word "who" is immediately preceded by a noun unit.

If the word "that" or the word "who" is immediately preceded by a noun unit, the system determines if the word "that" or the word "who" is immediately followed by a "to have" verb. If the word "that" or the word "who" is not immediately followed by a "to have" verb, then the system determines if the word "that" or the word "who" is immediately followed by a "to be" verb.

If the word "that" or the word "who" is not immediately followed by a "to be" verb, the system determines if the word "that" is followed immediately by the word "which." If the word "that" is followed immediately by the word "which," then the system replaces the phrase "that which" with the word "what." The "that which" rule is illustrated in Example 51 below.

Example 51

Kosco's staff, who maintained a round-the-clock weather watch on the navigation deck of the New Jersey, realized that the meteorological equipment on Halsey's flag ship was not that much more efficient than that which sailors of Bowditch's era carried on sea voyages.
Kosco's staff, who maintained a round-the-clock weather watch on the navigation deck of the New Jersey, realized that the meteorological equipment on Halsey's flag ship was not that much more efficient than that which sailors of Bowditch's era carried on sea voyages.
Kosco's staff, who maintained a round-the-clock weather watch on the navigation deck of the New Jersey, realized that the meteorological equipment on Halsey's flag ship was not that much more efficient than what sailors of Bowditch's era carried on sea voyages.

I. "That" in First Seven Words of Sentence

This rule has sub-rules, numbered consecutively with the sub-rules for the previous rule, beginning with forty one: 41. [referring to Step 2] excluding prepositional phrases and words within commas, does the "that" appear in the first three through seven words of the sentence?; 42. if yes, is word immediately preceding "that" a noun/pronoun?; 43. if yes, system ignores; 44. if no, system indicates or "dims" (e.g., de-emphasizes by dimming a brightness of the words on the screen, reducing a font size, changing a color, changing a background color, leaving a blank, etc.) all words from beginning of sentence through "that" (except prepositional phrases not beginning with "of" and words within commas) and asks User "Do you need these words?"; 45. if User says, "Yes," the system un-dims; 46. if User says, "No," system deletes all dimmed words; 47. System capitalizes.

In some embodiments, the system searches for the word "that" and asks "Does the word 'that' appear in the first three through seven words of the sentence?" If the word "that" appears within the first three through seven words of the sentence, then the system determines if the word immediately preceding the word "that" is a noun or a pronoun. If the word immediately preceding the word "that" is a noun or a pronoun, then the system ignores the phrase.

If the word immediately preceding the word "that" is not a noun or a pronoun, then the system dims all words from the beginning of the sentence through the word "that," excluding prepositional phrases not beginning with the word "of" and words between commas, and asks the user "Do you need these words?" If the user says, "Yes, the words are needed," then the system will undim all of the previously dimmed words. If the user elects "No," then the system deletes all of the dimmed words. At this juncture, the system capitalizes or recapitalizes as appropriate. The "that" in first seven words of sentence rule is illustrated in Example 52 below.

Example 52

A good rule of thumb is that most handicraft stores are open to haggling, and markets specializing in handicrafts expect it.
We have been aware for many years now that an update of Churchill was long overdue.
I told him that it was because I think they are making him one of this year's Best and Brightest.
On the other hand, we have found that many other users are comfortable with a more analytical account of writing.
I will say, however, that ribbed condoms have the greatest effect at the entrance to the vagina.
Kosco predicted that the storm would collide with the cold front bearing down across Japan and rebound to the northeast.
A good rule of thumb is that most handicraft stores are open to haggling, and markets specializing in handicrafts expect it.
We have been aware for many years now that an update of Churchill was long overdue.
I told him that it was because I think they are making him one of this year's Best and Brightest.
On the other hand, we have found that many other users are comfortable with a more analytical account of writing.
I will say, however, that ribbed condoms have the greatest effect at the entrance to the vagina.
Kosco predicted that the storm would collide with the cold front bearing down across Japan and rebound to the northeast.
A good rule of thumb is that most handicraft stores are open to haggling, and markets specializing in handicrafts expect it.
We have been aware for many years now that an update of Churchill was long overdue.
I told him that it was because I think they are making him one of this year's Best and Brightest.
On the other hand, we have found that many other users are comfortable with a more analytical account of writing.
I will say, however, that ribbed condoms have the greatest effect at the entrance to the vagina.
Kosco predicted that the storm would collide with the cold front bearing down across Japan and rebound to the northeast.
A good rule of thumb is that most handicraft stores are open to haggling, and markets specializing in handicrafts expect it.
We have been aware for many years now that an update of Churchill was long overdue.
I told him that it was because I think they are making him one of this year's Best and Brightest.
On the other hand, we have found that many other users are comfortable with a more analytical account of writing.

-continued

I will say, however, that ribbed condoms have the greatest effect at the entrance to the vagina.
Kosco predicted that the storm would collide with the cold front bearing down across Japan and rebound to the northeast.
A good rule of thumb is that most handicraft stores are open to haggling, and markets specializing in handicrafts expect it.
We have been aware for many years now that an update of Churchill was long overdue.
I told him that it was because I think they are making him one of this year's Best and Brightest.
On the other hand, we have found that many other users are comfortable with a more analytical account of writing.
I will say, however, that ribbed condoms have the greatest effect at the entrance to the vagina.
Kosco predicted that the storm would collide with the cold front bearing down across Japan and rebound to the northeast.
most handicraft stores are open to haggling, and markets specializing in handicrafts expect it.
for many years_an update of Churchill was long overdue.
I told him that it was because I think they are making him one of this year's Best and Brightest.
On the other hand many other users are comfortable with a more analytical account of writing.
however, ribbed condoms have the greatest effect at the entrance to the vagina.
the storm would collide with the cold front bearing down across Japan and rebound to the northeast.
Most handicraft stores are open to haggling, and markets specializing in handicrafts expect it.
For many years_an update of Churchill was long overdue.
I told him that it was because I think they are making him one of this year's Best and Brightest.
On the other hand many other users are comfortable with a more analytical account of writing.
However, ribbed condoms have the greatest effect at the entrance to the vagina.
The storm would collide with the cold front bearing down across Japan and rebound to the northeast.

J. "That/Who"—Verb Unit (not Including "to be" Verb)=FALSE POSITIVE

This rule has sub-rules, numbered consecutively with the sub-rules for the previous rule, beginning with forty eight: 48. [after Step 47, the system will examine any "that"s left by first searching for FALSE POSITIVES]; 49. is word immediately following "that" a verb unit, including past and present participles?; 50. if yes, system ignores (another sub-rule will examine remaining "that").

In some embodiments, after the system performs the "that"-in-the-first-seven-words-of-sentence rule, the system will examine any "that"s left by searching for FALSE POSITIVES. For example, the system will determine if the word immediately following the word "that" is a verb unit, including past and present participles. If the word following the word "that" is a verb unit including past and present participles, then the system will ignore the phrase, leaving for another sub-rule to examine any remaining "that"s. The "that/who"—verb unit (not including "to be" verb)=FALSE POSITIVE rule is illustrated in Example 53 below.

Example 53

Under the influence of drink and the strangeness of the night, Blount admitted he was terrified of the fighting that almost certainly lay before him.
Yahoo! took advantage of this in its new web mail software that lets you drag and drop appointments and messages, just like a desktop program.
But Cobra, as tightly coiled as a DNA helix, was maturing so slowly that she was not yet throwing out to her periphery the massive gusts and swells that would typically herald the arrival of a full-blown typhoon.

Under the influence of drink and the strangeness of the night, Blount admitted he was terrified of the fighting that almost certainly lay before him.
Yahoo! took advantage of this in its new web mail software that lets you drag and drop appointments and messages, just like a desktop program.
But Cobra, as tightly coiled as a DNA helix, was maturing so slowly that she was not yet throwing out to her periphery the massive gusts and swells that would typically herald the arrival of a full-blown typhoon.
Under the influence of drink and the strangeness of the night, Blount admitted he was terrified of the fighting that almost certainly lay before him.
Yahoo! took advantage of this in its new web mail software that lets you drag and drop appointments and messages, just like a desktop program.
But Cobra, as tightly coiled as a DNA helix, was maturing so slowly that she was not yet throwing out to her periphery the massive gusts and swells that would typically herald the arrival of a full-blown typhoon.
Under the influence of drink and the strangeness of the night, Blount admitted he was terrified of the fighting that almost certainly lay before him.
Yahoo! took advantage of this in its new web mail software that lets you drag and drop appointments and messages, just like a desktop program.
But Cobra, as tightly coiled as a DNA helix, was maturing so slowly that she was not yet throwing out to her periphery the massive gusts and swells that would typically herald the arrival of a full-blown typhoon.

K. "That"—"Because" "for" "Since" "as" "Inasmuch"=FALSE POSITIVE

This rule has sub-rules, numbered consecutively with the sub-rules for the previous rule, beginning with fifty one: 51. [referring to the question posed in Step 49] if no, is word immediately following "that" "because", "for", "since", "as", or "inasmuch"?; 52. if yes, system ignores.

In some embodiments, after the rule has completed the "that"-in-first-seven-words-of-sentence rule, the system will examine any "that"s left by first searching for FALSE POSITIVES. The system will determine if the word immediately following the word "that" is a verb unit including any past or present participles. If not, then the system determines if the word immediately following the word "that" is the word "that," the word "because," the word "for," the word "since," the word "as," or the word "inasmuch." If the word "that", the word "because," the word "for," the word "since," the word "as," or the word "inasmuch" immediately follows the word "that," then the system ignores the phrase. The "that"—"because" "for" "since" "as" "inasmuch"=FALSE POSITIVE rule is illustrated in Example 54 below.

Example 54

McCrane had no way of knowing that because of the pounding the ship was taking, the overhead in the engine room was starting to rip loose from her bulkheads.
McCrane had no way of knowing that because of the pounding the ship was taking, the overhead in the engine room was starting to rip loose from her bulkheads.
McCrane had no way of knowing that because of the pounding the ship was taking, the overhead in the engine room was starting to rip loose from her bulkheads.

L. Preposition—"that"=FALSE POSITIVE

This rule has sub-rules, numbered consecutively with the sub-rules for the previous rule, beginning with fifty three: 53. [referring to the question posed in Step 48] if no, is word immediately preceding "that" a preposition?; 54. if yes, system ignores (another sub rule will examine remaining "that").

In some embodiments, after the system has completed the "that"-in-first-seven-words-of-sentence rule, the system will examine any "that" words left by search for FALSE POSITIVES. In some embodiments, the system will determine if the word immediately preceding the word "that" is a preposition. If the word immediately preceding the word "that" is a preposition, the system will ignore the phrase (allowing another sub-rule to examine any remaining "that" words). The preposition—"that"=FALSE POSITIVE rule is illustrated in Example 55 below.

Example 55

Recall that the central conceptual terms will go toward the end of that POINT sentence.
At that moment I knew he could really see me.
In that context of skepticism toward science some reasonable questions have been raised.
I wished I was out of that tree, but I dasn't come down.
Recall that the central conceptual terms will go toward the end of that POINT sentence.
At that moment I knew he could really see me.
In that context of skepticism toward science some reasonable questions have been raised.
I wished I was out of that tree, but I dasn't come down.
Recall that the central conceptual terms will go toward the end of that POINT sentence.
At that moment I knew he could really see me.
In that context of skepticism toward science some reasonable questions have been raised.
I wished I was out of that tree, but I dasn't come down.

M. "That/Who/Whom"—Pronoun—TRUE POSITIVE

This rule has sub-rules, numbered consecutively with the sub-rules for the previous rule, beginning with fifty-five: 55. [referring to the question posed in Step 51] if no, is word immediately following "that/who/whom" a pronoun?; 56. if yes, system deletes "that/who/whom"

In some embodiments, after the system has completed the "that"-in-first-seven-words-of-sentence rule, the system will examine any "that" left by searching for FALSE POSITIVES. In some embodiments, the system determines if the word immediately following the word "that/who/whom" is a pronoun. If the word immediately following the word "that/who/whom" is a pronoun, then the system will delete the word "that/who/whom." The "that/who/whom"—pronoun—TRUE POSITIVE rule is illustrated in Example 56 below.

Example 56

This book is specifically for screenwriters who want to learn how to write the most commercial, money-making "Megahit" that they can.
He also concluded that the request, at this point in time, would give him a career jump on the generation of men whom he was certain would shortly be called up or drafted.
You can be certain that your readers will find your document confusing.
"You can't hear," he said, already moving his lips more deliberately, so that she might understand.
One of them that I came across sold a lot of Banksy's original art and screen prints.
Many feel that they owe the Sunnis nothing after years of oppression.
This book is specifically for screenwriters who want to learn how to write the most commercial, money-making "Megahit" that they can.
He also concluded that the request, at this point in time, would give him a career jump on the generation of men whom he was certain would shortly be called up or drafted.
You can be certain that your readers will find your document confusing.
"You can't hear," he said, already moving his lips more deliberately, so that she might understand.
One of them that I came across sold a lot of Banksy's original art and screen prints.

-continued

Many feel that they owe the Sunnis nothing after years of oppression.
This book is specifically for screenwriters who want to learn how to write the most commercial, money-making "Megahit" they can.
He also concluded that the request, at this point in time, would give him a career jump on the generation of men he was certain would shortly be called up or drafted.
You can be certain your readers will find your document confusing.
"You can't hear," he said, already moving his lips more deliberately, so she might understand.
One of them I came across sold a lot of Banksy's original art and screen prints.
Many feel they owe the Sunnis nothing after years of oppression.
This book is specifically for screenwriters who want to learn how to write the most commercial, money-making "Megahit" they can.
He also concluded that the request, at this point in time, would give him a career jump on the generation of men he was certain would shortly be called up or drafted.
You can be certain your readers will find your document confusing.
"You can't hear," he said, already moving his lips more deliberately, so she might understand.
One of them I came across sold a lot of Banksy's original art and screen prints.
Many feel they owe the Sunnis nothing after years of oppression.

N. "That/Who/Whom"—Noun

This rule has sub-rules, numbered consecutively with the sub-rules for the previous rule, beginning with fifty-seven: 57. [referring to the question posed in Step 55] is/are the word(s) following "that/who/whom" a noun unit?; 58. if yes, does "that/who/whom" immediately follow a comma?; 59. if yes, system ignores; 60. Does noun unit introduce a noun-that/who-verb combination?; 61. if yes, system ignores; 62. if neither exception above exists, system deletes "that/who/whom"; 63. System highlights two words on either side of the deleted "that/who/whom"; 64. System prompts user: "Does this sound okay to you, or do you prefer to reinsert "that/[who/whom]" between these two words?"; 65. User responds okay or prefer original.

In some embodiments, after completing the "that/who/whom"—pronoun—TRUE POSITIVE rule, the system determines if the words following the word "that/who/whom" is a noun unit. If the word or words following the word "that/who/whom" is a noun unit, then the system determines if the word "that/who/whom" immediately follows a comma. If the word "that/who/whom" immediately follows a comma, the system will ignore the phrase.

The system will determine at this juncture whether a noun unit introduces a noun—that/who—verb combination. If a noun unit introduces a noun—that/who—verb combination, then the system will ignore the phrase. If the word "that/who/whom" does not follow a comma, and the word(s) following "that" is not a noun unit introducing a noun—that/who—verb combination, then the system will dim the word "that/who/whom." The system will prompt the user: "Does this sound OK to you, or do you prefer to reinsert 'that/who/whom' between these two words?" The user responds, "OK" or "Prefer original." If the user responds "OK," then in some embodiments the system will recapitalize as appropriate. If the user responds, "Prefer original," then the system will replace the provisional sentence with the original phrasing. The "that/who/whom"—noun rule is illustrated in Example 57 below.

Example 57

An activity is anything that a character might be doing in a scene.
Ajax is also the basis of a package of programs and services that Microsoft is bundling under the catchall brand Windows Live.
Dr. Lee admits that this information is confidential to Microsoft.

-continued

The character's belief keeps the story alive, gives us the needed shred of hope that the goal might still be achieved.
Not all readers like headings; some feel they give a crude vocational look to writing, that good readers don't need them.
Second, I suspect - though this is rarely expressed openly - they worry that anything that advocates for boys and young men must, in some way, be antiwoman.
An activity is anything that a character might be doing in a scene.
Ajax is also the basis of a package of programs and services that Microsoft is bundling under the catchall brand Windows Live.
Dr. Lee admits that this information is confidential to Microsoft.
The character's belief keeps the story alive, gives us the needed shred of hope that the goal might still be achieved.
Not all readers like headings; some feel they give a crude vocational look to writing, that good readers don't need them.
Second, I suspect - though this is rarely expressed openly - they worry that anything that advocates for boys and young men must, in some way, be antiwoman.
An activity is anything that a character might be doing in a scene.
Ajax is also the basis of a package of programs and services that Microsoft is bundling under the catchall brand Windows Live.
Dr. Lee admits that this information is confidential to Microsoft.
The character's belief keeps the story alive, gives us the needed shred of hope that the goal might still be achieved.
Not all readers like headings; some feel they give a crude vocational look to writing, *that* good readers don't need them.
Second, I suspect - though this is rarely expressed openly - they worry that anything that advocates for boys and young men must, in some way, be antiwoman.
An activity is anything that a character might be doing in a scene.
Ajax is also the basis of a package of programs and services that Microsoft is bundling under the catchall brand Windows Live.
Dr. Lee admits that this information is confidential to Microsoft.
The character's belief keeps the story alive, gives us the needed shred of hope that the goal might still be achieved.
Not all readers like headings; some feel they give a crude vocational look to writing, that good readers don't need them.
Second, I suspect - though this is rarely expressed openly - they worry that anything that advocates for boys and young men must, in some way, be antiwoman.
An activity is anything that a character might be doing in a scene.
Ajax is also the basis of a package of programs and services that Microsoft is bundling under the catchall brand Windows Live.
Dr. Lee admits that this information is confidential to Microsoft.
The character's belief keeps the story alive, gives us the needed shred of hope that the goal might still be achieved.
Not all readers like headings; some feel they give a crude vocational look to writing, that good readers don't need them.
Second, I suspect - though this is rarely expressed openly - they worry that *anything that advocates* for boys and young men must, in some way, be antiwoman.
An activity is anything that a character might be doing in a scene.
Ajax is also the basis of a package of programs and services that Microsoft is bundling under the catchall brand Windows Live.
Dr. Lee admits that this information is confidential to Microsoft.
The character's belief keeps the story alive, gives us the needed shred of hope that the goal might still be achieved.
Not all readers like headings; some feel they give a crude vocational look to writing, that good readers don't need them.
Second, I suspect - though this is rarely expressed openly - they worry that anything that advocates for boys and young men must, in some way, be antiwoman.
An activity is anything a character might be doing in a scene.
Ajax is also the basis of a package of programs and services Microsoft is bundling under the catchall brand Windows Live.
Dr. Lee admits this information is confidential to Microsoft.
The character's belief keeps the story alive, gives us the needed shred of hope the goal might still be achieved.
Not all readers like headings; some feel they give a crude vocational look to writing, that good readers don't need them.
Second, I suspect - though this is rarely expressed openly - they worry that anything that advocates for boys and young men must, in some way, be antiwoman.
An activity is anything a character might be doing in a scene.
Ajax is also the basis of a package of programs and services Microsoft is bundling under the catchall brand Windows Live.
Dr. Lee admits this information is confidential to Microsoft.
The character's belief keeps the story alive, gives us the needed shred of hope the goal might still be achieved.
Not all readers like headings; some feel they give a crude vocational -continued look to writing, that good readers don't need them.
Second, I suspect - though this is rarely expressed openly - they worry that anything that advocates for boys and young men must, in some way, be antiwoman.

IX. "Of" Rule

The signpost word "of" often reveals various unnecessary words. The following rule narrows the use of the word "of". In some instances the system can indicate or "dim" (e.g., de-emphasize by dimming a brightness of the words on the screen, reducing a font size, changing a color, changing a background color, leaving a blank, etc.) the word "of," a noun immediately before the "of," an article immediately before the noun, and the noun unit after the "of." At the same time, the system or computer implementable method would prompt the user: "Would you like to get rid of any of these words?"

A. Of: False Positives

In some embodiments, the system searches for the word "of" and determines if the word "of" is part of a false positive. False positives includes those phrases found in Table 5 below. If the word "of" is part of a false positive, then the system ignores the phrase. As with all word lists and pools in this specification, all lists in Section IX are for example only; they are not meant to be exhaustive.

TABLE 5

Example "of" phrase False Positives

| | |
|---|---|
| advantage of | package of |
| all of [noun] | part of |
| of all | percentage of |
| basis of | portion of |
| [capitalized word] of | range of |
| charge of | rate of |
| edition of | rest of |
| example of | rid of |
| growth of | some of |
| lack of | standard(s) of |
| list of | survey of |
| many of | tale of |
| meaning of | the ___ of the ___ |
| number of | time of |
| use of | [time noun] of |
| variety of | tip of |
| [infinitive] - of | |

First, the system searches for the word "of" and determines if the word "of" is part of a false positive. If the word "of" is part of a false positive, then the system will ignore the phrase. If, however, the word "of" is not part of a false positive, the system determines if the word "of" is part of a true positive (see below). True positives are illustrated in Table 6 below. If the word "of" is part of a true positive, the system determines if the true positive is preceded by an adjective. If the true positive is not preceded by an adjective, then the system deletes the phrase. These steps can be summarized thus:
 1. System searches for "of"
 2. is "of" part of a false positive?
 3. if yes, System ignores
B. Of: True Positives True positives are illustrated in Table 6 below. If the word "of" is part of a true positive, the system determines if the true positive is preceded by an adjective. If the true positive is not preceded by an adjective, then the system deletes the phrase. These steps can be summarized thus:
 4. [referring to the question posed in Step 2] if no, is "of" part of a true positive?
 5. if yes, is true positive preceded by an adjective?

6. [referring to the question posed in Step 4] if no, System deletes

TABLE 6

Example "of" phrase True Positives

| | |
|---|---|
| (preposition) any of | delete "any of" |
| act of | delete "the [an] act of" |
| all of [pronoun] | delete "all of" |
| amount of | |
| any of [pronoun] | delete "of" and pronoun |
| area(s) of | delete "the area(s) of" |
| bit of | delete "bit of" |
| center of [pronoun] | |
| course of | delete "the ___ course of" |
| difference of ["minus" "subtracted from" within six words - delete "the difference of"] | |
| "the" ___ noun of each | delete "of each", change "the" to "their" |
| existence of | delete "the existence of" |
| free of charge | delete "of charge" |
| in and of itself | delete "and of" |
| kind of | delete "kind of" |
| many of [objective pronoun] | delete "of" and pronoun |
| nature of | delete "the nature of" |
| of necessity | delete "of necessity" |
| period of | delete "(article) (adjective) period of" |
| of the situation | |
| set of | delete "set of" |
| sum of ["plus" "added to" within six words] | delete "the sum of"" |
| terms of | delete "the terms of" |
| of them | delete "of them" |

C. Of: "Amount of"

7. [referring to the question posed in Step 4] if yes, is true positive "amount of"?

8. if no, System ignores as a false positive

9. [referring to the question posed in Step 7] if yes, is adjective preceded by "a"?

10. if no, System deletes "amount of"

11. [referring to the question posed in Step 9] if yes, System deletes "of" and the noun unit following "of"

In some embodiments, the system searches for the word "of" and determines if the word "of" is part of a false positive. If the word "of" is part of a false positive, then the system ignores the phrase. If the word "of" is not part of a false positive, then the system determines if the word "of" is part of a true positive. If the word "of" is part of a true positive, then the system determines if the true positive is preceded by an adjective. If the true positive is not preceded by an adjective, then the system deletes the phrase. If, however, the true positive is preceded by an adjective, then the system determines if the true positive is the phrase "amount of".

If the true positive is not the phrase "amount of," then the system ignores the phrase as a false positive. If the true positive is the phrase "amount of," then the system determines if the adjective is preceded by the article "a." If the adjective is not preceded by the word "a," then the system deletes the phrase "amount of". If the adjective is preceded by the article "a," then the system deletes the word "of" and the noun unit following the word "of". The "amount of" rule is illustrated in Example 58 below Example 58

Stevens Healthcare, a leading medical services provider in Washington State, says that using SharePoint Portal Server has reduced by 75 percent the amount of time needed for meetings to comply with new federal privacy regulations.

-continued

So while our user base continues to grow steadily, the average amount of time users are spending with us outpaced growth of time spent in the industry.

This is a tiny amount of our income that could save millions of people and make a safer world.

Stevens Healthcare, a leading medical services provider in Washington State, says that using SharePoint Portal Server has reduced by 75 percent the time needed for meetings to comply with new federal privacy regulations.

So while our user base continues to grow steadily, the average time users are spending with us outpaced growth of time spent in the industry.

This is a tiny amount that could save millions of people and make a safer world.

D. Of: "[E]very"—"One"—"of"—"the" or Possessive Pronoun—Plural Noun Unit

12. [referring to the question posed in Step 4] if no, is "of" immediately preceded by the number "one"?

13. if yes, is "one" preceded by "[E]very" "[E]very single" or "[E]very last"

14. if no, system ignores 15. if yes, is "of" followed by "the" "my" "your" "his" "her" "its" "our" "their"?

16. if yes, is that word followed by a plural noun?

17. if yes, system deletes "single" "one" "of" and "the" or possessive pronoun 18. system converts noun to singular form In some embodiments, the system searches for the word "of" and determines if the word "of" is part of a false positive. If the word "of" is not part of a false positive, then the system determines if the word "of" is part of a true positive. If the word "of" is not part of a true positive, then the system determines if the word "of" is immediately preceded by the number "one."

If the word "of" is immediately preceded by a number "one," then the system determines if the word "one" is preceded by the word "every," the phrase "every single," or the phrase "every last." If the word "one" is not preceded by the word "every," the phrase "every single," or the phrase, "every last," then the system ignores the phrase. If, however, the system is preceded by the word "every," the phrase "every single," or the phrase "every last," then the system determines if the word "of" is followed by any of the words "the," "my," "your," "his," "her," "its," "our," or "their." If the word "of" is followed by any of the words "the," "my," "your," "his," "her," "its," "our," or "their," then the system determines if that word is followed by a plural noun. If it is, then the system deletes the word "single," the word "one," the word "of," and the word "the" or the possessive pronoun. At this juncture, the system converts the noun to a singular form. The "[E]very"—"one"—"of"—"the" or possessive pronoun—plural noun unit rule is illustrated in Example 59 below.

Example 59

Many of the advances in Office System will be obvious to users, but one of the most profound changes isn't as apparent.

Our high standards of quality and commitment to provide the best experience for our users permeated every one of our offerings.

Every single one of the ships battling *Kurita* suffered devastating hits, over 1,000 sailors were killed, and an escort carrier, two destroyers, and one destroyer escort sent to the bottom of the Philippine Sea.

Many of the advances in Office System will be obvious to users, but one of the most profound changes isn't as apparent.

Our high standards of quality and commitment to provide the best experience for our users permeated every offering.

> Every ship battling *Kurita* suffered devastating hits, over 1,000 sailors were killed, and an escort carrier, two destroyers, and one destroyer escort sent to the bottom of the Philippine Sea.

C. [Number] "of"—Noun Unit

19. [referring to the question posed in Step 12] if no, is "of" immediately preceded by any other number or plural of any number, written or numerical (four of, thousands of, 22 of)?

20. if yes, system ignores

In some embodiments, the system searches for the word "of" and determines if the word "of" is part of a false positive. If it is not, then the system determines if the word "of" is part of a true positive. If the word "of" is not part of a true positive, then the system determines if the word "of" is immediately preceded by the number "one." If the word "of" is not immediately preceded by the number "one," then the system determines if the word "of" is immediately preceded by any other number or plural of any number, either written or numerical (e.g., "four of," "thousands of," or "22 of"). If the word "of" is immediately preceded by any other number or plural of any number, either written or numerical, then the system ignores the phrase. The [number] "of"—noun unit rule is illustrated in Example 60 below.

Example 60

> Rescue efforts saved thousands of animals that were later moved from the Gulf Coast to other areas, including the Animal Shelter of the Wood River Valley, near Hailey.
> This is a tiny amount of our income that could save millions of people and make a safer world.

D. Verb—Article—Adjective—Noun—"of"—Noun Unit

21. [referring to the question posed in Step 19], if no, is "of" immediately followed by a noun unit?

22. if yes, is "of" immediately preceded by a noun?
23. if yes, is noun immediately preceded by an adjective?
24. if yes, is adjective immediately preceded by an article?
25. if yes, is article immediately preceded by a verb?
26. if yes, system deletes article, noun, and "of"

In some embodiments, the system searches for the word "of" and determines if the word "of" is part of a false positive. If the word "of" is not part of a false positive, then the system determines if the word "of" is part of a true positive. If the word "of" is not part of a true positive, then the system determines if the word "of" is immediately preceded by the number "one." If the word "of" is not immediately preceded by the number "one," then the system determines if the word "of" is immediately preceded by any other number or plural of any number, either written or numerical. If the word "of" is not immediately preceded by any other numerical number or plural of any number, either written or numerical, then the system determines if the word "of" is immediately followed by a noun unit.

If the word "of" is immediately followed by a noun unit, then the system determines if the word "of" is immediately preceded by a noun. If the word "of" is immediately preceded by a noun, the system determines if the noun is immediately preceded by an adjective. If the noun is immediately preceded by an adjective, the system determines if the adjective is immediately preceded by an article. If the adjective is immediately preceded by an article, the system determines if the article is immediately preceded by a verb. If the article is immediately preceded by the verb, the system deletes the article, the noun and the word "of". The verb—article—adjective—noun—"of"—noun unit rule is illustrated in Example 61 below.

Example 61

> All of these changes are giving people new and better ways to work, but they also bring a new set of challenges.
> The software innovations of the 1980s and 1990s, which revolutionized how we create and manipulate information, have created a new set of challenges.
> All of these changes are giving people new and better ways to work, but they also bring new challenges.
> The software innovations of the 1980s and 1990s, which revolutionized how we create and manipulate information, have created new challenges.

X. "Purpose of" Rule

A. "[T]he Purpose[s] of"—Noun Unit—"to be" Verb—Infinitive 1. system searches for "[T]he purpose[s] of"
2. is "[T]he purpose[s] of" followed by a noun unit?
3. if yes, is the noun unit followed by a "to be" verb?
4. if yes, is the "to be" verb followed by an infinitive?
5. if yes, system deletes "[T]he purpose[s] of", "to be" verb, and "to"
6. system matches number of verb to noun unit
7. system capitalizes In some embodiments, the system searches for the phrase "the purpose of or "the purposes of" If the system finds the phrase "the purpose of" or the phrase "the purposes of," the system determines if the phrase is followed by a noun unit. If the phrase is followed by a noun unit, the system determines if the noun unit is followed by a "to be" verb. If the noun unit is followed by a "to be" verb, then the system determines if the "to be" verb is followed by an infinitive. If the "to be" verb is followed by an infinitive, the system deletes the phrase "the purpose of" (or "the purposes of"), the "to be" verb and the word "to." At this juncture, the system matches the number of the verb to the noun unit and either capitalizes or recapitalizes as appropriate. The "[T]he purpose[s] of"—noun unit—"to be" verb—infinitive rule is illustrated in Example 62 below.

Example 62

> The purpose of this document is to explain the difference between an IRA and a Roth IRA.
> The purpose of this document is to explain the difference between an IRA and a Roth IRA.
> The purpose of *this document* is to explain the difference between an IRA and a Roth IRA.
> The purpose of *this document* is to explain the difference between an IRA and a Roth IRA.
> The purpose of *this document* is [to explain] the difference between an IRA and a Roth IRA.
> *this document* [explain] the difference between an IRA and a Roth IRA.
> *this document* [explains] the difference between an IRA and a Roth IRA.
> This document explains the difference between an IRA and a Roth IRA.

XI. In Rule

In some embodiments, a system can search for the word "in" as a signal to trigger this rule. If any of the following idiomatic phrases are found, the system ignores that occurrence of the term "in" as a false positive: in detail; in love; in the meantime; (verb) in; in mind; in the world; in vain; in heat; etc. (This is only a partial list that has been included as an example; it is not intended to be an exhaustive list.) On the other hand, if any of the following phrases are found, the system replaces them (or suggests that the user replace them) as indicated (and this, too, is only a partial list). Indeed, as with all word lists and pools in this specification, all lists in Section XI are for example only; they are not meant to be exhaustive.

| True Positive | Replacement |
| --- | --- |
| in accordance with | under |
| in advance of | before |
| in the amount of | for |
| in the ___ amount of | for |
| in concert with | with |
| in considering | considering |
| in the context of | under |
| in the course of | during |
| in the direction of | toward |
| in excess of | exceeding |
| in the employ of | employed by |
| in the event | if |
| in the event that | if |
| in the form of | by |
| in hopes of | hoping to |
| in light of | because |
| in light of the fact | because |
| in light of the fact that | because |
| in the majority of ___ | usually |
| in a situation where | where |
| in the situation where | where |

If any of the following phrases are found, the system deletes them (or suggests that the user delete them, as with the "junk words" described above): in addition; (or) in the alternative; in an attempt; in its brief; in any case; in color; in conclusion; in duration; in earnest; in effect; in an effort; in the end; in essence; in fact; in the first instance; in the first place; in the future; in the matter; in other words; in particular; in pertinent part; in point of fact; in price; in the process of; in the present case; in relevant part; in short; in significant part; in size; in some way; in sum; in that moment; in this action; in time.

If any of the following phrases are found, the system prompts the user: "You might delete this phrase or replace it with something shorter." or a similar phrase: in accord; in addition to; in advance; in this aspect; in attendance; in its capacity; in this case; in this cause; in these circumstances; in connection with; in its entirety in no event; in the form of; in this instance; in length; in this matter; in her mind; in his mind; in my mind; in this respect in response to; in a row; in the same manner; in this situation; in that situation; in its subject matter; in such a proceeding; in such a way; in terms of; in their minds; in turn; in your mind; in the way of; in which.

XII. Or Rule

In some embodiments, a system can search for the word "or" as a signal to trigger this rule. If any of the following word groups are found, the system indicates the word "or" and the following words that are part of the indicated word group and prompts the user: "Do you need these words?": "whether or not"; "may or may not". As with all word lists and pools in this specification, all lists in Section XII are for example only; they are not meant to be exhaustive.

XIII. As Rule

In some embodiments, a system can search for the word "as" as a signal to trigger this rule. If any of the following idiomatic phrases are found, the system ignores that occurrence of the term "as" as a false positive: "as" followed by a noun or pronoun; "as ___ as"; "as if", preceded by a "to be" verb or appearing at the beginning of a sentence or clause; "known as"; "may as well have been"; and "such as". As with all word lists and pools in this specification, all lists in Section XIII are for example only; they are not meant to be exhaustive.

If any of the following phrases are found, the system replaces them (or suggests that the user replace them) as indicated:

| True Positive | Replacement |
| --- | --- |
| as concerns | about |
| as a general matter | generally |
| as long as | if |
| as a result | so |
| as a result of | because of |
| as well as | and |

If any of the following phrases are found, the system deletes them (or suggests that the user delete them): defined as; as it happens; as it happened; as is; as a matter of course; regarded as; as set forth; as such; as it was; as well; as a whole; as written.

If any of the following phrases are found, the system indicates the phrase to the user and prompts the user: "Can you delete these words?": as appropriate; as ___ as possible; as far as possible; as if—preceded by any word not a "to be" verb; as much as possible; as necessary; as needed; as I said; as possible; as to; as—verb [highlight both]; as with; as it would be.

XIV. Cliché Rule

In some embodiments, a system can search a pool or database of clichés, any of which can trigger this rule. If any of the following word groups are found, the system can prompt the user: "This is a cliché. Can you delete it or write it in a more original way?" As with all word lists and pools in this specification, all lists in Section XIV are for example only; they are not meant to be exhaustive.

---

| | | |
| --- | --- | --- |
| the bottom line | avoid like the plague | walk a mile in his shoes |
| open Pandora's box | few and far between | barking up the wrong tree |
| catch-22 situation | shoot from the hip | water under the bridge |
| the best of all worlds | fly by the seat of the pants | below the belt |
| out of the blue | let the chips fall where they may | pick your brain |
| state of the art | beating my head against the wall | beating a dead horse |
| high and dry | the whole nine yards | a no-win situation |
| get off his back | between a rock and a hard place | a big deal |

| | | |
|---|---|---|
| tip of the iceberg | grab the bull by the horns | put the cart before the horse |
| the whole ball of wax | back to the drawing board | let the cat out of the bag |
| a disaster area | cut off ___ nose to spite ___ face | slice and dice |
| hit the nail on the head | the forest for the trees | on the nose |

XV. Redundancy Rule

In some embodiments, a system can identify redundant words by recognizing word groupings from a pool of redundant constructions. For example, when the system recognizes the constructions in the following pool, the system can automatically delete, or suggest that the user authorize deletion of, the first word in the set of two words. As with all word lists and pools in this specification, all lists in Section XV are for example only; they are not meant to be exhaustive.

| | | |
|---|---|---|
| brief overview | mandatory requirement | patently obvious |
| sworn testimony | short synopsis | true facts |
| excess verbiage | several different | binding contract |
| actively engaged | basic principles | many diverse |

XVI. Junk Words and Phrases

When the system recognizes the words in this pool, the system preferably replaces the recognized word (on the left) with the word (on the right):

| | |
|---|---|
| firstly | first |
| secondly | second |
| thirdly | third |
| fourthly | fourth |
| fifthly | fifth |

When the system recognizes the words in the following pool, the system preferably prompts the user: "You could probably delete this word."

| | | | | | |
|---|---|---|---|---|---|
| actually | aforementioned | aforesaid | and further | therein | herewith |
| any | apparently | applicable | basic | clearly | expressly |
| basically | currently | directly | effective | totally | quite |
| effectively | essentially | evidently | given | duly | particular |
| herein | at all | hereinafter | heretofore | really | thereof |
| herewith | incurred | individual | just | upcoming | express |
| merely | outright | personally | primarily | necessary | yet |
| purposes | consequently | respective | set forth | respective | squarely |
| simple | simply | sometime | specific | very | else |
| specifically | no doubt | thereby | seeming | | |

In some embodiments, the system identifies words from a pool that commonly play no useful role in a sentence and can be generally removed as "junk" words. In some embodiments, the system highlights or otherwise indicates the junk word and prompts the user: "You could probably delete this word."

A system can also identify junk phrases from a pool of junk phrases. As with all word lists and pools in this specification, all lists in Section XVI are for example only; they are not meant to be exhaustive. The system preferably replaces the following junk phrases automatically with the corresponding replacement words on the right:

| Junk Phrase | Replacement |
|---|---|
| am indebted to | owe |
| are indebted to | owe |
| is indebted to | owes |
| were indebted to | owed |
| was indebted to | owed |
| will be indebted to | will owe |
| have been indebted to | have owed |
| has been indebted to | has owed |
| desires to obtain | desires |
| purports to rely | relies |
| at the time | when |
| incur the cost | pay |
| with certain knowledge | knowing |
| question at issue | question |
| with respect to | about |
| appears to have no relevance | |
| decline to accept | decline |
| reason why | reason |
| reasons why | reasons why |
| briefly stated | briefly |
| generally speaking | generally |

XVII. Word Pairings Rule

As with the "Redundancy Rule" above, when the system recognizes the constructions in the following pool, the system can automatically delete, or suggest that the user authorize deletion of, the first word in the set of two words. As with all word lists and pools in this specification, all lists in Section XVII are for example only; they are not meant to be exhaustive.

| | | |
|---|---|---|
| found in | provided in | provided under |
| provided below | authored by | located at |
| displayed on | found within | imposed under |
| contained in | listed below | included in |
| sent to | taken from | appearing in |
| appearing within | located by | located in |
| contained within | brought by | located next to |
| located behind | located near | located far away |

XVIII. Other Word Pools

Rules can also draw on other word pools not already set forth above. Those additional word pools can include those set forth in the following tables. Except for Table 9, all lists in Section XVIII are for example only and are not intended to be exhaustive:

TABLE 7

Relative Pronouns

| | |
|---|---|
| who | whom |
| where | which |
| whose | that |
| why | when |
| what | |

TABLE 8

Articles

| | |
|---|---|
| the | this |
| that | these |
| those | a |
| an | one |

TABLE 9 forms of "to be"

| | |
|---|---|
| am | are |
| is | be |
| being | was |
| were | been |

TABLE 10

Prepositions

| | | | | | | |
|---|---|---|---|---|---|---|
| IN | IN | BEFORE | SAVING | ALONG | OUT | DESPITE |
| BESIDE | INCLUDING | BEHIND | SINCE | ALONGSIDE | OUTSIDE | DOWN |
| ABOARD | INSIDE | BELOW | THAN | AMID | OVER | DURING |
| ABOUT | INTO | BENEATH | THROUGH | AMIDST | PAST | EXCEPT |
| ABOVE | LESS | BESIDE | THROUGHOUT | AMONG | PENDING | EXCEPTING |
| ABSENT | LIKE | BESIDES | THRU | AMONGST | PER | EXCLUDING |
| ACROSS | MINUS | BETWEEN | TILL | ANTI | PLUS | FAILING |
| AFTER | NEAR | BEYOND | TO | AROUND | REGARDING | FOLLOWING |
| AGAINST | NOTWITHSTANDING | BUT | TOWARD | AS | RESPECTING | FOR |
| AHEAD | OF | BY | TOWARDS | ASIDE | ROUND | FROM |
| UNTO | OFF | CIRCA | UNDER | ASTRADDLE | SAVE | GIVEN |
| BARRING | ON | CONCERNING | UNDERNEATH | ASTRIDE | UP | WANTING |
| VIA | ONTO | CONSIDERING | UNLIKE | AT | UPON | WITH |
| WITHOUT | OPPOSITE | | UNTIL | BAR | VERSUS | WITHIN |

TABLE 11

Personal Pronouns

| | |
|---|---|
| I | those |
| you | him |
| he | her |
| she | them |
| it | their |
| we | his |
| you | our |
| they | |

TABLE 12

Conjunctions

| | |
|---|---|
| but | if |
| whether | and |
| or | because |
| while | during |

Another aspect of the invention involves incorporating some or all of the rules disclosed herein into a document scoring algorithm that assigns quality scores to documents or texts. These quality scores can be used in various ways to assist users in locating well-written documents. For example, an internet search engine could consider the quality scores of documents returned by a search query in ranking these documents for display to a user.

The inventive features described above can also be used in environments and scenarios in which no specific editing suggestion is made to the user. While the systems and methods described herein can, in some embodiments, provide a general editing suggestion or problem description, such as "rewrite sentence to eliminate passive voice," preferred embodiments go further to either make the sentence active, or present the writer with the possibilities for making it active. For example, some rules perform a certain amount of work, then highlight additional parts of a sentence, and prompt the user in a general manner, such as: "Consider rewording the highlighted phrase." A user may be prompted to provide explicit feedback on whether the general suggestion is helpful, such as by selecting either a "yes" or "no" button. Alternatively, the system may assume that the user followed the general suggestion if the user edits the sentence immediately after viewing the general suggestion. The user feedback (whether explicit or implicit) may in turn be used, as described above, to assess whether the rule's general suggestion should be made in particular contexts.

CONCLUSION

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The collected user feedback data (e.g., accept/rejection actions and associated metadata) can be stored in any type of computer data repository, such as relational databases and/or flat files systems.

Any wordy, dull, or otherwise non-vigorous sentences contained in this specification are attributable not to the inventor(s), but to the patent drafter(s).

Although the above-described embodiments have been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by reference to claims, which are intended to be interpreted without reference to any explicit or implicit definitions that may be set forth in any incorporated-by-reference materials.

What is claimed is:

1. A method of automatic text evaluation, the method comprising:
    scanning a grammatically correct sentence for at least one sign that indicates the possible occurrence or absence of a writing problem, the sign comprising the term "that";

determining, in connection with an occurrence of the sign in the sentence, whether the following conditions are met in the sentence: (1) a word immediately preceding "that" is a "to be" verb, (2) the term "it" immediately precedes the "to be" verb, if present, and (3) the term "what" or the term "who" immediately precedes "it"; and implementing correction logic for correcting the writing problem, the correction logic being dependent upon whether said conditions (1)-(3) are met, said correction logic specifying an edit to the sentence, the edit comprising one or more of: deleting text, adding text, and reordering text;

said method performed by a computer system that comprises one or more computers.

2. The method of claim 1, wherein implementing the correction logic comprises, when said conditions (1)-(3) are met, specifying an edit that comprises deleting the term "it", deleting the "to be" verb, and deleting the term "that."

3. The method of claim 1, further comprising proposing said edit to a user via a user interface that enables the user to accept or reject the edit.

4. The method of claim 1, further comprising automatically making the edit.

5. Non-transitory computer storage that stores executable code that directs a computer system to at least:
scan a sentence for at least one sign that indicates the possible occurrence or absence of a writing problem, the sign comprising the term "that";
determine, in connection with an occurrence of the sign in the sentence, whether the following conditions are met in the sentence: (1) a word immediately preceding "that" is a "to be" verb, (2) the term "it" immediately precedes the "to be" verb, if present, and (3) the term "what" or the term "who" immediately precedes "it"; and
implement correction logic for correcting a writing problem, the correction logic being dependent upon whether said conditions (1)-(3) are met, said correction logic specifying an edit to the sentence, the edit comprising one or more of: deleting text, adding text, and reordering text.

6. The non-transitory computer storage of claim 5, wherein the correction logic, when said conditions (1)-(3) are met, specifies an edit that comprises deleting the term "it", deleting the "to be" verb, and deleting the term "that".

7. The non-transitory computer storage of claim 5, in combination with said computer system, wherein the computer system is programmed with said executable code to detect writing problems.

8. A method of automatic text evaluation, the method comprising:
scanning a grammatically correct sentence for at least one sign that indicates the possible occurrence or absence of a writing problem, the sign comprising the term "that";
determining, in connection with an occurrence of "that" in the sentence, whether the word immediately preceding "that" is a preposition;
when the word immediately preceding the occurrence of "that" is a preposition, concluding that the occurrence of "that" does not signify the presence of a writing problem; and
when the word immediately preceding "that" is not a preposition, applying logic to identify an edit for correcting a writing problem;
said method performed by a computer system that comprises one or more computers.

9. The method of claim 8, wherein applying the logic to identify an edit comprises determining whether the sentence satisfies at least one additional requirement for making the edit.

10. The method of claim 8, further comprising, prior to determining whether the word immediately preceding the occurrence of "that" is a preposition, applying to the sentence, by the computer system, at least one rule that seeks to remove unnecessary language from the sentence based on an occurrence of "that" in the sentence.

11. The method of claim 10, wherein the at least one rule includes a rule that assesses whether all words from the beginning of the sentence to an occurrence of "that" can be removed.

12. Non-transitory computer storage that stores executable code that directs a computer system to at least:
scan a sentence for at least one sign of the possible occurrence or absence of a writing problem, the sign comprising the term "that";
determine, in connection with an occurrence of "that" in the sentence, whether the word immediately preceding "that" is a preposition;
when the word immediately preceding the occurrence of "that" is a preposition, conclude that the occurrence of "that" does not signify the presence of a writing problem; and
when the word immediately preceding "that" is not a preposition, apply logic to assess whether, in connection with the occurrence of "that", an edit can be made to correct a writing problem.

13. The non-transitory computer storage of claim 12, wherein the executable code further directs the computer system to, prior to determining whether the word immediately preceding the occurrence of "that" is a preposition, apply to the sentence at least one rule that seeks to remove unnecessary language from the sentence based on an occurrence of "that" in the sentence.

14. The non-transitory computer storage of claim 13, wherein the at least one rule includes a rule that assesses whether all words from the beginning of the sentence to an occurrence of "that" can be removed.

15. The method of claim 14, wherein the rule that assesses whether all words from the beginning of the sentence to an occurrence of "that" can removed specifies at least one of the following actions: (1) determining whether said words match a phrase in a predefined pool of exception phrases; (2) determining whether said words match a phrase in a predefined pool of removable phrases.

16. The non-transitory computer storage of claim 12, in combination with said computer system, wherein the computer system is programmed with said executable code to detect writing problems.

17. A method of automatic text evaluation, the method comprising:
scanning a grammatically correct sentence for at least one sign of the possible occurrence or absence of a writing problem, said at least one sign comprising the term "that";
detecting from said scanning that the following first condition is met: the sentence includes the term "that" or "who" followed by a "to be" verb followed by an infinitive that includes the word "to";
implementing, in connection with said first condition, correction logic for correcting the writing problem, the correction logic specifying an edit that comprises deleting the "to be" verb and deleting the word "to" from the infinitive;

further detecting from said scanning that the following second condition is met: the sentence includes the term "that" or "who" followed by a "to be" verb followed by a present participle or a past participle; and implementing, in connection with said second condition, correction logic for correcting the writing problem, the correction logic specifying an edit that comprises deleting "that" or "who" and the "to be" verb and not deleting the present or past participle;

said method performed by a computer system that comprises one or more computers.

18. The method of claim 17, wherein the method comprises:

detecting from said scanning that the sentence includes the term "that" followed by a "to be" verb followed by a present participle or a past participle; and specifying an edit that comprises deleting "that" and the "to be" verb and not deleting the present or past participle.

19. The method of claim 17, wherein the method comprises:

detecting from said scanning that the sentence includes the term "who" followed by a "to be" verb followed by a present participle or a past participle; and specifying an edit that comprises deleting "who" and the "to be" verb and not deleting the present or past participle.

20. The method of claim 17, wherein implementing, in connection with said first condition, correction logic for correcting the writing problem further comprises adjusting the number and/or tense of the verb from which "to" was deleted to match the number and/or tense of the "to be" verb.

21. Non-transitory computer storage that stores executable code that, when executed by a computer system, is capable of causing the computer system to at least:

scan a sentence for at least one sign of the possible occurrence or absence of a writing problem, said at least one sign comprising the term "that";

detect that the following condition is met: the sentence includes the term "that" or "who" followed by a "to be" verb followed by an infinitive that includes the word "to"; and apply correction logic to the sentence to correct a writing problem associated with the condition, the correction logic specifying an edit that comprises deleting the "to be" verb and deleting the word "to" from the infinitive.

22. The non-transitory computer storage of claim 21, in combination with said computer system, wherein the computer system is programmed with said executable code to detect writing problems.

23. The non-transitory computer storage of claim 21, that is also capable of causing the computer system to adjust the verb from which "to" was deleted such that it matches the "to be" verb in number and/or tense.

24. The non-transitory computer storage of claim 21, wherein the executable code is, when executed by a computer system, further capable of causing the computer system to at least:

detect that the following condition is also met: the sentence includes the term "that" or "who" followed by a "to be" verb followed by a present participle or a past participle; and apply correction logic to the sentence specifying the following additional edit: deleting "that" or "who" and not deleting the present or past participle.

25. Non-transitory computer storage that stores executable code that, when executed by a computer system, is capable of causing the computer system to at least:

scan a sentence for at least one sign of the possible occurrence or absence of a writing problem, said at least one sign comprising the terms "that";

detect that the following condition is met: the sentence includes the term "that" or "who" followed by a "to be" verb, but the "to be" verb is not immediately followed by an infinitive, a noun, or an adjective; and apply correction logic to the sentence to correct a writing problem associated with the condition, the correction logic specifying an edit that comprises deleting "that" or "who" and the "to be" verb.

26. Non-transitory computer storage that stores executable code that, when executed by a computer system, is capable of causing the computer system to at least:

scan a sentence for at least one sign of the possible occurrence or absence of a writing problem, said at least one sign comprising the term "that";

detect that the following condition is met:

the sentence includes the term "that" or "who" followed by a "to be" verb;

an adjective immediately follows the "to be" verb; and a noun immediately precedes the term "that" or "who"; and apply correction logic to the sentence to correct a writing problem associated with the condition, the correction logic specifying an edit that comprises deleting "that" or "who" and deleting the "to be" verb.

27. The non-transitory computer storage of claim 26, wherein the executable code is, when executed by a computer system, further capable of causing the computer system to at least:

apply further correction logic to the sentence to correct the writing problem associated with the condition, the correction logic specifying an edit that further comprises putting the adjective before the noun.

* * * * *